United States Patent
Tazume

(10) Patent No.: US 12,033,108 B2
(45) Date of Patent: Jul. 9, 2024

(54) CONTROL DEVICE, UNMANNED VEHICLE, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 821 days.

(21) Appl. No.: 17/257,490

(22) PCT Filed: Jun. 27, 2019

(86) PCT No.: PCT/JP2019/025537
§ 371 (c)(1),
(2) Date: Dec. 31, 2020

(87) PCT Pub. No.: WO2020/261470
PCT Pub. Date: Dec. 30, 2020

(65) Prior Publication Data
US 2021/0319394 A1    Oct. 14, 2021

(51) Int. Cl.
| | | |
|---|---|---|
| *G06Q 10/08* | (2024.01) | |
| *B64C 39/02* | (2023.01) | |
| *G06Q 10/0832* | (2023.01) | |
| *G08G 5/00* | (2006.01) | |
| *B64U 101/60* | (2023.01) | |

(52) U.S. Cl.
CPC ....... *G06Q 10/0832* (2013.01); *B64C 39/024* (2013.01); *G08G 5/0034* (2013.01); *G08G 5/0039* (2013.01); *G08G 5/0069* (2013.01); *B64U 2101/60* (2023.01); *B64U 2201/10* (2023.01)

(58) Field of Classification Search
CPC ............ G06Q 10/0832; G06Q 10/047; G06Q 10/083; G06Q 50/28; B64C 39/024; G08G 5/0034; G08G 5/0039; G08G 5/0069; G08G 5/0013; G08G 5/0026; B64U 2101/60; B64U 2201/10; B65G 61/00
See application file for complete search history.

(56) References Cited

U.S. PATENT DOCUMENTS

| | | | |
|---|---|---|---|
| 9,305,280 B1 * | 4/2016 | Berg | .................... G08G 5/0069 |
| 11,816,624 B2 * | 11/2023 | Goldberg | ........... G06Q 10/0832 |
| 2014/0317005 A1 | 10/2014 | Balwani | |
| 2016/0246304 A1 | 8/2016 | Canoy et al. | |
| 2016/0284221 A1 | 9/2016 | Hinkle et al. | |

(Continued)

FOREIGN PATENT DOCUMENTS

| | | | |
|---|---|---|---|
| CN | 106662874 A | 5/2017 | |
| CN | 107257765 A | 10/2017 | |

(Continued)

OTHER PUBLICATIONS

International Search Report for PCT/JP2019/025537 dated Oct. 1, 2019 (PCT/ISA/210).

*Primary Examiner* — Richard M Camby
(74) *Attorney, Agent, or Firm* — Sughrue Mion, PLLC

(57) ABSTRACT

A control device (100) includes an acquirer (110) that acquires transport article information expressing a characteristic of an article to be transported, and a generator (130) that generates, on the basis of the characteristic expressed in the acquired transport article information, transport control information that causes an unmanned vehicle to transport the article.

16 Claims, 37 Drawing Sheets

(56) References Cited

U.S. PATENT DOCUMENTS

2018/0075402 A1   3/2018  Stadie et al.
2019/0050952 A1*  2/2019  Goldberg ................ A47J 36/32
2019/0180238 A1   6/2019  Ono

FOREIGN PATENT DOCUMENTS

| JP | 2005-263112 A | 9/2005 |
| JP | 2016-527580 A | 9/2016 |
| JP | 2018-511136 A | 4/2018 |
| JP | 2018-203414 A | 12/2018 |
| JP | 2019-096126 A | 6/2019 |

* cited by examiner

FIG. 4

TRANSPORT ARTICLE INFORMATION

| ARTICLE ID | DESTINATION INFORMATION | CHARACTERISTICS INFORMATION |
|---|---|---|
| G001 | SETAGATA-KU, TOKYO-TO... | WEAK |

FIG. 6

CHARACTERISTICS TABLE

| | TYPE INFORMATION | CHARACTERISTICS INFORMATION |
|---|---|---|
| 1 | BEVERAGE | STANDARD |
| 2 | FOOD | STANDARD |
| 3 | BOOK | STRONG |
| 4 | FRAGILE ARTICLE | WEAK |
| | ... | ... |

FIG. 7

PARTIAL ROUTE TABLE

| LATITUDE AND LONGITUDE OF START NODE | LATITUDE AND LONGITUDE OF END NODE | DISTANCE | DEGREE OF CONGESTION |
|---|---|---|---|
| E139° XX'<br>N35° XX' | E139° Y1'<br>N35° Y1' | 100 m | 0.10 TIMES/m |
| E139° XX'<br>N35° XX' | E139° Y2'<br>N35° Y2' | 120 m | 0.01 TIMES/m |
| E139° Y1'<br>N35° Y1' | E139° ZZ'<br>N35° ZZ' | 100 m | 0.10 TIMES/m |
| E139° Y2'<br>N35° Y2' | E139° ZZ'<br>N35° ZZ' | 120 m | 0.01 TIMES/m |
| ... | ... | ... | ... |

FIG. 8

OPERATING MODE TABLE

| | CHARACTERISTICS INFORMATION | OPERATING MODE INFORMATION | | |
|---|---|---|---|---|
| | | NAME | SPEED LIMIT | ACCELERATION LIMIT |
| 1 | STANDARD | STANDARD MODE | 15 m/s | 0.5 G |
| 2 | STRONG | HIGH-SPEED MODE | 20 m/s | 1.0 G |
| 3 | WEAK | LOW-SPEED MODE | 10 m/s | 0.3 G |

FIG. 16

TRANSPORT ARTICLE INFORMATION

| ARTICLE ID | DESTINATION INFORMATION | CHARACTERISTICS INFORMATION | SPECIFIED TIME BLOCK INFORMATION |
|---|---|---|---|
| G001 | SETAGATA-KU, TOKYO-TO... | WEAK | 09:00-11:00 |

FIG. 20

DELIVERY METHOD TABLE

| | CHARACTERISTICS INFORMATION | DELIVERY METHOD INFORMATION |
|---|---|---|
| 1 | STANDARD | LAND-AND-DELIVER METHOD |
| 2 | STRONG | DROP-DELIVERY METHOD |
| 3 | WEAK | SUSPENDED-DELIVERY METHOD |

FIG. 25

UNMANNED VEHICLE TABLE

|   | VEHICLE ID | SIZE INFORMATION | CHARACTERISTICS INFORMATION | TRANSPORT COST INFORMATION |
|---|---|---|---|---|
| 1 | 192.168.0.1 | STANDARD | STANDARD | STANDARD |
| 2 | 192.168.0.1 | STANDARD | STRONG | STANDARD |
| 3 | 192.168.0.2 | LARGE | WEAK | HIGH |
| 4 | 192.168.0.2 | LARGE | STANDARD | HIGH |
| 5 | 192.168.0.2 | LARGE | STRONG | HIGH |
| 6 | 192.168.0.3 | SMALL | STRONG | LOW |

FIG. 26

UNMANNED VEHICLE TABLE

|   | VEHICLE ID | DELIVERY METHOD INFORMATION |
|---|---|---|
| 1 | 192.168.0.1 | LAND-AND-DELIVER METHOD |
| 2 | 192.168.0.1 | DROP-DELIVERY METHOD |
| 3 | 192.168.0.2 | SUSPENDED-DELIVERY METHOD |
| 4 | 192.168.0.2 | LAND-AND-DELIVER METHOD |
| 5 | 192.168.0.2 | DROP-DELIVERY METHOD |
| 6 | 192.168.0.3 | LAND-AND-DELIVER METHOD |
| 7 | 192.168.0.3 | DROP-DELIVERY METHOD |

FIG. 27

CHARACTERISTICS TABLE

|   | TYPE INFORMATION | CHARACTERISTICS INFORMATION |
|---|---|---|
| 1 | BOOK | UNNECESSARY |
| 2 | FRESH FOOD | NEEDS REFRIGERATION |
| 3 | FROZEN FOOD | NEEDS FREEZING |
| 4 | ICE CREAM | NEEDS FREEZING |
| 5 | ... | ... |

FIG. 28

OPERATING MODE TABLE

| CHARACTERISTICS INFORMATION | OPERATING MODE INFORMATION | | |
|---|---|---|---|
| | NAME | SPEED LIMIT | ACCELERATION LIMIT |
| UNNECESSARY | STANDARD MODE | 15 m/s | 0.5 G |
| NEEDS REFRIGERATION | HIGH-SPEED MODE | 20 m/s | 1.0 G |
| NEEDS FREEZING | HIGH-SPEED MODE | 20 m/s | 1.0 G |

FIG. 29

PARTIAL ROUTE TABLE

| LATITUDE AND LONGITUDE OF START NODE | LATITUDE AND LONGITUDE OF END NODE | DISTANCE | DEGREE OF SHADE |
|---|---|---|---|
| E139° XX'<br>N35° XX' | E139° Y1'<br>N35° Y1' | 100 m | 0.00 |
| E139° XX'<br>N35° XX' | E139° Y2'<br>N35° Y2' | 120 m | 0.00 |
| E139° Y1'<br>N35° Y1' | E139° ZZ'<br>N35° ZZ' | 100 m | 0.90 |
| E139° Y2'<br>N35° Y2' | E139° ZZ'<br>N35° ZZ' | 120 m | 0.80 |
| ... | ... | ... | ... |

FIG. 30

DELIVERY METHOD TABLE

| | CHARACTERISTICS INFORMATION | DELIVERY METHOD INFORMATION |
|---|---|---|
| 1 | UNNECESSARY | LEAVE DELIVERY METHOD |
| 2 | NEEDS REFRIGERATION | DELIVER-TO-PERSON DELIVERY METHOD |
| 3 | NEEDS FREEZING | DELIVER-TO-PERSON DELIVERY METHOD |

FIG. 32

UNMANNED VEHICLE TABLE

| | VEHICLE ID | FUNCTION OF STORAGE BOX | CHARACTERISTICS INFORMATION |
|---|---|---|---|
| 1 | 192.168.0.1 | – | UNNECESSARY |
| 2 | 192.168.0.2 | REFRIGERATION CONTROL FUNCTION | NEEDS REFRIGERATION |
| 3 | 192.168.0.3 | FREEZING CONTROL FUNCTION | NEEDS FREEZING |

FIG. 36

OPERATING MODE TABLE

| | CHARACTERISTICS INFORMATION | OPERATING MODE INFORMATION | | |
|---|---|---|---|---|
| | | NAME | SPEED LIMIT | ACCELERATION LIMIT |
| 1 | STANDARD | STANDARD MODE | 15 m/s | 0.5 G |
| 2 | STRONG | HIGH-SPEED MODE | 20 m/s | 1.0 G |
| 3 | WEAK | LOW-SPEED MODE | 10 m/s | 0.3 G |
| 4 | — | SUPER LOW-SPEED MODE | 5 m/s | 0.1 G |

CONTROL DEVICE, UNMANNED VEHICLE, AND METHOD

CROSS REFERENCE TO RELATED APPLICATIONS

This application is a National Stage of International Application No. PCT/JP2019/025537 filed Jun. 27, 2019.

TECHNICAL FIELD

The present disclosure relates to a control device, an unmanned vehicle, and a method.

BACKGROUND ART

In the art, systems are known that generate transport control information that causes an unmanned vehicle to transport an article from an initial position to a target position. This transport control information is generated on the basis of an initial position and a target position of the unmanned vehicle carrying the article, and zones that the unmanned vehicle is not permitted to enter (for example, see Patent Literature 1).

CITATION LIST

Patent Literature

Patent Literature 1: Unexamined Japanese Patent Application Publication (Translation of PCT Application) No. 2018-511136

SUMMARY OF INVENTION

Technical Problem

However, in the system of Patent Literature 1, transport control information is generated that causes the unmanned vehicle to transport the article without regards to the characteristics of the article such as the degree of impact that the article being transported can withstand, namely, impact resistance, or the need for temperature control. Consequently, it is not possible to generate transport control information that enables transportation suited to the characteristics of the article.

The present disclosure is made with the view of the above situation, and an objective of the present disclosure is to provide a control device, an unmanned vehicle, and a method that can generate transport control information that causes the unmanned vehicle to perform transportation better suited to the characteristics of an article.

Solution to Problem

A control device according to a first aspect of the present disclosure that achieves the objective described above includes:

an acquirer that acquires transport article information expressing a characteristic of an article to be transported; and a generator that generates, on the basis of the characteristic expressed in the acquired transport article information, transport control information that causes an unmanned vehicle to transport the article.

Advantageous Effects of Invention

With the control device, the unmanned vehicle, and the method according to the present disclosure, it is possible to generate transport control information that causes the unmanned vehicle to perform transportation better suited to the characteristics of the article.

BRIEF DESCRIPTION OF DRAWINGS

FIG. 4 is a drawing illustrating an example of transport article information that is acquired by the control device of the transport system according to Embodiment 1;

FIG. 6 is a drawing illustrating an example of a characteristics table stored in the control device of the transport system according to Embodiment 1;

FIG. 7 is a drawing illustrating an example of a partial route table that is stored in the control device of the transport system according to Embodiment 1;

FIG. 8 is a drawing illustrating an example of an operating mode table that is stored in the control device of the transport system according to Embodiment 1;

FIG. 16 is a drawing illustrating an example of transport article information that is acquired by the control device of the transport system according to Modified Example 4 of Embodiment 1;

FIG. 20 is a drawing illustrating an example of a delivery method table stored in the control device of the transport system according to Modified Example 5 of Embodiment 1;

FIG. 25 is a drawing illustrating an example of an unmanned vehicle table stored in the control device of the transport system according to Modified Example 6 of Embodiment 1;

FIG. 26 is a drawing illustrating an example of an unmanned vehicle table stored in the control device of the transport system according to Modified Example 7 of Embodiment 1;

FIG. 27 is a drawing illustrating an example of a characteristics table stored in the control device of the transport system according to Modified Example 8 of Embodiment 1;

FIG. 28 is a drawing illustrating an example of an operating mode table that is stored in the control device of the transport system according to Modified Example 8 of Embodiment 1;

FIG. 29 is a drawing illustrating an example of a partial route table that is stored in the control device of the transport system according to Modified Example 8 of Embodiment 1;

FIG. 30 is a drawing illustrating an example of a delivery method table stored in the control device of the transport system according to Modified Example 12 of Embodiment 1;

FIG. 32 is a drawing illustrating an example of an unmanned vehicle table stored in the control device of the transport system according to Modified Example 13 of Embodiment 1;

FIG. 36 is a drawing illustrating an example of an operating mode table that is stored in the control device of the transport system according to Embodiment 2.

DESCRIPTION OF EMBODIMENTS

Embodiment 1

Hereinafter, Embodiment 1 of the present disclosure is described while referencing the drawings.

Figure 1:
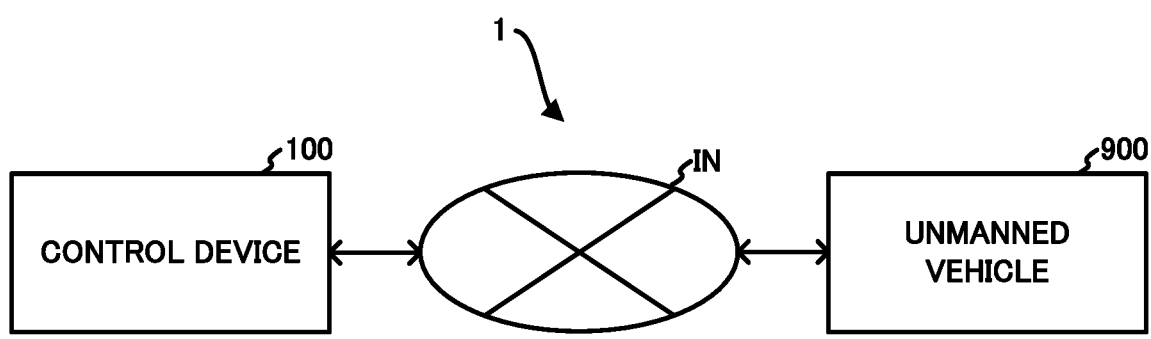
FIG. 1 is a system configuration drawing illustrating a configuration example of a transport system according to Embodiment 1 of the present disclosure.

A transport system 1 according to Embodiment 1 of the present disclosure is installed in an office of a delivery company that delivers articles within a predetermined region. As illustrated in FIG. 1, the transport system 1 includes a control device 100, which is a server device, and an unmanned vehicle 900, which is an unmanned aircraft. The control device 100 carries out, over an internet IN, control that causes the unmanned vehicle 900 to transport an article to a delivery destination.

Figure 2:
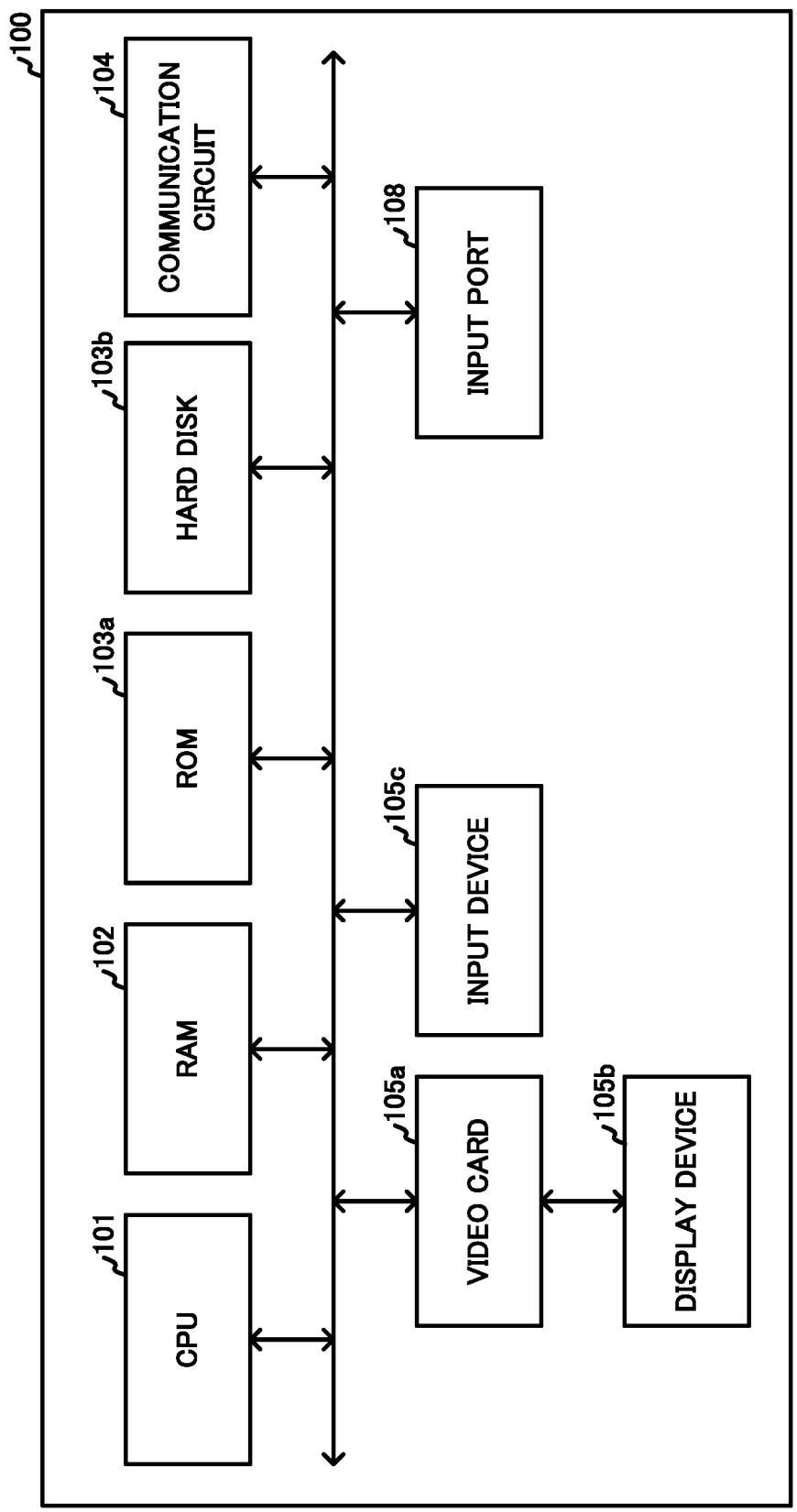
FIG. 2 is a hardware configuration diagram illustrating a configuration example of a control device of the transport system.

As illustrated in FIG. 2, the control device 100 includes a central processing unit (CPU) 101, a random access memory (RAM) 102, a read-only memory (ROM) 103a, a hard disk 103b, a communication circuit 104, a video card 105a, a display device 105b, an input device 105c, and an input port 108.

The CPU 101 carries out total control of the control device 100 by executing a program stored in the ROM 103a or the hard disk 103b. The RAM 102 temporarily stores data to be processed at the time of execution of the program by the CPU 101.

Various types of programs are stored in the ROM 103a and the hard disk 103b. The hard disk 103b also stores various types of data and tables in which data is stored that are used in the execution of the programs. The control device 100 may include flash memory instead of the hard disk 103b.

The communication circuit 104 is implemented as a network interface card (NIC) and, in one example, in accordance with a communication standard such as long term evolution (LTE) or 3rd Generation (3G), carries out data communication using radio waves with a non-illustrated base station that is connected to the internet IN. Thus, the communication circuit 104 carries out data communication with the unmanned vehicle 900 that is connected to the communication circuit 104 via the internet IN.

The video card 105a renders images on the basis of digital signals output from the CPU 101, and outputs image signals that represent the rendered images. The display device 105b is implemented as a liquid crystal display (LCD), and displays images in accordance with the image signals output from the video card 105a. The control device 100 may include a plasma display panel (PDP) or electroluminescence (EL) display instead of the LCD. The input device 105c is implemented as one or more of a keyboard, a mouse, a touch pad, and a button, and inputs signals in accordance with user operations.

The input port 108 is connected to a non-illustrated cable that is connected to a non-illustrated two-dimensional code reader, and inputs, into the CPU 101, signals output by the two-dimensional code reader.

The control device 100 is operated by an employee that works at the office. When an article is brought into the office, the employee operates the non-illustrated two-dimensional code reader that is connected to the control device 100, and causes the two-dimensional reader to read a two-dimensional code from a slip affixed to the cardboard in which the article that is brought in is packaged. Thereafter, the employee loads the article that is packaged in the cardboard on the unmanned vehicle 900.

Figure 3:
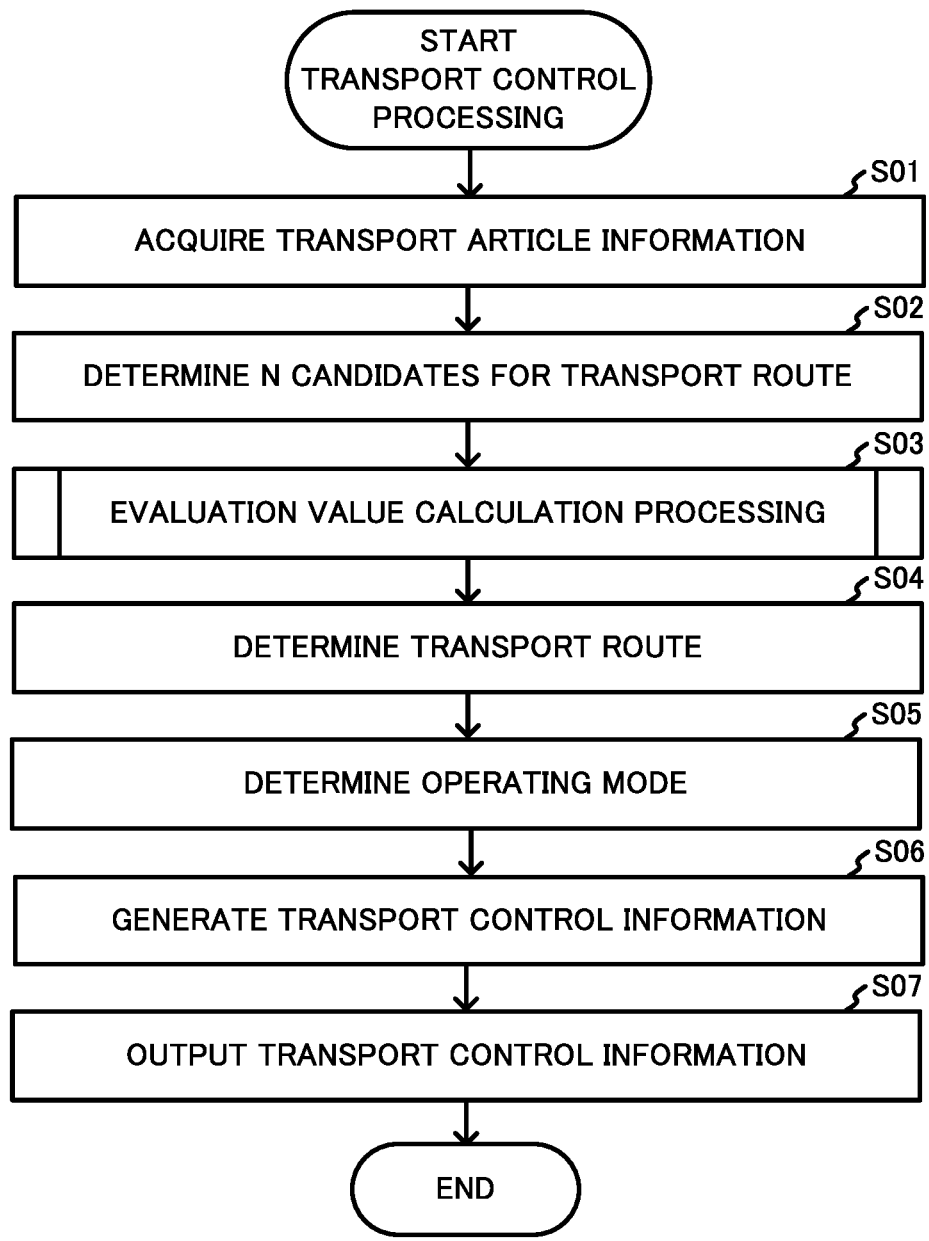
FIG. 3 is a flowchart illustrating an example of transport control processing executed by the control device of the transport system according to Embodiment 1.

When a signal is input via the input port 108 from the two-dimensional code reader, the CPU 101 of the control device 100 starts the execution of transport control processing such as illustrated in FIG. 3 that causes the unmanned vehicle 900 to transport the article that is packaged in the cardboard on which the two-dimensional code is printed.

Figure 5:
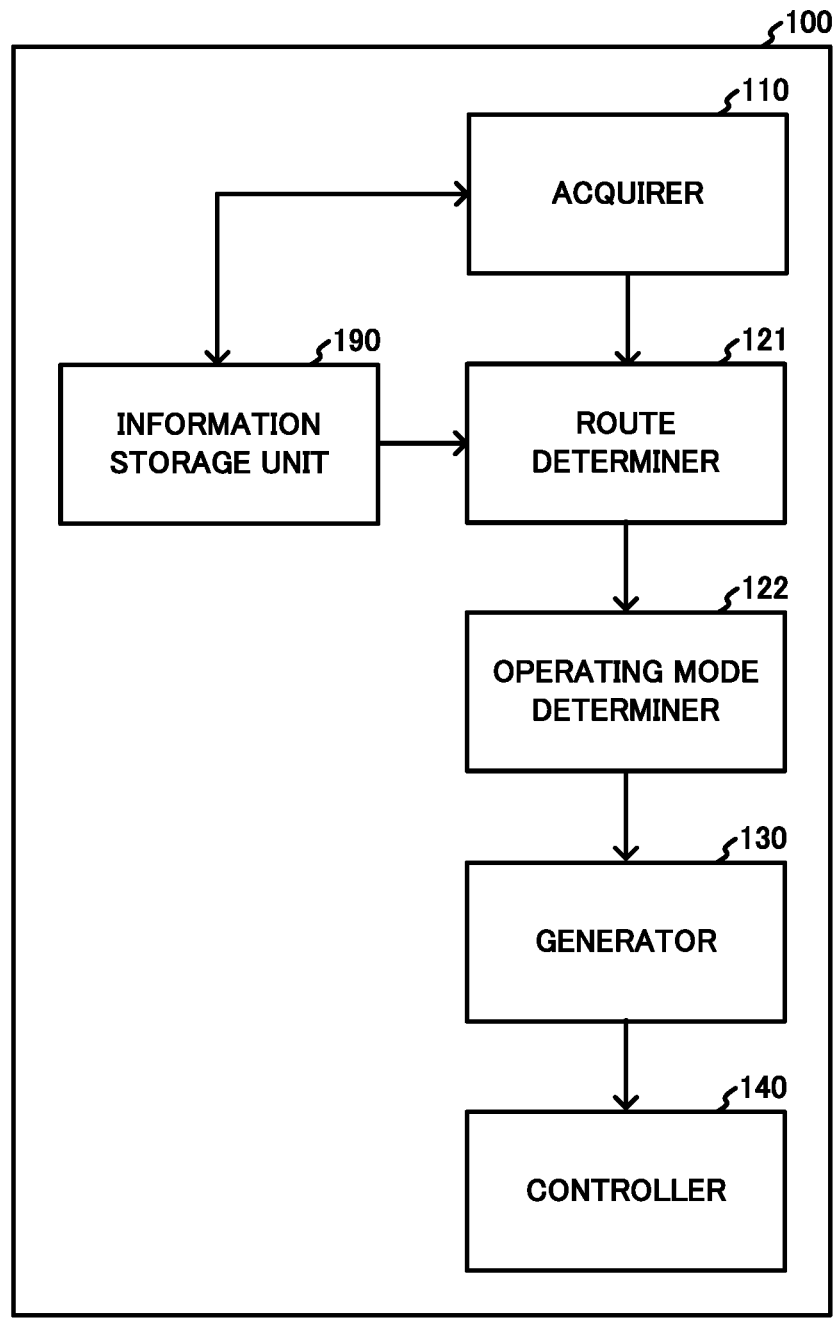
FIG. 5 is a functional block diagram illustrating an example of the functions of the control device of the transport system according to Embodiment 1.

As a result, the CPU 101 of the control device 100 functions as an acquirer 110 such as illustrated in FIG. 5 that acquires transport article information such as illustrated in FIG. 4, which is information about the article to be transported by the unmanned vehicle 900. The transport article information acquired by the acquirer 110 includes an article IDentification (ID) that identifies the article to be transported, destination information that expresses a designated address as the destination of the article, and characteristics information that is information that expresses the characteristics of the article. The characteristics of the article include impact resistance. Impact resistance expresses the degree of impact that the article can withstand.

Furthermore, the CPU 101 of the control device 100 functions as a route determiner 121 that determines a transport route on which the unmanned vehicle 900 transports the article. Here, the transport route is determined on the basis of the characteristics of the article expressed in the transport article information acquired by the acquirer 110. Moreover, the CPU 101 functions as an operating mode determiner 122 that determines an operating mode related to behavior for when the unmanned vehicle 900 moves on the transport route while carrying the article.

Furthermore, the CPU 101 of the control device 100 functions as a generator 130 that generates transport control information that causes the unmanned vehicle 900 to move on the transport route in the operating mode. Note that the transport control information generated by the generator 130 includes transport route information expressing the transport route determined by the route determiner 121, and operating mode information expressing the operating mode determined by the operating mode determiner 122.

Additionally, the CPU 101 of the control device 100 functions as a controller 140 that carries out control, on the basis of the transport control information generated by the generator 130, that causes the unmanned vehicle 900 to transport the article.

The hard disk 103b illustrated in FIG. 2 functions as an information storage unit 190 in which various tables used in the execution of the transport control processing are stored in advance. The tables stored in the information storage unit 190 include a characteristics table such as illustrated in FIG. 6, in which information about the characteristics of the article is stored. A plurality of records is stored in advance in the characteristics table. Type information that expresses the type of the article, and characteristics information that expresses the impact resistance as a characteristic that a plurality of articles classified as the type have in common, are associated and stored in advance in each of the records.

In the first record of the characteristics table, the article type "beverage" and the characteristics information "standard", which represents standard impact resistance, are associated. This means that the plurality of articles classified as "beverages" can withstand an impact of a predetermined standard strength and an impact weaker than the predetermined standard strength, but cannot withstand an impact stronger than the standard impact.

Here, the "impact of a predetermined strength" includes a single impact the magnitude of a predetermined standard, and impacts the magnitude of the predetermined standard over a predetermined standard number of times. The "impact stronger than the standard impact" includes a single impact that is greater than the magnitude of the predetermined standard, and impacts the magnitude of the predetermined standard that exceed the predetermined standard number of times. Likewise, the "impact weaker than the standard impact" includes a single impact that is smaller than the magnitude of the predetermined standard, and impacts the magnitude of the predetermined standard that are less than the predetermined standard number of times.

"Can withstand an impact" means that the state before impact of the article is maintained. "The state before impact of articles classified as 'beverages' is maintained" includes cases in which, for example, if the state before impact is a state in which a PET bottle, can, glass bottle, or similar container is undamaged, that container is undamaged post-impact. "The state before impact of articles classified as 'beverages' is maintained" also includes cases in which, for example, if the state before impact is a state in which the contents do not spray out, or hardly spray out, when opening the container, that state is maintained post-impact.

In the second record of the characteristics table, the article type "food" and the characteristics information "standard" are associated. This means that the plurality of articles classified as "food" have standard impact resistance. "The state before impact of articles classified as 'food' is maintained" includes cases in which, for example, if the state before impact is a state in which a packaging container of the food is undamaged, a state in which liquid such as soup or sauce is not leaking from the packaging container, or a state in which the plating of the food has not collapsed or has not severely collapsed, that state is maintained post-impact.

In the third record of the characteristics table, the article type "book" and the characteristics information "strong", which represents strong impact resistance, are associated. This means that the plurality of articles classified as "books" can withstand impacts stronger than impacts of the standard strength.

In the fourth record of the characteristics table, the article type "fragile article" and the characteristics information "weak" are associated. This means that the plurality of articles classified as "fragile articles" can only withstand impacts weaker than impacts of the standard strength. "The state before impact of articles classified as the 'fragile article' type is maintained" includes cases in which, for example, if the state before impact is a state in which the packaging container of the article is undamaged, a state in which the article is not broken or chipped, or a state in which the article is not cracked, that state is maintained post-impact.

Furthermore, a partial route table such as illustrated in FIG. 7 is stored in advance in the information storage unit 190. Information about partial routes on which the unmanned vehicle 900 can move, such as roads and rivers, is stored in the partial route table. A plurality of records is stored in advance in the partial route table. The latitude and longitude of the start node of an edge that is a partial route, the latitude and longitude of an end node of the edge, and information that represents a distance of the edge are associated and stored in advance in each of the records.

A degree of congestion is associated with the latitudes and longitudes of the start node and the end node. This degree of congestion is an actual value calculated on the basis of flight history of the unmanned vehicle 900, and expresses how many times, on average, evasive maneuvers such as deceleration or changes in flight altitude are performed while the unmanned vehicle 900 flies a unit distance of the edge in order to prevent contact with unmanned vehicles other than the unmanned vehicle 900, animals such as birds and cats, and the like.

Furthermore, an operating mode table such as illustrated in FIG. 8 is stored in advance in the information storage unit 190. A plurality of records is stored in advance in the operating mode table, and operating mode information that expresses operating modes related to behavior of the unmanned vehicle 900 is stored in the plurality of records.

The behavior of the unmanned vehicle 900 includes ascending, descending, level flight, direction changes, acceleration, and deceleration performed by the unmanned vehicle 900. The operating modes related to behavior include a standard mode in which a predetermined standard speed is imposed, as a speed limit, on each of the ground speed or the air speed of the unmanned vehicle 900, and on the angular velocity at which the azimuth angle of the traveling direction of the unmanned vehicle 900 changes when ascending, when in level flight, when descending, and when changing directions. In the standard mode, a predetermined standard acceleration is imposed, as an acceleration limit, on each of the ground speed acceleration or the airspeed acceleration and the angular velocity acceleration, and in the standard mode, speed limits are imposed on the ground speed or the airspeed and the angular velocity.

Furthermore, the operating modes related to behavior include a high-speed mode in which a speed faster than the standard speed is imposed, as the speed limit, on each ground speed and the like of the unmanned vehicle 900 when ascending and the like and, also, an acceleration greater than the standard acceleration is imposed, as the acceleration limit, on each acceleration of the ground speed and the like. Additionally, the operating modes related to behavior include a low-speed mode in which a speed slower than the standard speed is imposed, as the speed limit, on each ground speed and the like of the unmanned vehicle 900 when ascending and the like and, also, an acceleration smaller than the standard acceleration is imposed, as an acceleration limit, on each acceleration of the ground speed and the like.

As such, the characteristics information that expresses the characteristics of the article and the operating mode information are associated in advance in each of the records of the operating mode table illustrated in FIG. 8. Here, the operating mode information expresses the speed limit, the acceleration limit, and the name of the operating mode with the fastest speed limit and the greatest acceleration limit that are imposed on the unmanned vehicle 900 among the operating modes that do not change or are unlikely to change the state of articles that have the characteristics.

In one specific example, characteristics information expressing the standard impact resistance and operating mode information expressing the standard mode are associated in advance in the first record of the operating mode table illustrated in FIG. 8. Additionally, characteristics information expressing the strong impact resistance and operating mode information expressing the high-speed mode are associated in advance in the second record of the operating mode table, and characteristics information expressing the weak impact resistance and operating mode information expressing the low-speed mode are associated in advance in the third record of the operating mode table.

Furthermore, a non-illustrated address table is stored in advance in the information storage unit 190. A plurality of pieces of data, in which information that expresses an address within the delivery area and information that expresses the latitude and longitude of a geographical location representing that address are associated, is stored in the address table.

When the execution of the transport control processing illustrated in FIG. 3 starts, the acquirer 110 illustrated in FIG. 5 acquires, on the basis of the signal input from the non-illustrated two-dimensional code reader via the input port 108, the article ID, which is the identification information of the article on which the two-dimensional code is printed, and a uniform resource locater (URL) of a non-illustrated server that is managed by the company that sold the article or the company running the office. Thereafter, the acquirer 110 generates a request that requests the sending of delivery information related to the delivery of the article identified by the article ID, and outputs the generated request to the communication circuit 104 illustrated in FIG. 2. Here, the delivery information requested to be sent in the request includes the read URL and the acquired article ID. Note that, the delivery information requested to be sent by the request includes the destination information and the type information of the article to be delivered.

When the communication circuit 104 receives the delivery information after sending the request to the non-illustrated server, the acquirer 110 acquires the delivery information from the communication circuit 104. Next, the acquirer 110 acquires the type information included in the acquired delivery information, and acquires, from the characteristics table illustrated in FIG. 6, the characteristics information associated with the acquired type information. Then, the acquirer 110 treats the destination information included in the delivery information and the characteristics information acquired from the characteristics table as the transport article information related to the article to be transported by the unmanned vehicle 900 (step S01).

Next, the route determiner 121 acquires, from the non-illustrated address table stored in the information storage unit 190, information expressing the latitude and longitude associated with the destination information that represents the address of the destination, and acquires information expressing the latitude and longitude of the office that is stored in advance in the information storage unit 190.

Then, the route determiner 121 executes a route search algorithm such as Dijkstra's algorithm, for example, using the distance of the edge, the latitude and longitude of the start node of the edge, and the latitude and longitude of the end node of the edge that are stored in the partial route table of FIG. 7. As a result, the route determiner 121 determines a plurality of whole routes from the office to the destination by combining partial routes. Next, from among the determined plurality of whole routes, the route determiner 121 determines whole routes from a first candidate to an Nth (where N is a natural number) candidate in order of increasing total transport distance as N transport route candidates (step S02).

Figure 9:
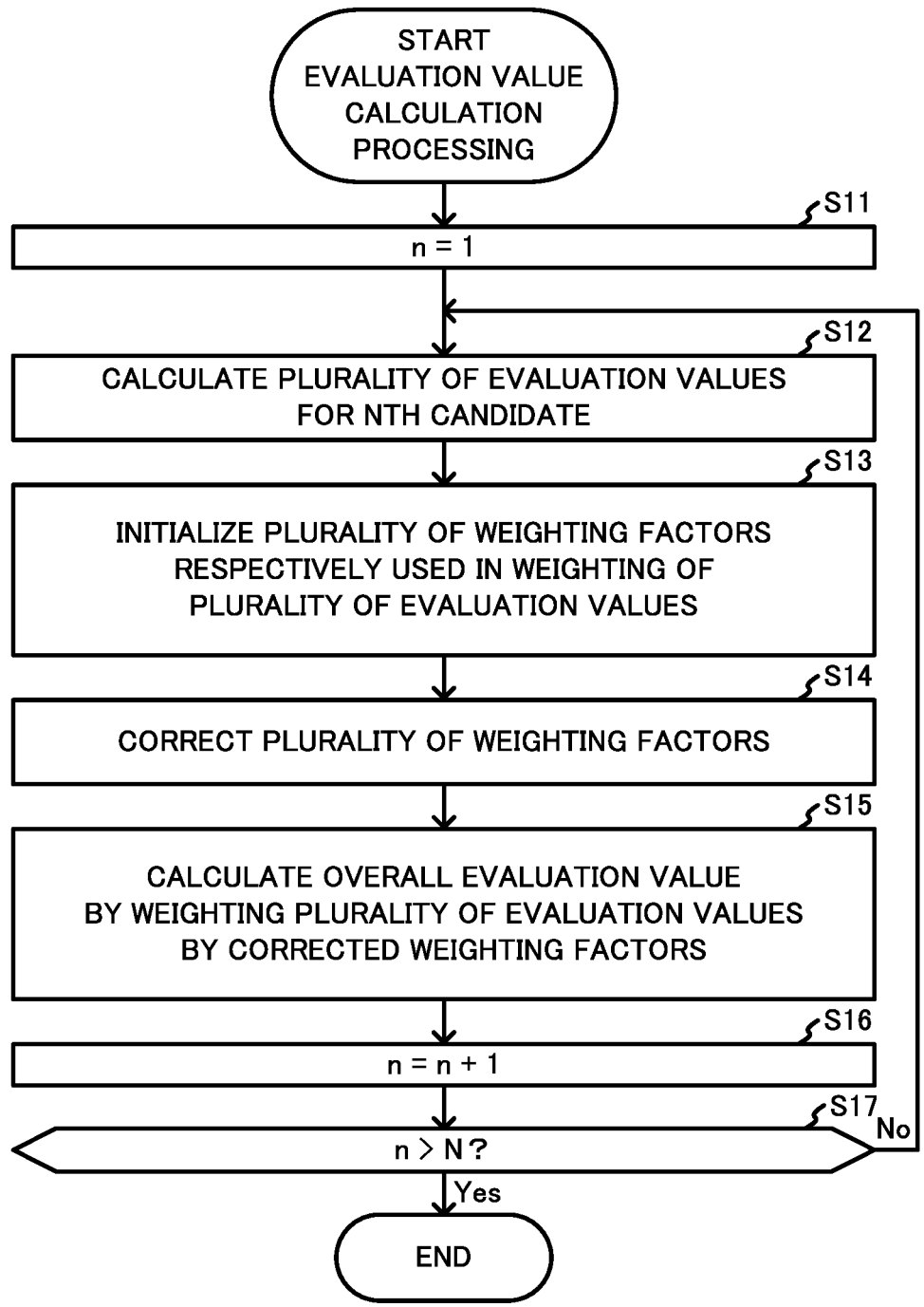
FIG. 9 is a flowchart illustrating an example of evaluation value calculation processing executed by the control device of the transport system.

Then, the route determiner 121 executes evaluation value calculation processing such as illustrated in FIG. 9, in which an evaluation value is calculated for each of the N candidates. The evaluation value expresses how appropriate the candidate is evaluated to be as a transport route for the article that has the characteristics expressed in the transport article information acquired in step S01 (step S03). In the present embodiment, an example of the evaluation value calculation processing of FIG. 9 is described in which higher evaluation values are calculated for candidates evaluated to be more appropriate as transport routes. However, the present embodiment is not limited thereto, and evaluation value calculation processing may be executed in which lower evaluation values are calculated for candidates evaluated to be more appropriate as transport routes.

When the execution of the evaluation value calculation processing starts, the route determiner 121 initializes a variable n that represents the number of transport route candidate to "1" (step S11). The variable n is initialized to a value of "1" so that the evaluation values are calculated in order from the 1st candidate.

Next, the route determiner 121 calculates, for the nth candidate, a plurality of evaluation values on the basis of a plurality of indices (step S12). Hereinafter, a first evaluation value based on the total transport distance, a second evaluation value based on the degree of congestion, and a third evaluation value based on the number of direction changes of the unmanned vehicle 900 are described as a specific example of the plurality of evaluation values. However, the plurality of evaluation values is not limited thereto. For example, the plurality of evaluation values may include the first evaluation value and the second evaluation value, the first evaluation value and the third evaluation value, or a plurality of evaluation values based on indices other than the total transport distance, the degree of congestion, and the number of direction changes.

In order to calculate the first evaluation value based on the total transport distance, the route determiner 121 acquires the total transport distance of the nth candidate calculated by executing the route search algorithm. Next, the route determiner 121 calculates, as the first evaluation value, a value that increases as the acquired total transport distance shortens. The route determiner 121 calculates the first evaluation value in this manner because shorter total transport distances result in higher transport efficiency, which is expressed by the quantity of articles per unit time that the unmanned vehicle 900 can transport.

In the present embodiment, it is described that the route determiner 121 uses, as the calculation method of the first evaluation value, a method in which the reciprocal of the total transport distance is set as the first evaluation value. However, the present embodiment is not limited thereto. Any calculation method may be used provided that the route determiner 121 calculates, as the first evaluation value, a positive value that increases as the total transport distance shortens.

Next, in order to calculate the second evaluation value based on the degree of congestion, the route determiner 121 identifies the plurality of edges included in the nth candidate. Then, from among the identified plurality of edges, the route determiner 121 sets one edge for which the degree of congestion is not acquired as a considered edge, and acquires, from the partial route table of FIG. 7, information that represents the distance of the considered edge and information that represents the degree of congestion associated with the latitude and longitude of the start node and the latitude and longitude of the end node of the considered edge. Then, the route determiner 121 multiplies the degree of congestion of the considered edge expressed in the acquired information by the distance of the considered edge to calculate an expected number of evasions, which is the number of times that the unmanned vehicle 900 is expected to perform evasive maneuvers while moving on the considered edge. Then, the route determiner 121 repeats this processing from the step of setting one unconsidered edge as the considered edge, until there are no unconsidered edges.

When there are no unconsidered edges, the route determiner 121 calculates the sum of the expected number of evasions of the plurality of edges included in the nth candidate, and calculates, as the second evaluation value, a value that increases as the calculated sum of the expected number of evasions decreases. The route determiner 121 calculates the second evaluation value in this manner because smaller sums of the expected number of evasions result in fewer times that inertial forces are expected to act on the article due to the unmanned vehicle 900 changing speed or altitude to perform evasive maneuvers while moving on the transport route. In other words, the second evaluation value is calculated in this manner because smaller sums of the expected number of evasions result in fewer times that the article is expected to be subjected to an impact. Here, the impact is expressed by the impulse of the force acting on the article and the time that the force acts on the article.

In the present embodiment, it is described that the route determiner 121 uses, as the calculation method of the second evaluation value, a method in which the reciprocal of a value obtained by adding a predetermined positive constant C to the sum of the expected number of evasions is set as the second evaluation value. The route determiner 121 adds the constant C to the expected number of evasions in order to enable the calculation of the second evaluation value even when the sum of the expected number of evasions is "0." However, the present embodiment is not limited to this method, and any calculation method may be used provided that the route determiner 121 calculates, as the second evaluation value, a positive value that increases as the sum of the expected number of evasions decreases.

Next, in order to calculate the third evaluation value based on the number of direction changes, the route determiner 121 initializes a variable that counts the number of direction changes to a value of "0." Then, the route determiner 121 identifies the plurality of edges included in the nth candidate, and of the identified plurality of edges, considers the first edge that has the node the represents the office as the start node. Next, the route determiner 121 uses the latitude and longitude of the start node and the latitude and longitude of the end node to calculate a vector, which represents the considered edge, from the start node to the end node of the considered edge.

Next, the route determiner 121 considers the next edge that has, as a start node, the end node of the previously considered edge, and calculates a vector that represents the considered edge. Then, on the basis of the vector that represents the considered edge and the vector that represents the previously considered edge, the route determiner 121 calculates the angle at which the traveling direction of the unmanned vehicle 900 changes in order to move from the previously considered edge to the considered edge. Thereafter, when the calculated angle is greater than a setting angle expressed by a variable stored in advance in the information storage unit 190, the route determiner 121 increases the variable that counts the number of direction changes by a value of "1." Next, the route determiner 121 repeats the processing from the step of considering the next edge until the end node of the considered edge is the node that represents the destination.

Thereafter, the route determiner 121 calculates, as the third evaluation value, a value that increases as the value of the variable that counts the number of direction changes decreases. The route determiner 121 calculates the third evaluation value in this manner because fewer numbers of direction changes result in fewer times that the article is subjected to impact due to the unmanned vehicle 900 decelerating prior to changing direction, changing direction, and accelerating after changing direction.

In the present embodiment, it is described that the route determiner 121 uses, as the calculation method of the third evaluation value, a method in which the reciprocal of a value obtained by adding a predetermined positive constant C to the value of the variable that counts the number of direction changes is set as the third evaluation value. However, the present embodiment is not limited to this method, and any method may be used provided that the route determiner 121 calculates, as the third evaluation value, a positive value that increases as the number of direction changes decreases.

After calculating the plurality of evaluation values in step S12, the route determiner 121 reads information stored in advance in the information storage unit 190 as information expressing positive initial values of a plurality of weighting factors used in the weighting of the plurality of evaluation values. Next, the route determiner 121 initializes the plurality of weighting factors to initial values expressed in the read information.

Thereafter, in cases in which the characteristics information included in the transport article information expresses the weak impact resistance, the route determiner 121 does not correct the weighting factor of the first evaluation value based on the total transport distance, and corrects the weighting factor of the second evaluation value based on the degree of congestion and the weighting factor of the third evaluation value based on the number of direction changes to values greater than before the corrections.

The route determiner 121 performs corrections in this manner because, on transport route candidates in which the unmanned vehicle 900 performs evasive maneuvers and direction changes a fewer number of times while transporting the article from the office to the destination, the article is subjected to impact due to evasive maneuvers and direction changes a fewer number of times compared to when evasive maneuvers and direction changes are performed a greater number of times and, as such, are more suited as routes for transporting articles that can only withstand weak impact.

In contrast, in cases in which the characteristics information included in the transport article information expresses the strong impact resistance, the route determiner 121 corrects the weighting factor of the first evaluation value based on the total transport distance to a value greater than before the correction, but does not correct the weighting factor of the second evaluation value based on the degree of congestion and the weighting factor of the third evaluation value based on the number of direction changes.

The route determiner 121 performs corrections in this manner because, even on transport route candidates in which the unmanned vehicle 900 performs evasive maneuvers and direction changes a greater number of times while transporting the article from the office to the destination, transport route candidates with shorter total transport distances have higher transport efficiency than candidates with longer total transport distances and are suitable as routes for transporting articles that can withstand relatively strong impact.

Furthermore, when the characteristics information included in the transport article information expresses the standard impact resistance, the weighting factors of the first to third evaluation values are not corrected (step S14).

Then, the route determiner 121 calculates an overall evaluation value of the nth candidate by weighting the plurality of evaluation values calculated in step S12 with the plurality of weighting factors corrected in step S14 (step S15).

Thereafter, the route determiner 121 increases the value of the variable n by "1" (step S16) and, then, determines whether or not the value of the variable n is greater than the total number N of the transport route candidates (step S17). Here, if the route determiner 121 determines that the value of the variable n is less than or equal to the total number N of the candidates (step S17; No), the route determiner 121 determines that all of the overall evaluation values of the candidates are not calculated and repeats the processing from step S12. In contrast, if the route determiner 121 determines that the value of the variable n is greater than the total number N of the candidates (step S17; Yes), the execution of the evaluation value calculation processing is ended.

After the execution of the evaluation value calculation processing in step S03 of FIG. 3, the route determiner 121 determines the transport route on the basis of the N overall evaluation values calculated for each of the N candidates (step S04). In the present embodiment, it is described that, of the N overall evaluation values, the candidate for which the highest overall evaluation value is calculated is determined as the transport route. However, the present embodiment is not limited thereto, and the route determiner 121 may determine, as the transport route, a candidate for which the mth highest overall evaluation value (where $2 \leq m \leq N$) is calculated, or a candidate randomly selected from the N candidates.

Next, the operating mode determiner 122 acquires, from the operating mode table of FIG. 8, the operating mode information associated with the characteristics information included in the transport article information, and determines the operating mode expressed in the acquired operating mode information as the operating mode for when the unmanned vehicle 900 moves on the transport route carrying the article (step S05).

Thereafter, the generator 130 generates the transport route information that is information expressing the transport route determined in step S04 and that includes information expressing the latitude and longitude of each of the plurality of nodes included in the transport route, and an order in which the unmanned vehicle 900 passes each of the plurality of nodes when the unmanned vehicle 900 moves forward on the transport route. Next, the generator 130 generates transport control information that includes the generated transport route information and the operating mode information expressing the operating mode determined in step S05, and that causes the unmanned vehicle 900 to move on the transport route in the operating mode (step S06). Thereafter, the generator 130 adds, to the transport control information, a vehicle ID that identifies the unmanned vehicle 900 as information that identifies the sending destination of the transport control information, and outputs the transport control information to the controller 140.

Next, the controller 140 sets the transport control information generated by the generator 130 as a control command and, then, outputs the control command to the communication circuit 104 illustrated in FIG. 2 (step S07). As a result, the controller 140 controls the unmanned vehicle 900 so as to transport the article on the basis of the transport control information.

Then, after the communication circuit 104 sends the control command to the unmanned vehicle 900, the controller 140 ends the execution of the transport control processing.

Figure 10:
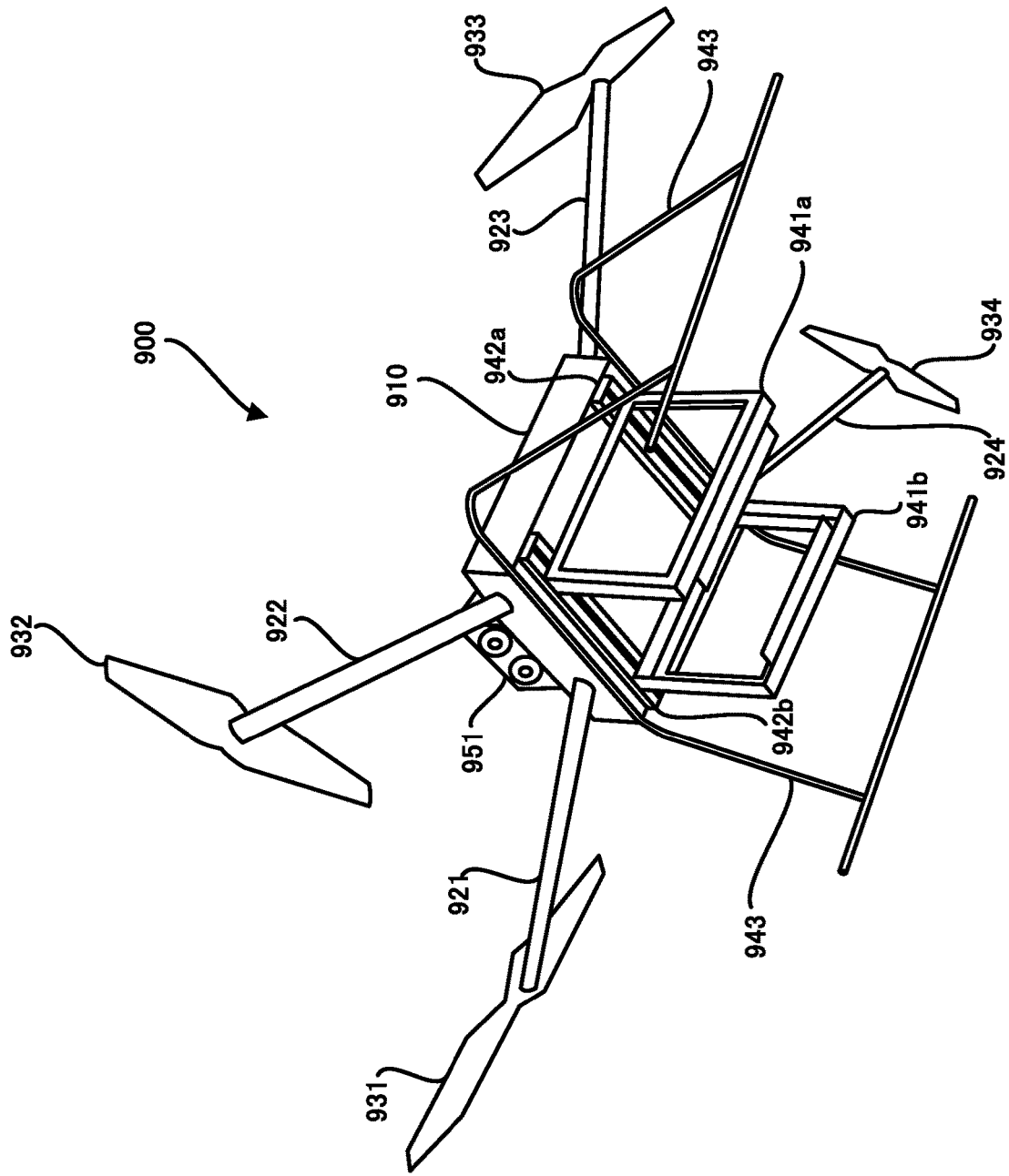
FIG. 10 is an appearance configuration drawing illustrating an example of the appearance of an unmanned vehicle according to Embodiment 1.

The unmanned vehicle 900 illustrated in FIG. 1 includes a control device 910 that has a rectangular parallelepiped shape, such as illustrated in FIG. 10. The control device 910 controls the attitude and the flight of the unmanned vehicle 900. The unmanned vehicle 900 includes propeller arms 921, 922 and 923, 924 that respectively protrude forward to the right and forward to the left from the front face of the control device 910, and backward to the left and backward to the right from the back face of the control device 910. Furthermore, the unmanned vehicle 900 includes propellers 931 to 934 that are installed on tips of the propeller arms 921 to 924, and non-illustrated motors that rotate the propellers 931 to 934 in accordance with the control of the control device 910.

The unmanned vehicle 900 includes, beneath the control device 910, a first holding frame 941a that surrounds and holds four sides of one side face (hereinafter referred to as "first surrounded face") of the parallelepiped shaped cardboard in which the article is packaged, and a second holding frame 941b that surrounds and holds four sides of a side face (hereinafter referred to as "second surrounded face") opposite the first surrounded face surrounded and held by the first holding frame 941a. Furthermore, the unmanned vehicle 900 includes, on a bottom surface of the control device 910, guide rails 942a and 942b that extend in a normal direction of the first surrounded face and the second surrounded face of the article, suspend the first holding frame 941a and the second holding frame 941b, and have the movement direction of the first holding frame 941 and the second holding frame 941b as the extending direction.

Furthermore, the unmanned vehicle 900 includes a non-illustrated motor that causes the first holding frame 941a and the second holding frame 941b to surround and hold the article by moving, in accordance with the control of the control device 910, the first holding frame 941a and the second holding frame 941b in directions so as to approach each other. Furthermore, the non-illustrated motor causes the first holding frame 941a and the second holding frame 941b to release the surrounded and held article by moving, in accordance with the control of the control device 910, the first holding frame 941a and the second holding frame 941b in directions so as to separate from each other.

Furthermore, the unmanned vehicle 900 includes a support leg 943 that protrudes downward from the bottom surface of the control device 910 and that supports the control device 910. The length in the vertical direction of the support leg 943 is designed to be longer, by a predetermined length, than the length in the vertical direction of the first holding frame 941a and the second holding frame 941b. The support leg 943 is designed in this manner to prevent the first holding frame 941a and the second holding frame 941b, and the article surrounded and held by the first holding frame 941a and the second holding frame 941b, from colliding with the ground or the floor of the landing point when the unmanned vehicle 900 lands.

Furthermore, the unmanned vehicle 900 includes an imaging device 951 that is provided on the top surface of the control device 910 and that has an optical axis that is directed in front of the unmanned vehicle 900. The imaging device 951 is implemented as a digital stereo camera. The imaging device 951 performs imaging in accordance with signals output from the control device 910, and outputs, to the control device 910, information expressing two captured images that have parallax with each other. The imaging device 951 outputs this sort of information to the control device 910 so that the control device 910 can identify, on the basis of the parallax, the positional coordinates in three-dimensional space, the size, and the like of obstacles in front of the unmanned vehicle 900.

Figure 11:
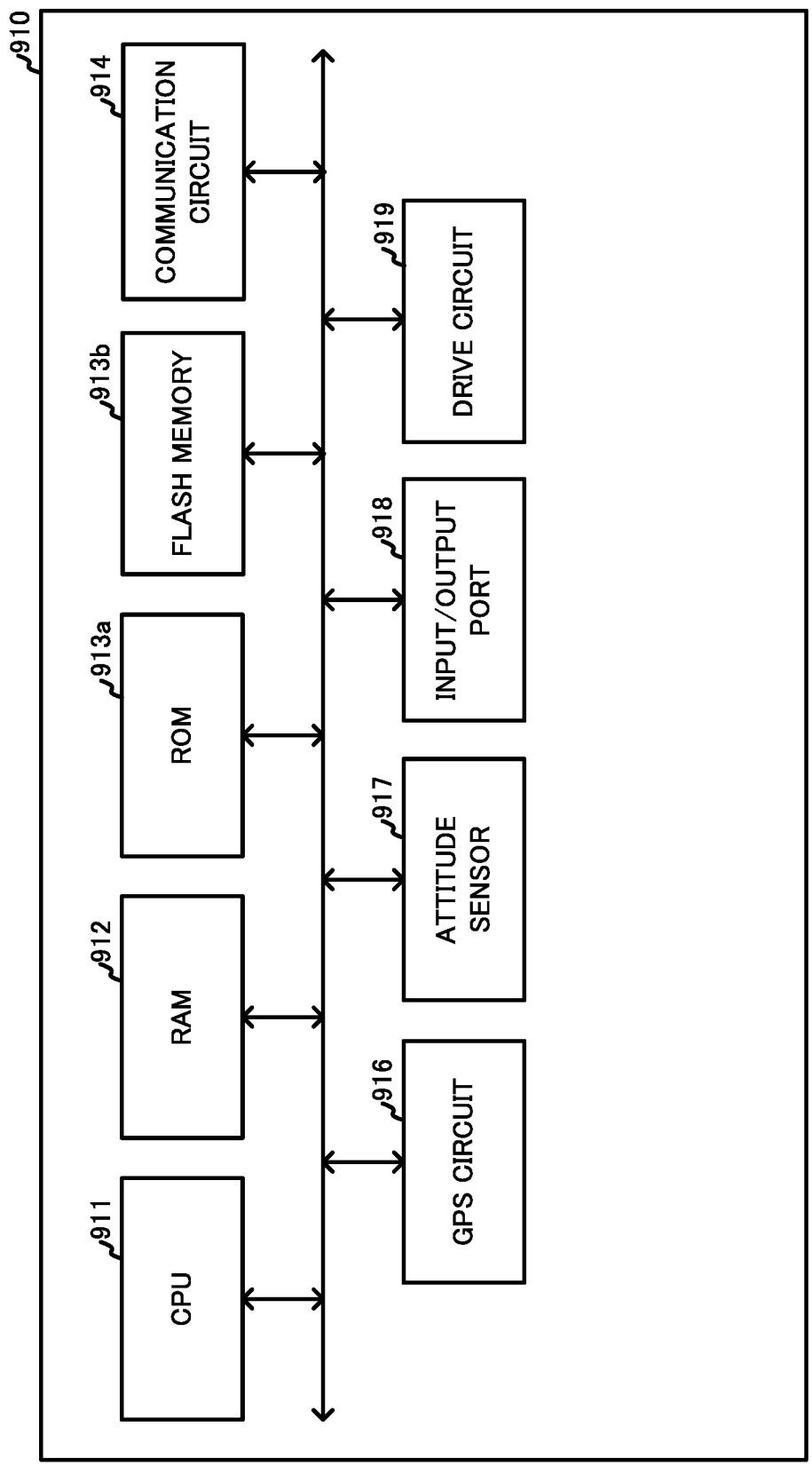
FIG. 11 is a hardware configuration diagram illustrating a configuration example of a control device of the unmanned vehicle.

As illustrated in FIG. 11, the control device 910 includes a CPU 911, a RAM 912, a ROM 913a, a flash memory 913b, a communication circuit 914, a global positioning system (GPS) circuit 916, an attitude sensor 917, an input/output port 918, and a drive circuit 919. The configurations and the functions of the CPU 911, the RAM 912, the ROM 913a, and the communication circuit 914 of the control device 910 are the same as the configurations and the functions of the CPU 101, the RAM 102, the ROM 103a, and the communication circuit 104 of the control device 100 illustrated in FIG. 2.

Various types of programs, various types of data used in the execution of the programs, and tables in which the data is stored are stored in advance in the flash memory 913b. The control device 910 may include a hard disk instead of the flash memory 913b.

The GPS circuit 916 receives a GPS signal emitted from a GPS satellite, measures, on the basis of the emitted GPS signal, the latitude and longitude expressing the location of the unmanned vehicle 900, and outputs a signal expressing the measured latitude and longitude. In one example, the attitude sensor 917 is implemented as a gyroscope. The attitude sensor 917 detects an angle between the normal direction of the bottom face of the control device 910 and the vertical direction, and outputs a signal expressing the detected angle. The attitude sensor 917 detects the angle between the normal direction of the bottom face of the control device 910 and the vertical direction so that the first holding frame 941a and the second holding frame 941b hold the cardboard so that the bottom face of the parallelepiped shaped cardboard, in which the article is packaged, and the bottom face of the control device 910 are substantially parallel.

The input/output port 918 is connected to a non-illustrated cable that is connected to the imaging device 951, outputs, to the imaging device 951, the signals output by the CPU 911, and inputs, into the CPU 911, the signals output by the imaging device 951.

The drive circuit 919 is connected to non-illustrated cables that are connected to each of the non-illustrated motors that rotate the propellers 931 to 934 illustrated in FIG. 10, and a cable that is connected to the non-illustrated motor that moves the first holding frame 941a and the second holding frame 941b. The drive circuit 919 drives, in accordance with the signals output by the CPU 911, the non-illustrated motors that rotate the propellers 931 to 934 or the non-illustrated motor that moves the first holding frame 941a and the second holding frame 941b.

Figure 12:
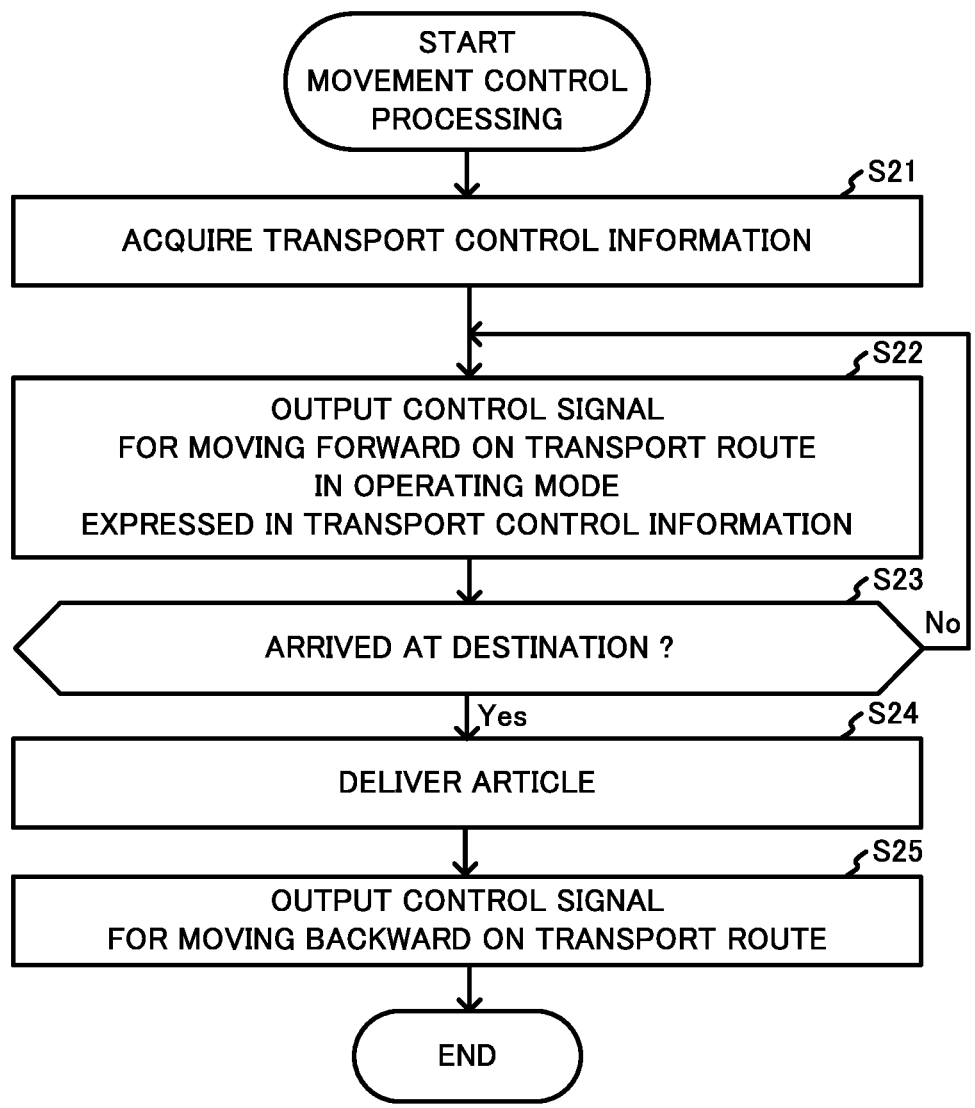
FIG. 12 is a flowchart illustrating movement control processing executed by the unmanned vehicle according to Embodiment 1.

When the communication circuit 914 of the control device 910 of the unmanned vehicle 900 receives a control command sent from the control device 100, the CPU 911 of the control device 910 executes movement control processing such as illustrated in FIG. 12 that causes the unmanned vehicle 900 to move in accordance with the control command.

When the CPU 911 starts the execution of the movement control processing, the CPU 911 acquires from the communication circuit 914 the transport control information, which includes the transport route information and the operating mode information, received as the control command (step S21).

Next, the CPU 911 generates a control signal that controls the propellers 931 to 934 illustrated in FIG. 10 so as to cause the unmanned vehicle 900 to fly forward on the transport route expressed in the transport route information and in operating mode expressed in the operating mode information that are included in the transport control information.

To ensure stable flight that has a small amount of shaking and tilting, the CPU 911 acquires signals output from the attitude sensor 917, and generates a control signal that reduces the angle between the vertical direction and the normal direction of the bottom face of the control device 910 expressed in the acquired signal.

To avoid an obstacle, the CPU 911 outputs a signal commanding the imaging device 951, which has the optical axis directed in front of the unmanned vehicle 900, to perform imaging and, thereafter, acquires, from the imaging device 951, information expressing the captured images.

Next, the CPU 911 identifies the distance to the obstacle and the size of the obstacle on the basis of the parallax of the captured images expressed in the acquired information, and generates, on the basis of the identified distance and size, a control signal for avoiding the obstacle.

To cause the unmanned vehicle 900 to operate in the operating mode expressed in the operating mode information, the CPU 911 generates control signals that cause the unmanned vehicle 900 to accelerate, decelerate, and change directions at an acceleration lower than the acceleration limit expressed in the operating mode information, and ascend, fly level, descend, and change directions at a speed slower than the speed limit expressed in the operating mode information.

To cause the unmanned vehicle 900 to move forward on the transport route expressed in the transport route information, the CPU 911 acquires, from the transport route information, information expressing the latitudes and longitudes of the plurality of nodes included in the transport route. Next, the CPU 911 acquires a signal from the GPS circuit 916, and generates a control signal that causes the unmanned vehicle 900 to fly so as to reduce the difference between the latitude and longitude of the unmanned vehicle 900 expressed in the acquired signal and the latitude and longitude expressed in the acquired information, specifically, the latitude and longitude of the closest node of the plurality of un-passed nodes. Thereafter, the CPU 911 outputs the generated control signal to the drive circuit 919 that drives the non-illustrated motors that rotate the propellers 931 to 934 (step S22).

Thereafter, the CPU 911 calculates, on the basis of the signal output from the GPS circuit 916 and the acquired transport route information, the difference between the latitude and longitude of the unmanned vehicle 900 and the latitude and longitude of the node expressing the end point of the transport route (that is, the destination). Next, the CPU 911 determines, on the basis of whether or not the difference between the latitude and longitude of the unmanned vehicle 900 and the latitude and longitude of the node expressing the destination is less than or equal to a predetermined value, whether or not the unmanned vehicle 900 has arrived at the destination (step S23).

In step S23, in a case in which the difference is greater than the predetermined value and, accordingly, it is determined that the unmanned vehicle 900 has not arrived at the destination (step S23; No), the CPU 911 repeats the steps from step S22.

In contrast, in a case in which the difference is less than or equal to the predetermined value and, accordingly, it is determined that the unmanned vehicle 900 has arrived at the destination (step S23; Yes), the CPU 911 generates and outputs, to the drive circuit 919, a control signal that controls the propellers 931 to 934 so as to cause the unmanned vehicle 900 to land. Then, the CPU 911 generates and outputs, to the drive circuit 919, a control signal that causes the first holding frame 941a and the second holding frame 941b to move in directions so as to separate from each other, thereby causing the first holding frame 941a and the second holding frame 941b to release the article. Thus, the article is delivered (step S24).

Thereafter, the CPU 911 of the unmanned vehicle 900 outputs, to the drive circuit 919, a control signal that causes the unmanned vehicle 900 to fly on the transport route back to the office (step S25), and ends the execution of the movement control processing.

According to these configurations, the acquirer 110 of the control device 100 acquires the transport article information that expresses the characteristics of the article to be transported, and the generator 130 generates, on the basis of the characteristics expressed in the acquired transport article information, the transport control information that causes the unmanned vehicle 900 to transport the article. As such, the control device 100 can generate transport control information that causes the unmanned vehicle 900 to perform transportation better suited to the characteristics of the article. Additionally, the controller 140 of the control device 100 carries out control, on the basis of the transport control information generated by the generator 130, that causes the unmanned vehicle 900 to transport the article. As such, the control device 100 can cause the unmanned vehicle 900 to perform transportation better suited to the characteristics of the article.

According to these configurations, the characteristics of the article include the impact resistance of the article. Therefore, the control device 100 can cause the unmanned vehicle 900 to perform transportation that corresponds to the impact resistance of the article and, as such, can prevent the state of the article from changing to a state that differs from the state before transport due to impacts applied to the article during transport.

According to these configurations, the route determiner 121 of the control device 100 determines, on the basis of the characteristics of the article expressed in the transport article information acquired by the acquirer 110, the transport route on which the unmanned vehicle 900 transports the article. Additionally, the generator 130 of the control device 100 generates the transport control information that includes the transport route information that expresses the transport route determined by the route determiner 121, and that causes the unmanned vehicle 900 to move on the transport route. As such, the control device 100 can generate transport control information that causes the unmanned vehicle 900 to move on a transport route better suited to the characteristics of the article.

In a case in which the transport article information expresses impact resistance indicating that only weaker impact can be withstood, the route determiner 121 of the control device 100 determines, as the transport route, a route with a fewer number of direction changes of the unmanned vehicle 900, a route that is less congested, or a route with a fewer number of direction changes and that is less congested. As such, the control device 100 can determine, as the transport route of an article that can only withstand weaker impact, a route on which inertial forces act on the article due to direction changes and evasive maneuvers fewer times. For example, the control device 100 can determine, as the transport route of an article that can only withstand weaker impart, a route on which there is low possibility of the article being subjected to impact due to the unmanned vehicle 900 coming in contact with an unmanned vehicle other than the unmanned vehicle 900 or with an animal such as a bird. Therefore, the control device 100 can cause the unmanned vehicle 900 to perform transportation that corresponds to the impact resistance of the article and, as such, can prevent the state of the article from changing to a state that differs from the state before transport due to the transport of the article.

Furthermore, in a case in which the transport article information expresses impact resistance indicating that stronger impact can be withstood, the route determiner 121 determines, as the transport route, a route for which the total transport distance is shorter. As such, in addition to being able to cause the unmanned vehicle 900 to perform transportation that corresponds to the impact resistance of the article, the control device 100 can also improve the transport efficiency of the article.

According to these configurations, the operating mode determiner 122 of the control device 100 determines, on the basis of the characteristics of the article expressed in the transport article information acquired by the acquirer 110, the operating mode related to behavior for when the unmanned vehicle 900 moves on the transport route while carrying the article. The generator 130 of the control device 100 generates the transport control information that includes the operating mode information that expresses the operating mode determined by the operating mode determiner 122, and that causes the unmanned vehicle 900 to move on the transport route in that operating mode. As such, the control device 100 can generate transport control information that causes the unmanned vehicle 900 to move with behavior better suited to the characteristics of the article.

In a case in which the transport article information expresses impact resistance indicating that only weaker impact can be withstood, the operating mode determiner 122 of the control device 100 determines to lower the speed limit imposed on the unmanned vehicle 900. The speed limit is imposed on each of the ground speed or the airspeed of the unmanned vehicle 900, and on the angular velocity at which the azimuth angle of the traveling direction of the unmanned vehicle 900 changes. As such, the control device 100 can cause the unmanned vehicle 900, which is carrying an article that has weaker impact resistance, to fly and change directions at slower speeds.

In a case in which the transport article information expresses weaker impact resistance, the operating mode determiner 122 of the control device 100 determines to lower the acceleration limit imposed on the unmanned vehicle 900. Furthermore, the acceleration limit is imposed on the ground speed acceleration or the airspeed acceleration, and on the angular velocity acceleration of the unmanned vehicle 900 when the unmanned vehicle 900 is flying and changing directions. As such, the control device 100 can cause the unmanned vehicle 900, which is carrying an article that has weaker impact resistance, to decelerate, change directions, and accelerate more gradually. Therefore, the control device 100 can prevent changes in the state of the article due to the behavior of the unmanned vehicle 900 that is transporting the article.

In a case in which the transport article information expresses impact resistance indicating that stronger impact can be withstood, the operating mode determiner 122 determines to raise the speed limit and raise the acceleration limit. As a result, the control device 100 can improve the transport efficiency of the article.

Modified Example 1 of Embodiment 1

In Embodiment 1, it is described that the information expressing the operating mode includes information expressing the name of the operating mode, information expressing the speed limit, and information expressing the acceleration limit. However, Embodiment 1 is not limited thereto. The information expressing the operating mode may include an operating mode ID that identifies the operating mode.

In this case, the flash memory 913b of the unmanned vehicle 900 illustrated in FIG. 11 may store, in advance, a non-illustrated table that includes a plurality of records in which the operating mode ID that identifies the operating mode, the information expressing the speed limit of the operating mode, and the information expressing the acceleration limit are associated and stored in advance.

In step S22 of FIG. 12, the CPU 911 of the control device 910 of the unmanned vehicle 900 may acquire the operating mode information from the transport control information acquired by the acquirer 110, and acquire, from the non-illustrated table the information expressing the speed limit and the information expressing the acceleration limit that are associated with the operating mode ID included in the acquired operating mode information. Thereafter, the CPU 911 may generate and output a control signal that causes the unmanned vehicle 900 to move forward on the transport route by flying level or the like at a speed slower than the speed limit while accelerating or the like at an acceleration lower than the acceleration limit expressed in the acquired information.

Modified Example 2 of Embodiment 1

In Embodiment 1, it is described that the CPU 101 of the control device 100 illustrated in FIG. 2 executes the transport control processing illustrated in FIG. 3 to function as the generator 130 that generates the transport control information that includes the operating mode information expressing the operating mode determined on the basis of the characteristics of the article and that causes the unmanned vehicle 900 to move on the transport route in that operating mode.

Figure 13:
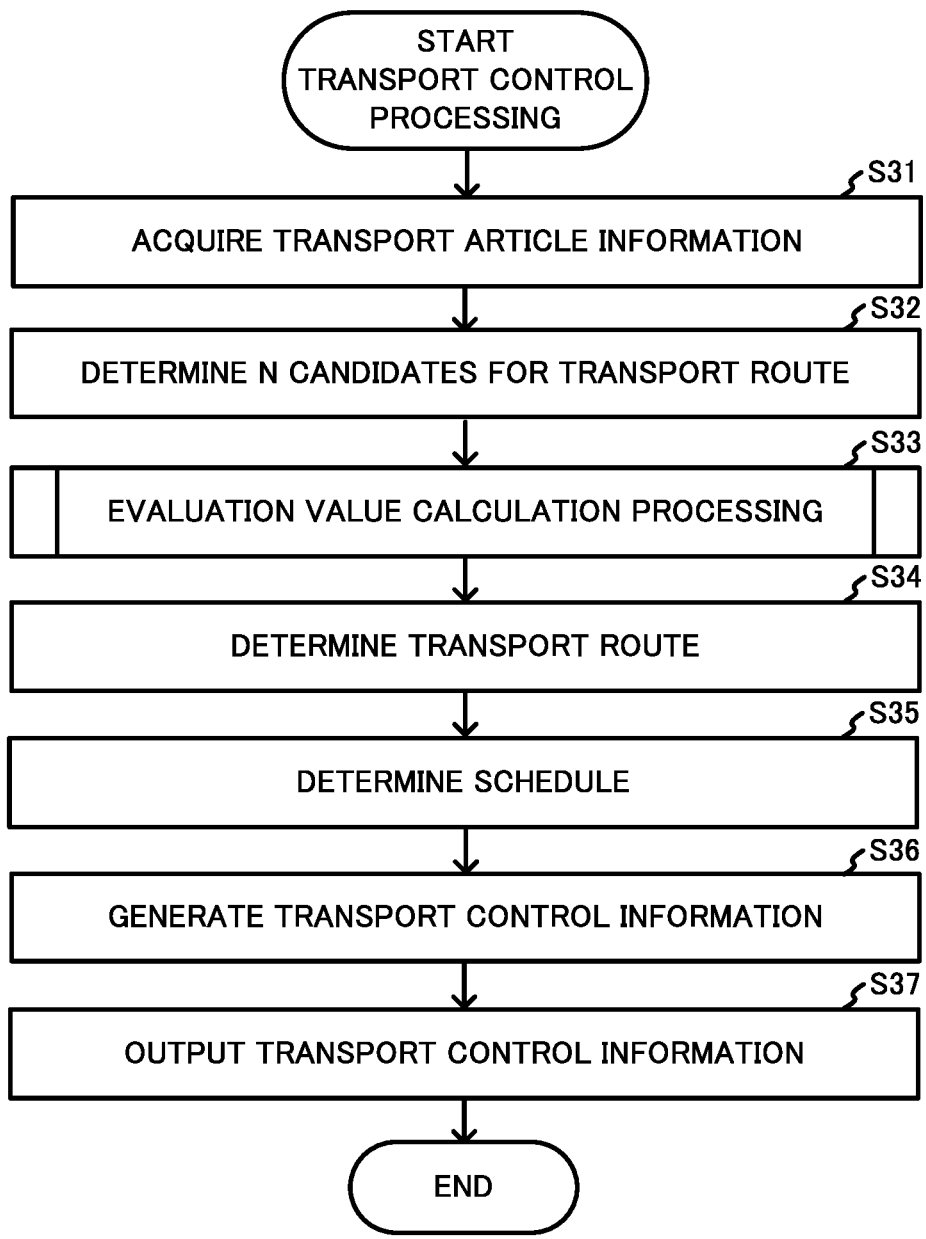
FIG. 13 is a flowchart illustrating an example of transport control processing executed by the control device of the transport system according to Modified Example 2 of Embodiment 1.
Figure 14:
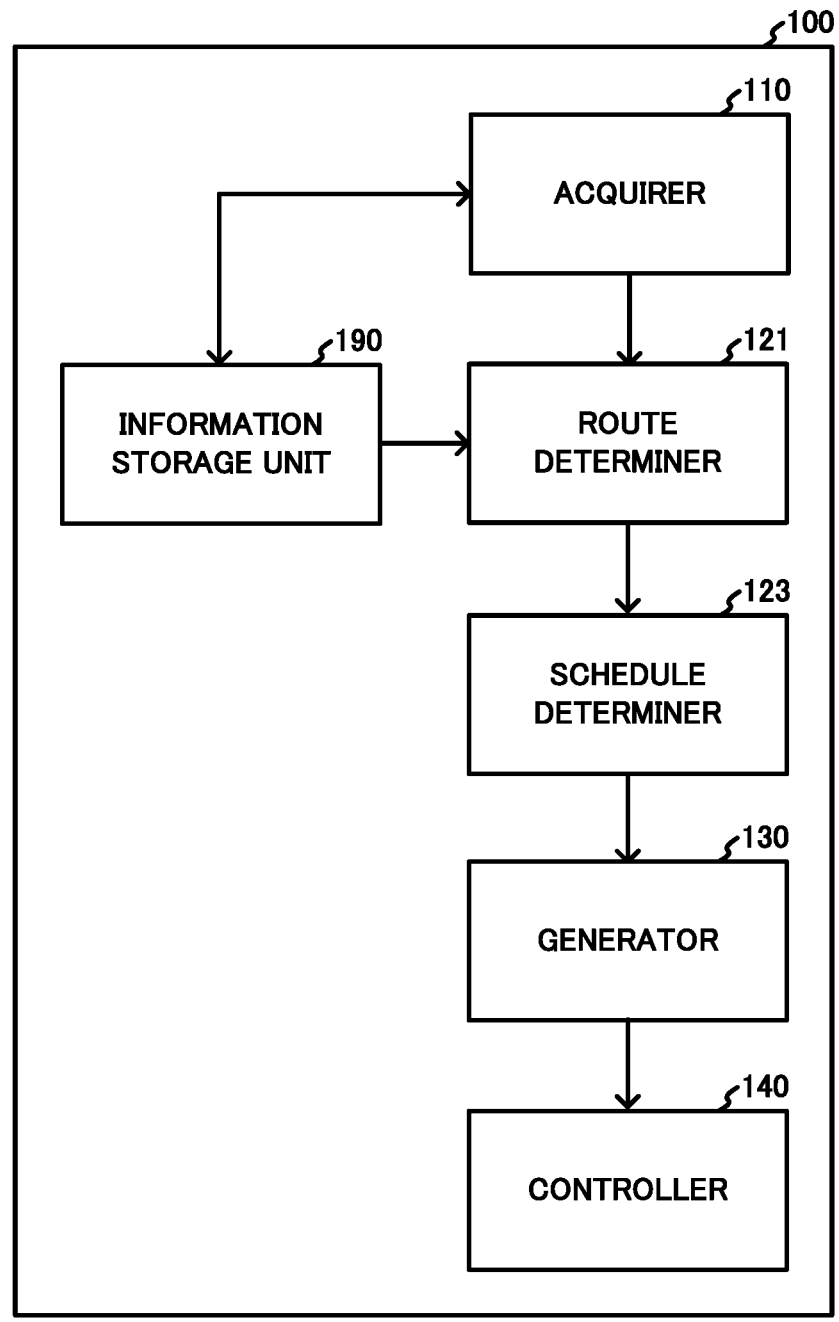
FIG. 14 is a functional block diagram illustrating an example of the functions of the control device of the transport system according to Modified Example 2 of Embodiment 1.

However, Embodiment 1 is not limited thereto, and the CPU 101 of the control device 100 according to the present modified example executes transport control processing such as illustrated in FIG. 13. As a result of this processing, the CPU 101 functions as a schedule determiner 123 such as illustrated in FIG. 14 that determines, on the basis of the characteristics of the article expressed in the transport article information acquired by the acquirer 110, a transport time for the unmanned vehicle 900 to move on the transport route determined by the route determiner 121 and transport the article. Additionally, the CPU 101 functions as a generator 130 that generates transport control information that includes transport time information expressing the transport time determined by the schedule determiner 123, and that causes the unmanned vehicle 900 to move on the transport route within the transport time.

When the execution of the transport control processing of FIG. 13 starts, the acquirer 110 and the route determiner 121 of the control device 100 according to the present modified example execute processing (steps S31 to S34) similar to steps S01 to S04 of FIG. 4 to acquire the transport article information about the article to be transported and determine the transport route on the basis of the characteristics of the article expressed in the transport article information.

Next, the schedule determiner 123 acquires information expressing the standard speed, which is stored in advance in the information storage unit 190, and initializes the value of a variable representing the movement speed, which is set in the unmanned vehicle 900, to the predetermined standard speed. The movement speed of the unmanned vehicle 900 includes the ground speed or the airspeed of the unmanned vehicle 900 when ascending, when in level flight, and when descending, and the angular velocity at which the azimuth angle of the traveling direction of the unmanned vehicle 900 changes when changing directions.

Next, the schedule determiner 123 changes the value of the variable representing the movement speed on the basis of the characteristics information included in the transport article information. In order to accomplish this, in a case in which the characteristics information expresses the weak impact resistance, the schedule determiner 123 changes the value of the variable representing the movement speed to a speed slower than the standard speed. The schedule determiner 123 performs such a change because the inertial forces acting on the article due to evasive maneuvers and changing directions are smaller when the unmanned vehicle 900 moves at a speed slower than the standard speed than when moving at the standard speed.

In contrast, in a case in which the characteristics information expresses the strong impact resistance, the schedule determiner 123 changes the value of the variable representing the movement speed to a speed faster than the standard speed. The schedule determiner 123 performs such a change because the transport efficiency is greater when the unmanned vehicle 900 moves at a speed faster than the standard speed than when moving at the standard speed.

Furthermore, in a case in which the characteristics information expresses the standard impact resistance, the schedule determiner 123 does not change the value of the variable representing the set speed.

Next, the schedule determiner 123 divides the total transport distance of the transport route by the changed movement speed to determine, as the schedule of the unmanned vehicle 900, the transport time for the unmanned vehicle 900 to move on the transport route and transport the article (step S35).

Thereafter, the generator 130 generates transport control information that includes the transport route information expressing the transport route determined in step S34 and the schedule information expressing the transport time determined in step S35, and that causes the unmanned vehicle 900 to move on that transport route within that transport time (step S36).

Thereafter, the controller 140 outputs the transport control information by executing the same processing as step S07 of FIG. 3 (step S37) and, then, ends the execution of the transport control processing.

Figure 15:
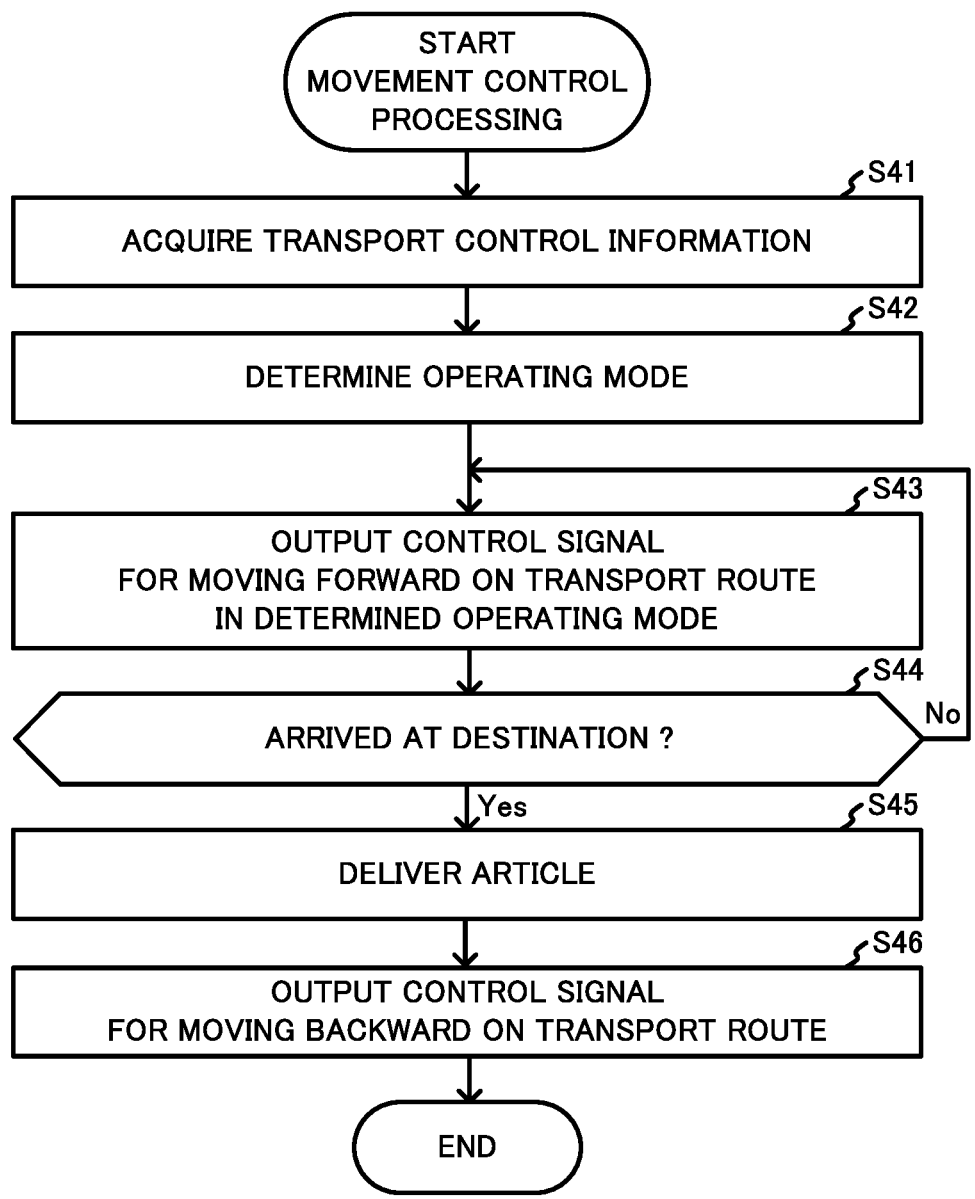
FIG. 15 is a flowchart illustrating movement control processing executed by the unmanned vehicle according to Modified Example 2 of Embodiment 1.

The operating mode table illustrated in FIG. 8 is stored in advance in the flash memory 913b of the unmanned vehicle 900 according to the present modified example. When the communication circuit 914 of the unmanned vehicle 900 according to the present modified example receives the transport control information from the control device 100, the CPU 911 of the unmanned vehicle 900 executes movement control processing such as illustrated in FIG. 15.

When the execution of the movement control processing starts, the CPU 911 acquires, from the communication circuit 914, the transport control information that includes the transport route information and the schedule information (step S41).

Next, the CPU 911 of the unmanned vehicle 900 divides the total transport distance of the transport route expressed in the transport route information by the transport time expressed in the schedule information to calculate the slowest speed at which the unmanned vehicle 900 can move on the transport route within the transport time. Thereafter, the CPU 911 acquires, from the operating mode table of FIG. 8, operating mode information that expresses the slowest speed limit that is faster than the calculated speed. Thereafter, the CPU 911 determines the operating mode expressed in the acquired operating mode information as the operating mode related to behavior for when the unmanned vehicle 900 moves on the transport route (step S42).

Thereafter, the CPU 911 of the unmanned vehicle 900 executes the same processing (steps S43 to S46) as steps S22 to S25 of FIG. 12 to transport the article to the destination in the determined operating mode and, then, ends the execution of the movement control processing.

According to these configurations, the schedule determiner 123 of the control device 100 determines, on the basis of the characteristics of the article expressed in the transport article information acquired by the acquirer 110, the transport time for the unmanned vehicle 900 to move on the transport route and transport the article. Additionally, the generator 130 of the control device 100 generates the transport control information that includes the transport time information expressing the transport time determined by the schedule determiner 123, and that causes the unmanned vehicle 900 to move on the transport route within the transport time. As such, the control device 100 can generate transport control information that causes the unmanned vehicle 900 to move at a speed better suited to the characteristics of the article.

In a case in which the transport article information expresses impact resistance indicating that only weaker impact can be withstood, the schedule determiner 123 of the control device 100 determines to lengthen the transport time. In contrast, in a case in which the transport article information expresses impact resistance that indicates stronger impact can be withstood, the schedule determiner 123 determines to shorten the transport time. As a result, the control device 100 can improve the transport efficiency of the article while preventing the state of the article from changing due to impact.

Modified Example 3 of Embodiment 1

In Embodiment 1, it is described that the CPU 101 of the control device 100 illustrated in FIG. 2 executes the transport control processing illustrated in FIG. 3 to function as the generator 130 that generates the transport control information that includes the operating mode information expressing the operating mode determined on the basis of the characteristics of the article and that causes the unmanned vehicle 900 to move on the transport route in that operating mode.

However, Embodiment 1 is not limited thereto, and the CPU 101 of the control device 100 according to the present modified example executes transport control processing such as illustrated in FIG. 13. As a result of this processing, the CPU 101 functions as a schedule determiner 123 such as illustrated in FIG. 14 that determines, on the basis of the characteristics of the article expressed in the transport article information acquired by the acquirer 110, an end time at which the unmanned vehicle 900 moves on the transport route determined by the route determiner 121 and completes the transportation of the article. Additionally, the CPU 101 functions as a generator 130 that generates transport control information that includes schedule information expressing the end time determined by the schedule determiner 123, and that causes the unmanned vehicle 900 to move on the transport route by the end time.

When the execution of the transport control processing of FIG. 13 starts, processing is executed that is the same as steps S31 to S34 described in Modified Example 2 of Embodiment 1 (steps S31 to S34). As a result, the acquirer 110 and the route determiner 121 of the control device 100 according to the present modified example acquire the transport article information about the article to be transported and determine the transport route on the basis of the characteristics of the article expressed in the transport article information.

Next, the schedule determiner 123 executes the same processing as step S35 described in Modified Example 2 of Embodiment 1 to determine, on the basis of the determined transport route and the characteristics of the article expressed in the transport article information, the transport time for the unmanned vehicle 900 to move on the transport route and transport the article. Next, in one example, the schedule determiner 123 acquires a system time that is managed by the operating system (OS) and, determines, as the transport schedule of the article, a time obtained by adding the transport time to the system time as the end time (step S35).

Thereafter, the generator 130 generates transport control information that includes the schedule information expressing the end time determined in step S35 and the transport route information expressing the transport route determined in step S34, and that causes the unmanned vehicle 900 to move on the transport route by the end time (step S36).

Thereafter, the controller 140 outputs the transport control information by executing the same processing as step S07 of FIG. 3 (step S37) and, then, ends the execution of the transport control processing.

The operating mode table illustrated in FIG. 8 is stored in advance in the flash memory 913b of the unmanned vehicle 900 according to the present modified example. When the communication circuit 914 of the unmanned vehicle 900 according to the present modified example receives the transport control information from the control device 100, the CPU 911 of the unmanned vehicle 900 executes the movement control processing illustrated in FIG. 15.

When the execution of the movement control processing starts, the CPU 911 acquires, from the communication circuit 914, the transport control information that includes the transport route information and the schedule information (step S41).

Next, for example, the CPU 911 of the unmanned vehicle 900 acquires the system time that is managed by the OS. Thereafter, the CPU 911 subtracts the acquired system time from the end time expressed in the acquired schedule information to calculate the transport time for the unmanned vehicle 900 to transport the article on the transport route expressed in the acquired transport route information.

Thereafter, the CPU 911 of the unmanned vehicle 900 carries out the same processing as described in Modified Example 2 of Embodiment 1 to determine the operating mode using the total transport distance of the transport route expressed in the transport route information, the calculated transport time, and the operating mode table of FIG. 8 (step S42).

Thereafter, the CPU 911 of the unmanned vehicle 900 executes the same processing (steps S43 to S46) as steps S22 to S25 of FIG. 12, transports the article to the destination in the determined operating mode and, then, ends the execution of the movement control processing.

According to these configurations, the schedule determiner 123 of the control device 100 determines, on the basis of the characteristics of the article expressed in the transport article information acquired by the acquirer 110, the end time at which the unmanned vehicle 900 completes the transportation of the article. As such, the control device 100 can determine, as the end time, a time at which the unmanned vehicle 900 can complete the transportation of the article in a case in which the unmanned vehicle 900 moves at a speed better suited to the characteristics of the article to be transported.

Additionally, the generator 130 of the control device 100 generates the transport control information that includes the schedule information expressing the end time determined by the schedule determiner 123, and that causes the unmanned vehicle 900 to move on the transport route by the end time.

As such, the control device 100 can generate transport control information that causes the unmanned vehicle 900 to move at a speed better suited to the characteristics of the article.

Modified Example 4 of Embodiment 1

In Embodiment 1, it is described that, as illustrated in FIG. 4, the transport article information, which is information about the article to be transported, includes the article ID of the article to be transported, the destination information that expresses the destination of the article, and the characteristics information that expresses the characteristics of the article. Additionally, it is described that the CPU 101 of the control device 100 executes the transport control processing illustrated in FIG. 3 to function as the generator 130 that generates the transport control information that includes the operating mode information expressing the operating mode determined on the basis of the characteristics of the article and that causes the unmanned vehicle 900 to move on the transport route in that operating mode.

However, Embodiment 1 is not limited thereto and, as illustrated in FIG. 16, the transport article information according to the present modified example includes the article ID, the destination information, and the characteristics information of the article to be transported, and specified time block information expressing a specified time block specified as a delivery time block of the article.

Furthermore, the CPU 101 of the control device 100 according to the present modified example executes transport control processing such as illustrated in FIG. 13 to function as a schedule determiner 123 such as illustrated in FIG. 14 that determines a start time at which the unmanned vehicle 900 starts transporting the article. Here, the start time is determined on the basis of the specified time block and the characteristics of the article expressed in the transport article information acquired by the acquirer 110. The CPU 101 functions as a generator 130 that generates transport control information that causes the unmanned vehicle 900 to start moving at the start time determined by the schedule determiner 123 and, causes the unmanned vehicle 900 to end complete moving on the transport route at a time included in the specified time block expressed in the transport article information. The transport control information generated by the generator 130 includes the transport route information expressing the transport route, and the schedule information expressing the start time and the specified time block.

When the execution of the transport control processing of FIG. 13 starts, as in step S01 of FIG. 3, the acquirer 110 according to the present modified example acquires, on the basis of signals input from the non-illustrated two-dimensional code reader via the input port 108, the article ID, and a URL of a non-illustrated server that is managed by the company that sold the article identified by the article ID or the company running the office. Thereafter, the acquirer 110 generates a request that requests the sending of delivery information, including the read URL and the acquired article ID, that includes the destination information and the type information of the article identified by the article ID, and the specified time block information that expresses the specified time block specified as the time block in which the transportation of the article is to be ended for delivery, and outputs this request to the communication circuit 104 illustrated in FIG. 2.

Thereafter, the acquirer 110 acquires the delivery information from the communication circuit 104, and acquires, from the characteristics table of FIG. 6, the characteristics information associated with the type information included in the acquired delivery information. The acquirer 110 treats as the transport article information the article ID, the destination information and the specified time block information that are included in the delivery information, and the characteristics information acquired from the characteristics table (step S31).

The transport route is determined by executing processing (steps S32 to S34) that is the same as steps S32 to S34 described in Modified Example 2 of Embodiment 1.

Next, the schedule determiner 123 executes the same processing as step S35 described in Modified Example 2 of Embodiment 1 to determine, on the basis of the characteristics of the article expressed in the transport article information and the transport route on which the article is to be transported, the transport time for the unmanned vehicle 900 to move on the transport route and transport the article (step S35).

Next, the schedule determiner 123 selects, randomly or in accordance with a predetermined rule, a time included in the specified time block expressed in the specified time block information acquired in step S31, and determines, as the start time at which the unmanned vehicle 900 starts transporting the article, a time that is the transport time earlier than the selected time. Thereafter, the generator 130 generates schedule information that expresses the determined start time and the specified time block expressed in the transport article information acquired in step S31. Next, the generator 130 generates transport control information that includes the generated schedule information and the transport route information expressing the transport route determined in step S34, causes the unmanned vehicle 900 to start moving at that start time, and causes the unmanned vehicle 900 to complete the movement on the transport route by a time included in the specified time block (step S36).

Thereafter, the controller 140 outputs the transport control information by executing the same processing as step S07 of FIG. 3 (step S37) and, then, ends the execution of the transport control processing.

The operating mode table illustrated in FIG. 8 is stored in advance in the flash memory 913b of the unmanned vehicle 900 according to the present modified example. When the communication circuit 914 of the unmanned vehicle 900 according to the present modified example receives the transport control information from the control device 100, the CPU 911 of the unmanned vehicle 900 executes the movement control processing illustrated in FIG. 15.

When the execution of the movement control processing starts, the CPU 911 acquires, from the communication circuit 914, the transport control information that includes the transport route information and the schedule information (step S41).

Next, the CPU 911 of the unmanned vehicle 900 subtracts the start time from the end time of the specified time block expressed in the acquired schedule information. Thus, the CPU 911 calculates the longest transport time, which is the transport time for a case in which the unmanned vehicle 900 moves in the slowest manner on the transport route expressed in the acquired transport route information, that allows the unmanned vehicle 900 to complete the transportation at a time included in the specified time block.

Thereafter, the CPU 911 of the unmanned vehicle 900 executes the same processing as described in Modified Example 2 of Embodiment 1 to determine the operating mode using the total transport distance of the transport route, the calculated longest transport time, and the operating mode table of FIG. 8 (step S42).

Thereafter, the CPU 911 acquires the system time, and determines whether or not the start time has arrived on the basis of whether or not the difference between the acquired system time and the start time for transport is an amount of time that is shorter than a predetermined amount of time. Here, in a case in which the difference between the system time and the start time is an amount of time that is longer than or equal to the predetermined amount of time and, accordingly, the CPU 911 determines that the start time for transport has not arrived, the CPU 911 sleeps for a predetermined amount of time and, then, repeats the processing from the step of acquiring the system time.

In contrast, in a case in which the CPU 911 determines that the difference between the acquired system time and the start time for transport is an amount of time that is shorter than the predetermined amount of time, the CPU 911 determines that the start time has arrived. Thereafter, the CPU 911 executes the same processing (steps S43 to S46) as steps S22 to S25 of FIG. 12, transports the article to the destination in the determined operating mode and, then, ends the execution of the movement control processing.

According to these configurations, the transport article information acquired by the acquirer 110 of the control device 100 expresses the characteristics of the article and the specified time block specified as the time block in which the transportation of the article is ended. Additionally, the schedule determiner 123 of the control device 100 determines, on the basis of the characteristics and the specified time block that are expressed in the transport article information acquired by the acquirer 110, the start time at which the unmanned vehicle 900 starts the transportation of the article. As such, in a case in which the unmanned vehicle 900 moves at a speed better suited to the characteristics of the article to be transported, the control device 100 can determine a start time for transportation that enables the unmanned vehicle 900 to complete the transportation of the article at a time included in the specified time block.

According to these configurations, the generator 130 of the control device 100 generates the transport control information that includes the schedule information expressing the start time determined by the schedule determiner 123 and the specified time block expressed in the transport article information acquired by the acquirer 110, and that causes the unmanned vehicle 900 to start moving at the start time and, also, causes the unmanned vehicle 900 to complete moving on the transport route at a time included in the specified time block. As such, the control device 100 can generate transport control information that causes the unmanned vehicle 900 to move at a speed better suited to the characteristics of the article.

Modified Example 5 of Embodiment 1

In Embodiment 1, it is described that the unmanned vehicle 900 includes the first holding frame 941a and the second holding frame 941b such as illustrated in FIG. 10 that surround and hold the article. However, Embodiment 1 is not limited thereto.

Figure 17:
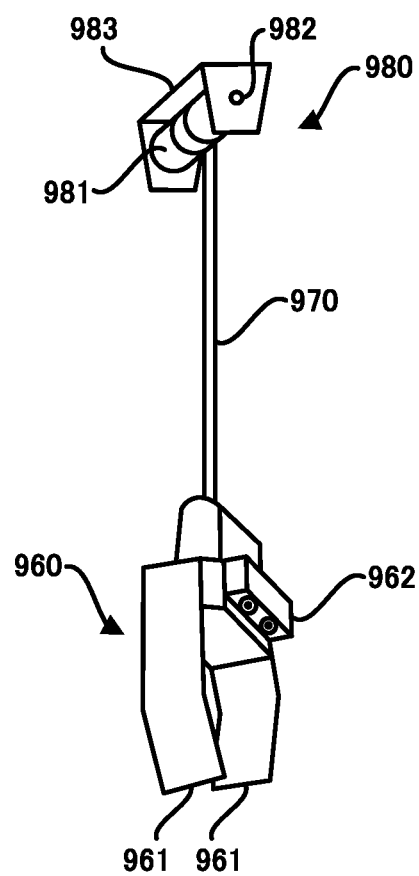
FIG. 17 is an appearance configuration drawing illustrating an example of the appearance of a gripper of an unmanned vehicle.

As illustrated in FIG. 17, the unmanned vehicle 900 according to the present modified example includes, instead of the first holding frame 941a and the second holding frame 941b, a gripper 960 that grips an article, a wire 970 from which the gripper 960 is suspended, and a winch 980 that is installed on the bottom surface of the control device 910 of the unmanned vehicle 900 illustrated in FIG. 10 and that winds and unwinds the wire 970.

The gripper 960 includes two claws 961 that are opened and closed in a substantially parallel manner by a non-illustrated motor, and an imaging device 962 that has an optical axis that is directed toward the tips of the claws 961. The non-illustrated motor is connected to the control device 910 by a non-illustrated cable, and is driven in accordance with signals output from the control device 910. The imaging device 962 is implemented as a digital stereo camera, and is connected to the control device 910 by a non-illustrated cable. The imaging device 962 performs imaging in accordance with signals output from the control device 910 and, thereafter, outputs, to the control device 910, information expressing two captured images that have parallax with each other. The imaging device 962 outputs this sort of information to the control device 910 in order to identify, on the basis of the parallax, the positional coordinates in three-dimensional space, the size, and the like of the article to be gripped by the gripper 960. The gripper 960 may include three or more of the claws 961, and the wire 970 may function as the non-illustrated cable.

The winch 980 includes a drum 981 on which the wire 970 is wound, a support member 983 that supports a protrusion 982 that protrudes outward in substantially the horizontal direction from both side surfaces of the drum 981, and a non-illustrated motor that rotates the drum 981 in a winding direction that winds the wire 970 and an unwinding direction that unwinds the wire 970. The non-illustrated motor is connected to the control device 910 by a non-illustrated cable, and is driven in accordance with signals output from the control device 910.

In the present modified example, the length in the vertical direction of the support leg 943 illustrated in FIG. 10, which supports the control device 910 of the unmanned vehicle 900 from the bottom surface of the control device 910, is designed to be a predetermined length L longer than the sum of the lengths in the vertical direction of the winch 980 installed on the bottom surface of the control device 910 and the gripper 960 suspended from the winch 980. The support leg 943 is designed in this manner to prevent the gripper 960 from colliding with the ground or the floor of the landing point in a case in which the unmanned vehicle 900 lands while the winch 980 is in a completely wound state in which the wire 970 is completely wound.

The input/output port 918 of the control device 910 illustrated in FIG. 11 is connected to the non-illustrated cable that is connected to the imaging device 962 of the gripper 960, outputs, to the imaging device 962, the signals output by the CPU 911, and inputs, into the CPU 911, the signals output by the imaging device 962.

The drive circuit 919 is connected to the non-illustrated cables that are respectively connected to the non-illustrated motor of the gripper 960 and the non-illustrated motor of the winch 980. The drive circuit 919 drives the respective non-illustrated motors of the gripper 960 and the winch 980 in accordance with signals output from the CPU 911.

The unmanned vehicle 900 according to the present modified example uses the gripper 960 and the winch 980 to deliver the article by one of three delivery methods. The first delivery method is a land-and-deliver method in which the unmanned vehicle 900 lands at the destination of the article with the winch 980 in the completely wound state and, then, delivers the article by opening the claws 961 of the gripper 960 that is gripping the article.

In the land-and-deliver method, the article is subjected to an impact corresponding to the length L. In the present modified example, it is described that the length L is preset to a length such that the state of the article will not change or is unlikely to change in cases in which an article that has the standard impact resistance and an article that has the strong impact resistance free falls and collides with, for example, an asphalt or concrete floor or the ground. Additionally, in the present modified example, it is described that the length L is set in advance to a length such that the state of the article will change or is likely to change in cases in which an article that has the weak impact resistance free falls and collides with the floor or the ground.

The second delivery method is a drop-delivery method in which the unmanned vehicle 900 drops the article gripped by the gripper 960 at the destination by opening the claws 961 of the gripper 960 while hovering or circling, for example, at a predetermined height H with the winch 980 in the completely wound state. In the present modified example, it is described that the height H is set in advance to a height such that the state of the article will not change or is unlikely to change in cases in which an article that has the strong impact resistance free falls and collides with the floor or the ground. Additionally, in the present modified example, it is described that the height H is set in advance to a height such that the state of the article will change or is likely to change in cases in which an article that has the weak impact resistance or the standard impact resistance free falls and collides with the floor or the ground.

The third delivery method is a suspended-delivery method in which, while hovering at a predetermined height, the unmanned vehicle 900 unwinds the wire 970 using the winch 980 to lower the article at a predetermined speed V and, then, after the article contacts the floor or the ground, or is held by a recipient, opens the claws 961 of the gripper 960. In the present modified example, it is described that the speed V is set in advance to a speed such that the state of the article will not change or is unlikely to change in cases in which an article that has the weak impact resistance, the standard impact resistance, or the strong impact resistance collides with the floor or the ground.

Thus, while the state of an article that has the weak impact resistance changes or is likely to change when delivered by the land-and-deliver method and the drop-delivery method, the state of the article does not change or is unlikely to change when delivered by the suspended-delivery method. Therefore, the suspended-delivery method is an appropriate delivery method for articles that have the weak impact resistance.

Additionally, while the state of an article that has the standard impact resistance changes or is likely to change when delivered by the drop-delivery method, the state of the article does not change or is unlikely to change when delivered by the land-and-deliver method or the suspended-delivery method. In the present modified example, it is described that delivery efficiency is better in the land-and-deliver method than in the suspended-delivery method. However, the present modified example is not limited thereto and the delivery efficiency of the suspended-delivery method may be better than the land-and-deliver method. Note that, the delivery efficiency is expressed by the quantity of articles that the unmanned vehicle 900 can deliver per unit time.

Furthermore, the state of an article that has the strong impact resistance does not change or is unlikely to change when delivered by any of the land-and-deliver method, the drop-delivery method, and the suspended-delivery method. However, since the unmanned vehicle 900 does not need to land and the gripper 960 does not need to be lowered in the drop-delivery method, the delivery efficiency of the drop-delivery method is better than that of the land-and-deliver method and the suspended-delivery method.

Figure 18:
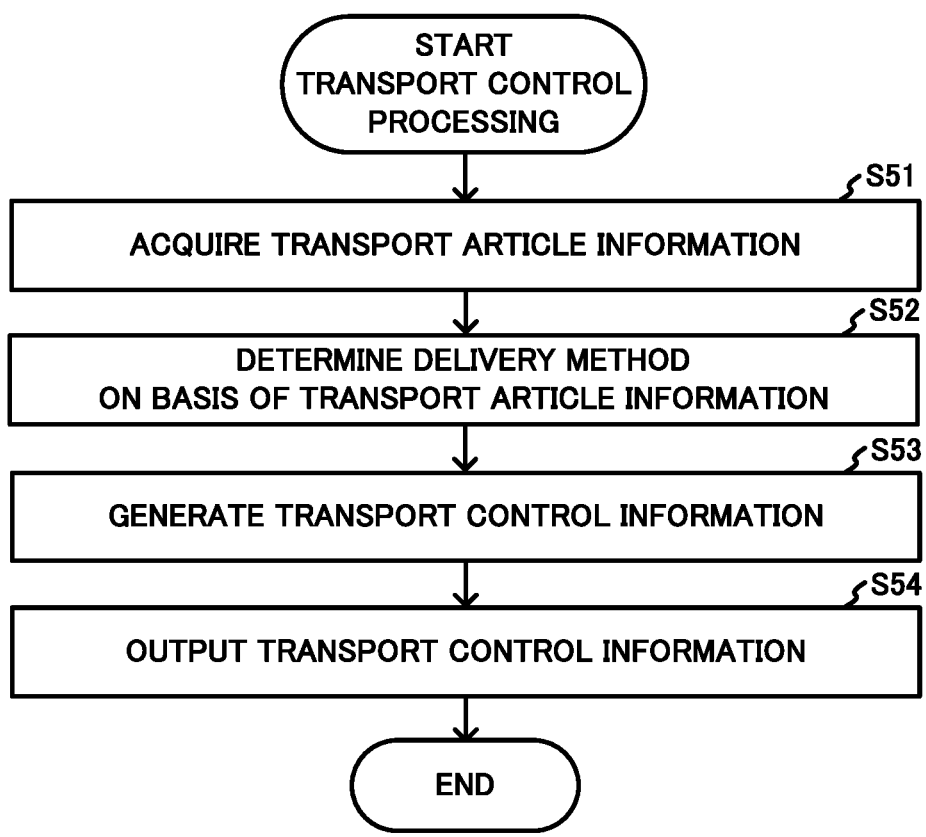
FIG. 18 is a flowchart illustrating transport control processing executed by the control device of the transport system according to Modified Example 5 of Embodiment 1.
Figure 19:
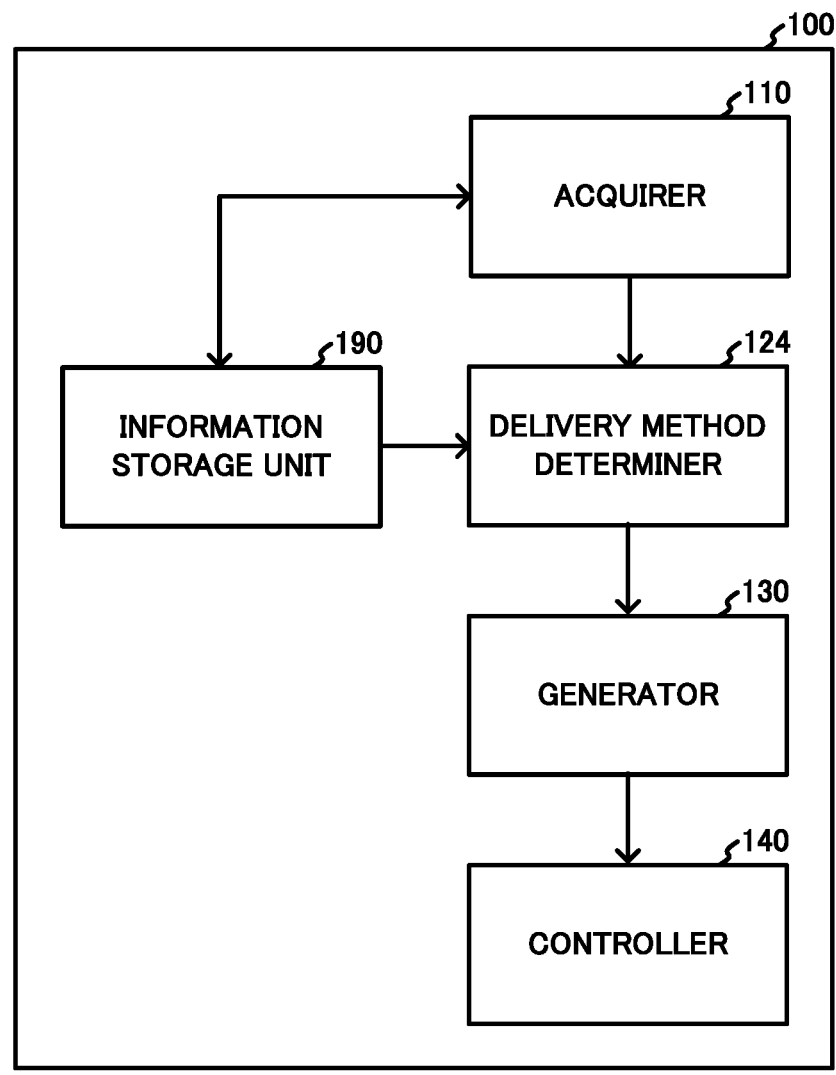
FIG. 19 is a functional block diagram illustrating an example of the functions of the control device of the transport system according to Modified Example 5 of Embodiment 1.

The CPU 101 of the control device 100 according to the present modified example executes transport control processing such as illustrated in FIG. 18 to deliver the article by any one of the three delivery methods after transporting the article. Thus, the CPU 101 functions as a delivery method determiner 124 such as illustrated in FIG. 19 that determines, on the basis of the characteristics of the article to be transported, the delivery method of the article by the unmanned vehicle 900. Additionally, the CPU 101 functions as a generator 130 that generates transport control information that includes delivery method information expressing the delivery method determined by the delivery method determiner 124, and causes the unmanned vehicle 900 to deliver the article by the determined delivery method.

A delivery method table such as illustrated in FIG. 20, in which information about the delivery methods is stored, is stored in advance in the information storage unit 190. Characteristics information expressing the standard impact resistance as the characteristics of the article and delivery method information expressing the land-and-deliver method, for which the delivery efficiency is highest among the delivery methods suited to articles with the standard impact resistance, are associated and stored in advance in the first record of the delivery method table. Characteristics information expressing the strong impact resistance and delivery method information expressing the drop-delivery method, for which delivery efficiency is the highest among the delivery methods suited to articles with the strong impact resistance, are associated and stored in advance in the second record. Characteristics information expressing the weak impact resistance and delivery method information expressing the suspended-delivery method as the delivery method suited to articles with the weak impact resistance are associated and stored in advance in the third record.

When the execution of the transport control processing of FIG. 18 starts, the acquirer 110 executes the same processing as step S01 of FIG. 3 to acquire the transport article information that includes the destination information expressing the destination and the characteristics information expressing the characteristics of the article to be transported (step S51).

Next, the delivery method determiner 124 acquires, from the delivery method table of FIG. 20, the delivery method information associated with the characteristics information included in the transport article information, and determines, as the delivery method of the article by the unmanned vehicle 900, the delivery method expressed in the acquired delivery method information (step S52).

Thereafter, the generator 130 generates transport control information that includes the delivery method information expressing the determined delivery method and the destination information included in the transport article information acquired in step S51, and that causes the unmanned vehicle 900 to deliver the article by the determined delivery method (step S53).

Thereafter, the controller 140 outputs the transport control information by executing the same processing as step S07 of FIG. 3 (step S54) and, then, ends the execution of the transport control processing.

Figure 21:
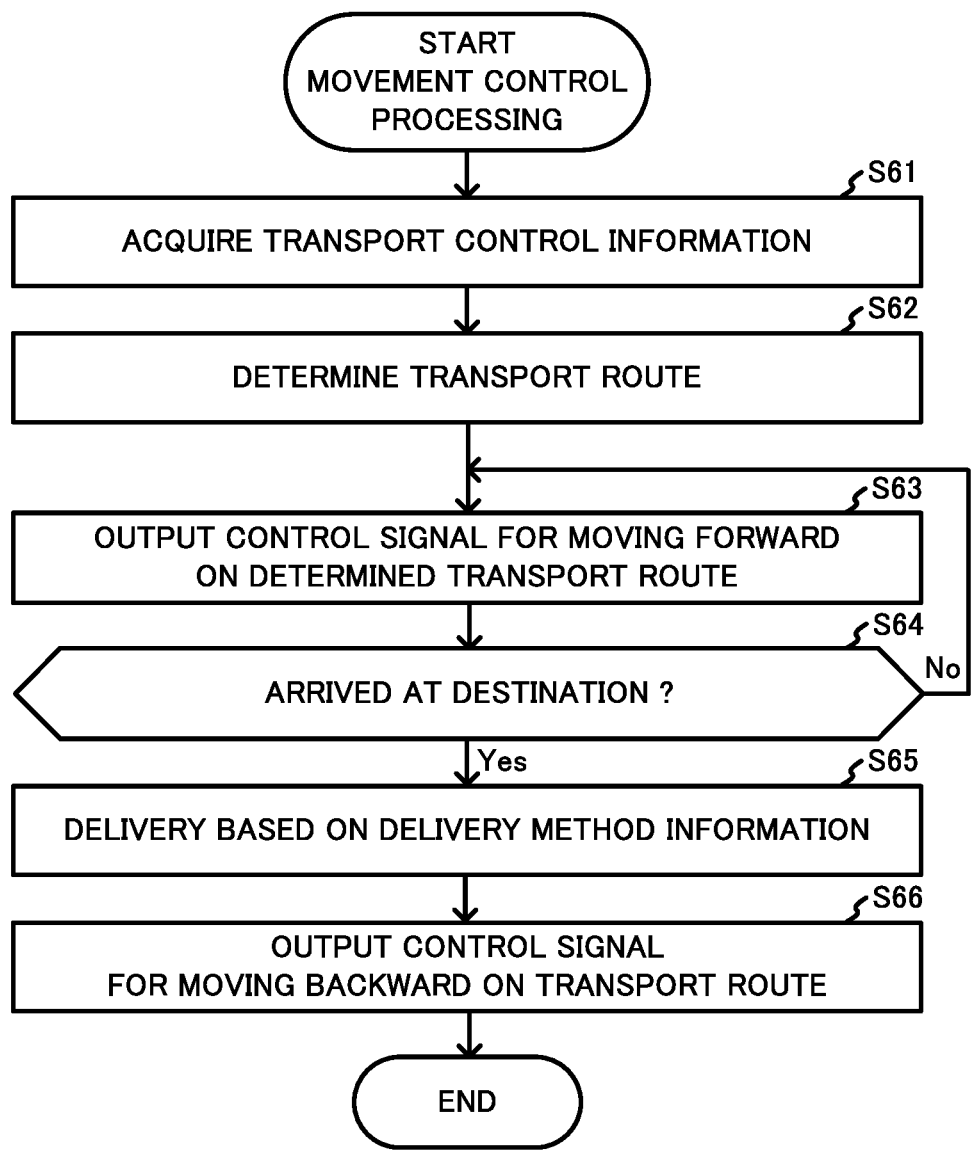
FIG. 21 is a flowchart illustrating movement control processing executed by the unmanned vehicle according to Modified Example 5 of Embodiment 1.

The partial route table illustrated in FIG. 7 is stored in advance in the flash memory 913b of the unmanned vehicle 900 according to the present modified example. When the communication circuit 914 of the unmanned vehicle 900 according to the present modified example receives the transport control information from the control device 100, the CPU 911 of the unmanned vehicle 900 executes movement control processing such as illustrated in FIG. 21.

When the execution of the movement control processing starts, the CPU 911 acquires, from the communication circuit 914, the transport control information that includes the destination information and the delivery method information (step S61).

Next, the CPU 911 of the unmanned vehicle 900 executes the same processing as step S02 of FIG. 3 while referencing the partial route table of FIG. 7 that is stored in the flash memory 913b. As a result, the CPU 911 determines, as the transport route, the shortest route among the plurality of routes from the office to the destination expressed in the destination information (step S62).

Thereafter, the CPU 911 executes the same processing (steps S63 and S64) as steps S22 and S23 of FIG. 12 and, as a result, the article is moved forward on the transport route and arrives at the destination. Thereafter, the CPU 911 generates and outputs a control signal that causes the article to be delivered by the delivery method expressed in the delivery method information included in the transport control information (step S65).

In a case in which the delivery method expressed in the delivery method information is the land-and-deliver method, the CPU 911 generates a control signal that places the winch 980 in the completely wound state, and outputs the generated control signal to the drive circuit 919 that is connected to the non-illustrated motor of the winch 980 by the non-illustrated cable. The CPU 911 outputs this sort of control signal to prevent the gripper 960 from contacting the ground or the floor of the landing point when landing, and applying an impact to the article gripped by the gripper 960.

Next, the CPU 911 generates and outputs, to the drive circuit 919, a control signal that controls the propellers 931 to 934 so as to cause the unmanned vehicle 900 to land. Thereafter, the CPU 911 generates and outputs, to the drive circuit 919, a control signal that causes the claws 961 of the gripper 960 to open to complete delivery according to the land-and-deliver method.

In a case in which the delivery method expressed in the delivery method information is the drop-delivery method, the CPU 911 generates and outputs, to the drive circuit 919, a control signal that places the winch 980 in the completely wound state. Next, the CPU 911 reads, from the flash memory 913b, the information expressing the height H, and generates and outputs, to the drive circuit 919, a control signal that controls the propellers 931 to 934 so as to cause the unmanned vehicle 900 to hover or circle, for example, at the height H expressed in the read information. Thereafter, the CPU 911 generates and outputs, to the drive circuit 919, a control signal that causes the claws 961 of the gripper 960 to open to complete delivery according to the drop-delivery method.

In a case in which the delivery method expressed in the delivery method information is the suspended-delivery method, the CPU 911 generates and outputs, to the drive circuit 919, a control signal that causes the unmanned vehicle 900 to hover at the height H, and then outputs, via the input/output port 918, a signal to imaging device 962 of the gripper 960 commanding imaging to be performed. Thereafter, the CPU 911 acquires, via the input/output port 918, information expressing the captured images output from the imaging device 962.

Thereafter, the distance from the article gripped by the gripper 960 to the ground or the floor, or the hands of the recipient, is calculated on the basis of the parallax of the captured images expressed in the acquired information. Next, the CPU 911 reads, from the flash memory 913b, information expressing a predetermined distance 1, and determines whether or not the calculated distance is shorter than the distance 1 expressed in the read information.

When the CPU 911 determines that the calculated distance is greater than or equal to the distance 1, the CPU 911 determines that the article is not in contact with the ground or the floor, and is not being held by the recipient. Thereafter, the CPU 911 generates and outputs, to the drive circuit 919, a control signal that causes the drum 981 of the winch 980 to rotate so as to lower the gripper 960 the distance 1 at the speed V. Thereafter, the CPU 911 repeats the processing from the step of outputting the signal commanding imaging to be performed, until the CPU 911 determines that the calculated distance is shorter than the distance 1.

When the CPU 911 determines that the calculated distance is shorter than the distance 1, the CPU 911 determines that the article gripped by the gripper 960 is in contact with the ground or the floor, or is being held by the recipient. Thereafter, the CPU 911 generates and outputs, to the drive circuit 919, a control signal that causes the claws 961 of the gripper 960 to open to complete delivery according to the suspended-delivery method.

Thereafter, the controller 911 executes the same processing of step S25 of FIG. 12 (step S66) to output, to the drive circuit 919, a control signal that causes the unmanned vehicle 900 to move on the transport route back to the office and, then, ends the execution of the transport control processing.

According to these configurations, the delivery method determiner 124 of the control device 100 determines, on the basis of the characteristics of the article expressed in the transport article information acquired by the acquirer 110, the delivery method of the article by the unmanned vehicle 900. Additionally, the generator 130 of the control device 100 generates the transport control information that includes the delivery method information expressing the delivery method determined by the delivery method determiner 124, and that causes the unmanned vehicle 900 to deliver the article by the determined delivery method. As such, the control device 100 can generate transport control information that causes the unmanned vehicle 900 to deliver the article by a delivery method better suited to the characteristics of the article.

Modified Example 6 of Embodiment 1

Figure 22:
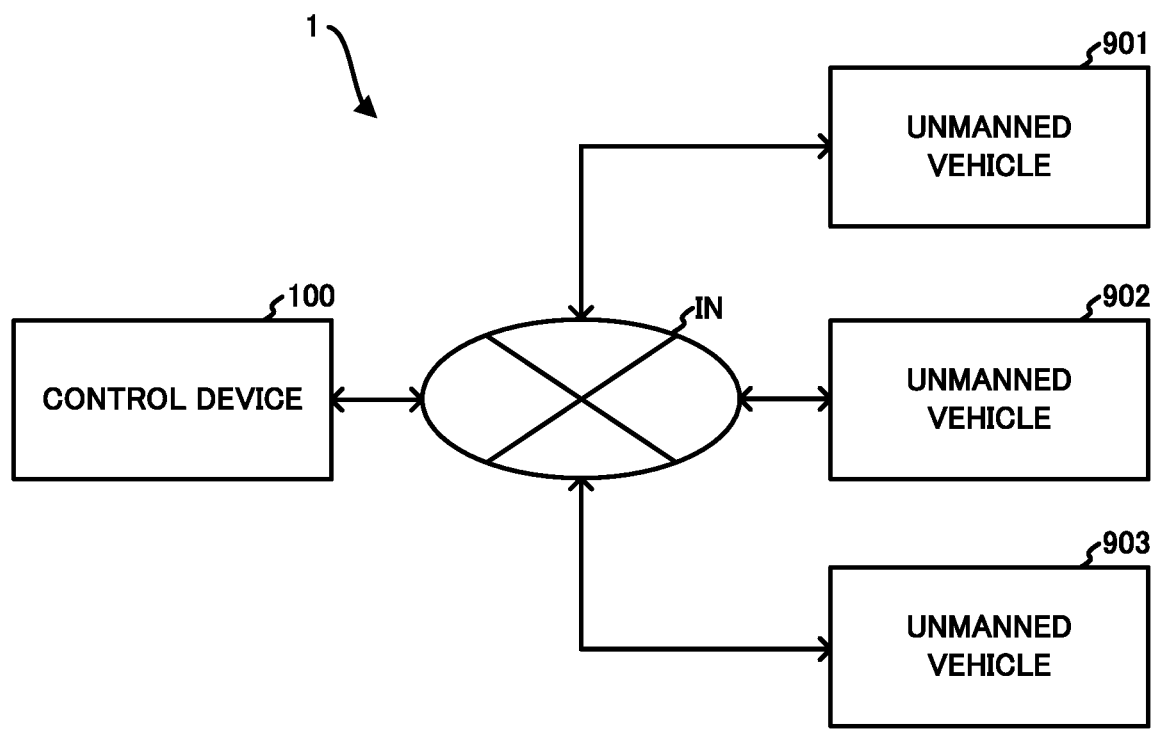
FIG. 22 is a system configuration drawing illustrating a configuration example of a transport system according to Modified Example 6 of Embodiment 1 of the present disclosure.

In Embodiment 1, it is described that the transport system 1 includes a control device 100 and one unmanned vehicle 900. However, Embodiment 1 is not limited thereto. The transport system 1 according to the present modified example includes a control device 100 and a plurality of unmanned vehicles 901 to 903 such as illustrated in FIG. 22.

The unmanned vehicle 901 is an unmanned aircraft of a standard size and, as illustrated in FIG. 10, includes four propellers 931 to 934, which is a predetermined standard number of propellers. The propellers 931 to 934 of the unmanned vehicle 901 are installed at positions separated from each other by a predetermined standard distance. Furthermore, the unmanned vehicle 901 has a predetermined standard mass.

In contrast, the unmanned vehicle 902 is an unmanned aircraft of a size larger than the standard size, and includes more propellers than the standard number of propellers. Furthermore, the distance between the propellers is greater than the standard distance, and the mass of the unmanned vehicle 902 is greater than the standard mass. The unmanned vehicle 903 is an unmanned aircraft of a size smaller than the standard size, and includes fewer propellers than the standard number of propellers. Furthermore, the distance between the propellers is less than the standard distance, and the mass of the unmanned vehicle 902 is less than the standard mass.

Shaking that occurs in unmanned vehicles when the unmanned vehicles fly decreases as the number of propellers increases, the distance between the propellers increases, and the mass increases. As such, in a case in which the unmanned vehicle 901 and the unmanned vehicle 902 fly in the same operating mode, the shaking of the unmanned vehicle 901 is greater than the shaking of the unmanned vehicle 902, and the stability of the behavior of the unmanned vehicle 901 is lower than the stability of the behavior of the unmanned vehicle 902. For the same reason, the stability of the behavior of the unmanned vehicle 901 is greater than the stability of the behavior of the unmanned vehicle 903.

In the present modified example, it is described that the average impact, applied to an article due to the shaking of the unmanned vehicle 901, changes or is likely to change the state of an article that has the weak impact resistance, but does not change or is unlikely to change the state of an articles that have the standard impact resistance and the strong impact resistance. Additionally, in the present modified example, it is described that the average impact, applied to an article due to the shaking of the unmanned vehicle 902, does not change or is unlikely to change the state of articles that have the low impact resistance, the standard impact resistance, and the strong impact resistance. Furthermore, it is described that the average impact, applied to an article due to the shaking of the unmanned vehicle 903, changes or is likely to change the state of articles that have the weak impact resistance or the standard impact resistance, but does not change or is unlikely to change the state of an article that has the strong impact resistance.

The cost required for an unmanned vehicle to fly a unit distance increases as the mass of the unmanned vehicle increases. As such, in a case in which the unmanned vehicles 901 to 903 fly the same distance in the same operating mode to transport an article, and the transport cost of the unmanned vehicle 901 is set as a standard cost, the transport cost of the unmanned vehicle 902 is greater than the standard cost, and the transport cost of the unmanned vehicle 903 is less than the standard cost.

Figure 23:
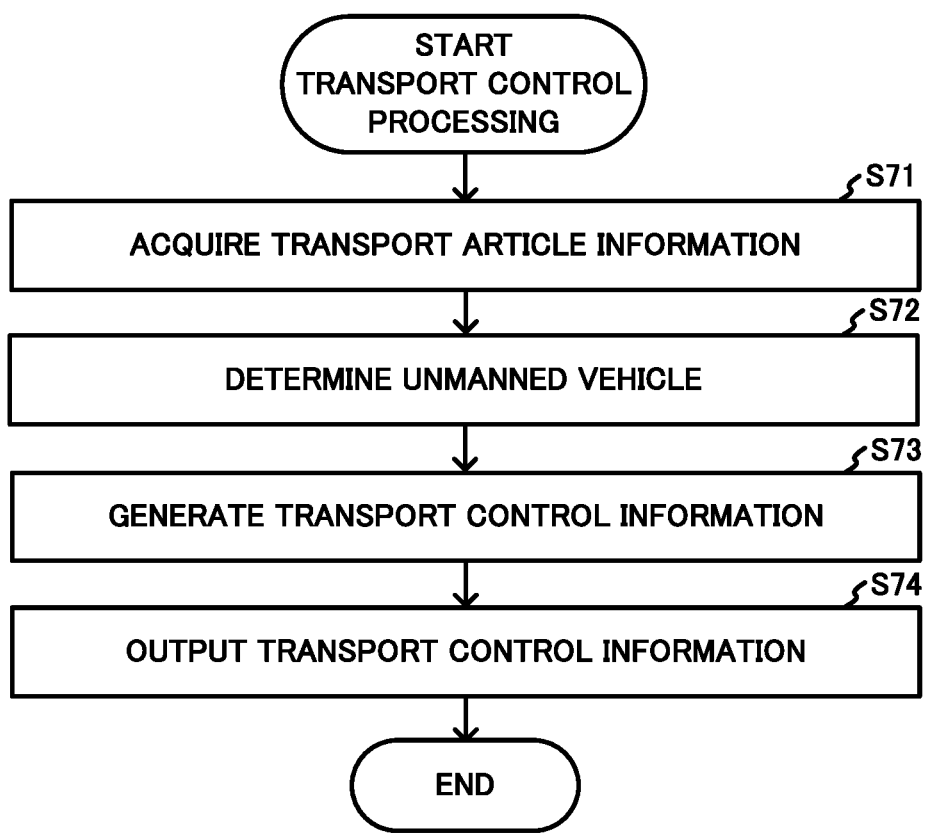
FIG. 23 is a flowchart illustrating transport control processing executed by the control device of the transport system according to Modified Example 6 of Embodiment 1.
Figure 24:
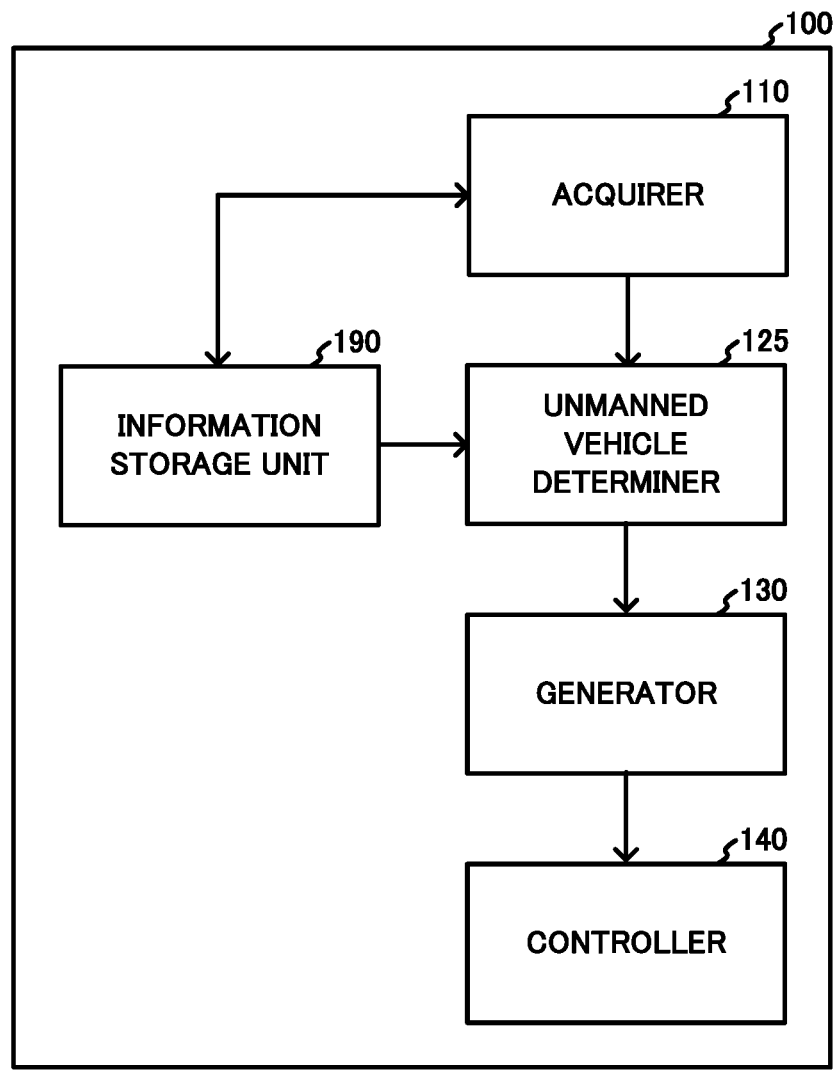
FIG. 24 is a functional block diagram illustrating an example of the functions of the control device of the transport system according to Modified Example 6 of Embodiment 1.

The CPU 101 of the control device 100 according to the present modified example executes transport control processing such as illustrated in FIG. 23 to cause one of the unmanned vehicles 901 to 903 to transport an article. Thus, the CPU 101 functions as an unmanned vehicle determiner 125 such as illustrated in FIG. 24 that determines, on the basis of the characteristics of the article to be transported, the unmanned vehicle that will transport the article.

An unmanned vehicle table such as illustrated in FIG. 25, in which information about the unmanned vehicles 901 to 903 is stored, is stored in advance in the information storage unit 190. Articles for which the state does not change or is unlikely to change due to the shaking of the unmanned vehicle 901 have one of two types of characteristics, namely the standard impact resistance and the strong impact resistance. As such, a vehicle ID identifying the unmanned vehicle 901 is stored in the first record and the second record of the unmanned vehicle table, characteristics information expressing the standard impact resistance is associated with the vehicle ID of the unmanned vehicle 901 in the first record, and characteristics information expressing the strong impact resistance is associated with the vehicle ID of the unmanned vehicle 901 in the second record. In the present modified example, it is described that a communication address assigned to the communication circuit 914 of the unmanned vehicle 901 is stored in advance in the first record and the second record as the vehicle ID identifying the unmanned vehicle 901. However, the present modified example is not limited thereto.

Additionally, size information expressing the standard size as the size of the unmanned vehicle 901 and transport cost information expressing the standard cost as the transport cost of the unmanned vehicle 901 are associated with the vehicle ID in the first record and the second record.

Likewise, articles for which the state does not change or is unlikely to change due to the shaking of the unmanned vehicle 902 have one of three types of characteristics, namely the weak impact resistance, the standard impact resistance, and the strong impact resistance. As such, a vehicle ID identifying the unmanned vehicle 902 is stored in the third to the fifth records of the unmanned vehicle table, characteristics information expressing the weak impact resistance is associated with the vehicle ID of the unmanned vehicle 902 and stored in advance in the third record, characteristics information expressing the standard impact resistance is associated with the vehicle ID of the unmanned vehicle 902 and stored in advance in the fourth record, and characteristics information expressing the strong impact resistance is associated with the vehicle ID of the unmanned vehicle 902 and stored in advance in the fifth record. Additionally, size information expressing a size larger than the standard size, and transport cost information expressing a transport cost greater than the standard cost are associated with the vehicle IDs of the third to the fifth records and stored in advance.

Likewise, articles for which the state does not change or is unlikely to change due to the shaking of the unmanned vehicle 903 have one type of characteristics, namely the strong impact resistance. As such, the vehicle ID of the unmanned vehicle 903, size information expressing a size smaller than the standard size, characteristics information expressing the strong impact resistance, and transport cost information expressing a transport cost less than the standard cost are associated with the vehicle ID of the unmanned vehicle 903 and stored in advance in the sixth record of the unmanned vehicle table.

When the execution of the transport control processing of FIG. 23 starts, the acquirer 110 of the control device 100 executes the same processing as step S01 of FIG. 3 to acquire the transport article information that includes the destination information expressing the destination and the characteristics information expressing the characteristics of the article to be transported (step S71).

Next, the unmanned vehicle determiner 125 acquires, from the unmanned vehicle table illustrated in FIG. 25, one or a plurality of the records in which the characteristics information, included in the transport article information acquired by the acquirer 110, is stored. In a case in which the unmanned vehicle determiner 125 acquires only one record, the unmanned vehicle determiner 125 determines the unmanned vehicle identified by the vehicle ID stored in the acquired record as the unmanned vehicle to be caused to transport the article that has the characteristics expressed in the characteristics information.

In contrast, in a case in which the unmanned vehicle determiner 125 acquires a plurality of records, the unmanned vehicle determiner 125 acquires the vehicle ID associated with the transport cost information expressing the lowest transport cost among the transport costs stored in each of the acquired plurality of records. Thereafter, the unmanned vehicle determiner 125 determines the unmanned vehicle identified by the acquired vehicle ID as the unmanned vehicle to be caused to transport the article that has the characteristics expressed in the characteristics information (step S72).

Thereafter, the generator 130 generates transport control information that includes the vehicle ID of the unmanned vehicle determined in step S72 and the destination information included in the transport article information acquired in step S71, and that causes the determined unmanned vehicle to transport the article (step S73).

Thereafter, the controller 140 outputs the transport control information by executing the same processing as step S07 of FIG. 3 (step S74) and, then, ends the execution of the transport control processing.

The configurations and the functions of the unmanned vehicle 901 according to the present modified example are the same as the configurations and the functions of the unmanned vehicle 900. When a non-illustrated communication circuit of the unmanned vehicle 901 receives transport control information that includes the vehicle ID, that is, the communication address assigned to that communication circuit, the non-illustrated CPU of the unmanned vehicle 901 executes, in order, the same processing as steps S61 to S64 of FIG. 21, step S24 of FIG. 12, and step S66 of FIG. 21 to transport the article. The configurations and the functions of the unmanned vehicles 902 and 903 are the same as the configurations and the functions of the unmanned vehicle 901.

According to these configurations, the unmanned vehicle determiner 125 of the control device 100 determines, on the basis of the characteristics of the article expressed in the transport article information acquired by the acquirer 110, one of the unmanned vehicles 901 to 903 as the unmanned vehicle that is caused to transport the article. Additionally, the generator 130 of the control device 100 generates transport control information that includes the vehicle ID identifying the unmanned vehicle determined by the unmanned vehicle determiner 125, and that causes the determined unmanned vehicle to transport the article. As such, the control device 100 can generate transport control information that causes an unmanned vehicle better suited to the characteristics of the article to transport the article.

Additionally, according to these configurations, the unmanned vehicle determiner 125 of the control device 100 determines, as the unmanned vehicle caused to transport the article, the unmanned vehicle among the unmanned vehicles 901 to 903 for which the average impact, due to shaking caused by flying, applied to the article that has the characteristics does not change or is unlikely to change the state of article. Here, the determination by the unmanned vehicle determiner 125 is performed on the basis of the characteristics of the article expressed in the transport article information. Therefore, the control device 100 can prevent changes in the state of the article resulting from the article being transported by an unmanned vehicle.

Modified Example 7 of Embodiment 1

Modified Example 5 of Embodiment 1 and Modified Example 6 of Embodiment 1 can be combined. The sizes of the unmanned vehicles 901 to 903 according to the present modified example are larger than the standard size. Like the unmanned vehicle 900 according to Modified Example 5 of Embodiment 1, the unmanned vehicle 902 according to the present modified example includes, instead of the first holding frame 941a and the second holding frame 941b, the gripper 960 that grips the article, the wire 970, and the winch 980 as illustrated in FIG. 17, and can deliver articles by the drop-delivery method, the land-and-deliver method, and the suspended-delivery method. Furthermore, like the unmanned vehicles 901 and 903 according to Modified Example 6 of Embodiment 1, the unmanned vehicles 901 and 903 include the first holding frame 941a and the second holding frame 941b, but do not include the gripper 960, the wire 970, and the winch 980, and can deliver the article by the drop-delivery method and the land-and-deliver method, but cannot deliver by the suspended-delivery method.

The delivery method table illustrated in FIG. 20 and the unmanned vehicle table illustrated in FIG. 26 are stored in advance in the information storage unit 190 according to the present modified example. A plurality of records is stored in advance in the unmanned vehicle table illustrated in FIG. 26. In this case, the unmanned vehicle 901 can deliver the article by two types of delivery methods, namely the land-and-deliver method and the drop-delivery method. As such, a vehicle ID identifying the unmanned vehicle 901 is stored in the first and the second records of the unmanned vehicle table, delivery method information expressing the land-and-deliver method is associated with the vehicle ID of the unmanned vehicle 901 and stored in advance in the first record, and delivery method information expressing the drop-delivery method is associated with the vehicle ID of the unmanned vehicle 901 and stored in advance in the second record.

Likewise, the unmanned vehicle 902 can deliver the article by three types of delivery methods, namely the suspended-delivery method, the land-and-deliver method, and the drop-delivery method. As such, delivery method information expressing the suspended-delivery method is associated with the vehicle ID of the unmanned vehicle 902 and stored in advance in the third record, delivery method information expressing the land-and-deliver method is associated with the vehicle ID of the unmanned vehicle 902 and stored in advance in the fourth record, and delivery method information expressing the drop-delivery method is associated with the vehicle ID of the unmanned vehicle 902 and stored in advance in the fifth record.

Likewise, the unmanned vehicle 903 can deliver the article by two types of delivery methods, namely the land-and-deliver method and the drop-delivery method. As such, delivery method information expressing the land-and-deliver method is associated with the vehicle ID of the unmanned vehicle 903 and stored in advance in the sixth record, and delivery method information expressing the drop-delivery method is associated with the vehicle ID of the unmanned vehicle 903 and stored in advance in the seventh record.

The control device 100 according to the present modified example executes the transport control processing illustrated in FIG. 23. When the execution of the transport control processing starts, the acquirer 110 acquires the transport article information that includes the destination information and the characteristics information (step S71).

Next, the delivery method determiner 124 acquires, from the delivery method table of FIG. 20, the delivery method information associated with the characteristics information included in the transport article information acquired in step S71, and determines the delivery method suited to the characteristics of the article expressed in the characteristics information. Thereafter, the delivery method determiner 124 acquires, from the unmanned vehicle table of FIG. 26, one or a plurality of records associated with the acquired delivery method information, thereby acquiring one or a plurality of records in which a vehicle ID, of an unmanned vehicle that can perform the delivery method suited to the characteristics of the article, is stored.

In a case in which the delivery method determiner 124 acquires only one record, the delivery method determiner 124 acquires the vehicle ID stored in the acquired record, and determines the unmanned vehicle identified by the acquired vehicle ID as an unmanned vehicle that can deliver the article by the determined delivery method. In contrast, in a case in which the delivery method determiner 124 acquires a plurality of records, the delivery method determiner 124 selects one of the acquired plurality of records randomly or in accordance with a predetermined rule. Next, the delivery method determiner 124 acquires the vehicle ID stored in the selected record, and determines the unmanned vehicle identified by the acquired vehicle ID as an unmanned vehicle that can deliver the article by the determined delivery method (step S72).

Thereafter, the generator 130 generates transport control information that includes the destination information acquired in step S71 and the delivery method information expressing the vehicle ID that identifies the unmanned vehicle determined in step S72 and the delivery method, and that causes the determined unmanned vehicle to transport the article to the destination expressed in the destination information and deliver the article by the determined delivery method (step S73).

Thereafter, the controller 140 outputs the transport control information generated by the generator 130 (step S74) and, then, ends the execution of the transport control processing.

When a non-illustrated communication circuit of one of the unmanned vehicles 901 to 903 receives transport control information that includes the vehicle ID, that is, the communication address assigned to that communication circuit, the non-illustrated CPU of that unmanned vehicle executes the movement control processing illustrated in FIG. 21. As a result, that unmanned vehicle 901 to 903 transports the article to the destination expressed in the destination information included in the transport control information and, also, delivers the article by the delivery method expressed in the delivery method information included in the transport control information.

According to these configurations, the delivery method determiner 124 of the control device 100 determines the delivery method of the article on the basis of the characteristics of the article expressed in the characteristics information included in the transport article information acquired by the acquirer 110, and the unmanned vehicle determiner 125 determines the unmanned vehicle that can deliver the article by the determined delivery method. As such, the control device 100 can determine not only the delivery method better suited to the characteristics of the article, but also the unmanned vehicle that can deliver the article by a better suited delivery method.

Modified Example 8 of Embodiment 1

In Embodiment 1, it is described that the characteristics of the article include the impact resistance of the article. However, Embodiment 1 is not limited thereto. In the present modified example, the characteristics of the article include a need for temperature control of the article.

A characteristics table such as illustrated in FIG. 27 is stored in advance in the information storage unit 190 according to the present modified example. A plurality of records is stored in advance in the characteristics table of FIG. 27. Type information that expresses the article type, and characteristics information, which expresses the need for temperature control as a common characteristic of a plurality of articles classified into the types, are associated and stored in advance in each of the records.

In the first record of the characteristics table, the article type "book" and the characteristics information "unnecessary", which expresses that there is no need for temperature control, are associated. The phrase "no need for temperature control" includes the meanings of "absolutely no need to control the temperature of the article" and, also, "the need to hold the temperature of the article at an ambient temperature of 5° C. to 35° C.," for example.

In the second record of the characteristics table, the article type "fresh food" and the characteristics information "needs refrigeration", which expresses that the plurality of articles classified as "fresh food" needs refrigeration control, are associated. The phrase "refrigeration control the article" includes the meaning of holding the temperature of the article at a low temperature of 10° C. or lower and at which the article does not freeze.

In the third record of the characteristics table, the article type "frozen food" and the characteristics information "needs freezing", which expresses that the plurality of articles classified as "frozen food" needs freezing control, are associated. The phrase "freeze control the article" includes the meaning of holding the temperature of the article at −18° C. or lower. In the fourth record of the characteristics table, the article type "ice cream" and the characteristics information "needs freezing" are associated.

In the present modified example, the operating modes of the unmanned vehicle 900 include the standard mode and a high-speed mode. In the high-speed mode, a speed limit faster than the speed limit of the standard mode and an acceleration limit greater than the acceleration limit of the standard mode are imposed on the unmanned vehicle 900.

In the present modified example, an article that needs temperature control is transported by the unmanned vehicle 900 in a state stored in a non-illustrated cooler together with a non-illustrated coolant such as water-absorbed sodium polyacrylate that has been cooled to a predetermined temperature. Here, the cooler is formed, for example, by coating a heat insulating material such as foamed plastic with a resin. The temperature of the article rises with the passage of time even while the article is stored in the cooler together with the cooled coolant. As such, the high-speed mode is more suited than the standard mode as the operating mode related to behavior for when the unmanned vehicle 900 moves on the transport route carrying an article that needs temperature control.

In contrast, both the standard mode and the high-speed mode are suited as the operating mode related to behavior for when the unmanned vehicle 900 moves on the transport route carrying an article that does not need temperature control. The cost required for the unmanned vehicle 900 to fly a unit distance increases as the speed increases. As such, the transport cost for the standard mode is less than the transport cost for the high-speed mode.

Therefore, an operating mode table such as illustrated in FIG. 28 is stored in advance in the information storage unit 190 according to the present modified example. Characteristics information expressing that there is no need for temperature management and the operating mode expressing the standard mode, for which the transport cost is the lower of the modes suitable as the operating mode of the unmanned vehicle 900 that is carrying an article that does not need temperature control, are associated in advance in the first record of the operating mode table of FIG. 28. Additionally, characteristics information expressing that there is a need for refrigeration control and the operating mode expressing the high-speed mode, which is suitable as the operating mode of the unmanned vehicle 900 that is carrying an article that needs refrigeration control, are associated in advance in the second record. Furthermore, characteristics information expressing that there is a need for freezing control and the operating mode expressing the high-speed mode are associated in advance in the third record.

Additionally, a partial route table such as illustrated in FIG. 29 is stored in advance in the information storage unit 190. The latitude and longitude of the start node and the latitude and longitude of the end node of an edge, information expressing the distance, and information expressing a degree of shade are associated and stored in advance in each record of the partial route table. The term "degree of shade" refers to the percentage of the roads included in the edge that are shaded from sunlight all day by, for example, buildings or trees.

In the present modified example, when an article is brought into the office, an employee working at the office operates the non-illustrated two-dimensional code reader that is connected to the control device 100, and causes the two-dimensional reader to read a two-dimensional code from a slip affixed to cardboard in which the article that is brought in is packaged.

When a signal is input via the input port 108 from the two-dimensional code reader, the CPU 101 of the control device 100 starts the execution of the transport control processing illustrated in FIG. 3. When the execution of the transport control processing starts, the acquirer 110 acquires, on the basis of the signal input from the two-dimensional code reader, delivery information that includes the destination information and the type information of the article, and displays the acquired delivery information on the display device 105b illustrated in FIG. 2.

The employee of the office determines, on the basis of the type information displayed on the display device 105b, whether or not the article needs to be temperature controlled. If the employee determines that the article needs to be temperature controlled, the employee places the cardboard in which the article is packaged and the cooled coolant into the cooler and, then, loads the cooler onto the unmanned vehicle 900 and operates the input device 105c illustrated in FIG. 2.

When a signal corresponding to the operation of the employee is output from the input device 105c, the acquirer 110 acquires, from the characteristics table of FIG. 27, the characteristics information associated with type information included in the delivery information, and treats the destination information included in the delivery information and the acquired characteristics information as the transport article information (step S01 of FIG. 3).

Next, the route determiner 121 determines the N candidates of the transport route (step S02), and executes the evaluation value calculation processing illustrated in FIG. 9 (step S03).

When the execution of the evaluation value calculation processing starts, the route determiner 121 initializes the value of the variable n to "1" (step S11). Next, the route determiner 121 calculates, for the nth candidate, a plurality of evaluation values (step S12). In the present modified example, it is described that a first evaluation value based on the total transport distance and a second evaluation value based on the degree of shade are calculated as the plurality of evaluation values. However, the plurality of evaluation values is not limited thereto.

The route determiner 121 executes the same processing as described in Embodiment 1 to calculate the first evaluation value based on the total transport distance. Next, in order to calculate the second evaluation value based on the degree of shade, the route determiner 121 identifies the plurality of edges included in the nth candidate. Then, from among the identified plurality of edges, the route determiner 121 sets one edge for which the degree of shade is not acquired as a considered edge, and acquires, from the partial route table of FIG. 29, information that represents the distance of the considered edge and information that represents the degree of shade associated with the latitude and longitude of the start node and the latitude and longitude of the end node of the considered edge. Thereafter, the route determiner 121 multiplies the degree of shade of the considered edge expressed in the acquired information by the distance of the considered edge to calculate a shaded movement distance, which is a distance that the unmanned vehicle 900 moves in the shade while moving on the considered edge. Then, the route determiner 121 repeats this processing from the step of setting one unconsidered edge as the considered edge, until there are no unconsidered edges.

When there are no unconsidered edges, the route determiner 121 calculates the sum of the shaded movement distance of the plurality of edges included in the nth candidate, and calculates, as the second evaluation value, a value that increases as the calculated sum of the shaded movement distance increases. The route determiner 121 calculates the second evaluation value in the manner because rises in the temperature of the article during movement on the transport route can be suppressed to a greater degree as the sum of the shaded movement distance increases.

In the present modified example, it is described that the route determiner 121 uses, as the calculation method of the second evaluation value, a method in which the sum of the shaded movement distance is set as the second evaluation value. However, the present modified example is not limited to this method, and any calculation method may be used provided that the route determiner 121 calculates, as the second evaluation value, a positive value that increases as the sum of the shaded movement distance increases.

After calculating the plurality of evaluation values in step S12, the route determiner 121 initializes, to a positive initial value, the plurality of weighting factors respectively used in the weighting of the plurality of evaluation values (step S13). Thereafter, in a case in which the characteristics information included in the transport article information expresses that the is no need for temperature control, the route determiner 121 corrects the weighting factor of the first evaluation value based on the total transport distance to a value greater than before the correction, but does not correct the weighting factor of the second evaluation value based on the degree of shade. The route determiner 121 corrects the weighting factor of the first evaluation value based on the total transport distance to a value greater than before the correction because the transport efficiency of transport routes with short total transport distances is greater than the transport efficiency of transport routes with long total transport distances. Additionally, the route determiner 121 does not correct the weighting factor of the second evaluation value based on the degree of shade because the state of articles that do not need temperature control are not affected or are only slightly affected by the radiant heat generated by sunlight irradiation.

In contrast, in cases in which the characteristics information included in the transport article information expresses that there is a need for refrigeration control or freezing control, the route determiner 121 does not correct the weighting factor of the first evaluation value based on the total transport distance, but does correct the weighting factor of the second evaluation value based on the degree of shade to a value greater than before the correction (step S14). The route determiner 121 corrects the weighting factor of the second evaluation value based on the degree of shade to a value greater than before the correction because the state of articles that need refrigeration control or freezing control are affected or are likely to be affected by the radiant heat generated by sunlight irradiation. That is, since radiant heat due to sunlight irradiation is less likely to be generated on transport routes that include many shaded roads than on transport routes that do not include many shaded roads are more suited as transport routes for articles that need refrigeration control or freezing control.

Then, the route determiner 121 calculates an overall evaluation value of the nth candidate by weighting the plurality of evaluation values calculated in step S12 with the plurality of weighting factors corrected in step S14 (step S15).

Thereafter, the route determiner 121 increases the value of the variable n by "1" (step S16) and, then, repeats the processing from step S12 until the value of the variable n is greater than the total number N of the transport route candidates. Then, when the route determiner 121 determines that the value of the variable n is greater than the total number N of the candidates (step S17; Yes), the execution of the evaluation value calculation processing is ended.

After the execution of the evaluation value calculation processing by step S03 of FIG. 3, the route determiner 121 determines, as the transport route, the candidate for which the highest overall evaluation value is calculated (step S04).

Next, the operating mode determiner 122 acquires, from the operating mode table of FIG. 28, the operating mode information associated with the characteristics information included in the transport article information, and determines the operating mode expressed in the acquired operating mode information as the operating mode for when the unmanned vehicle 900 moves on the transport route carrying the article (step S05).

Thereafter, the generator 130 generates transport control information that includes the transport route information and the operating mode information (step S06), the controller 140 outputs the transport control information (step S07) and, then, the execution of the transport control processing is ended.

When the unmanned vehicle 900 receives the transport control information from the control device 100, the movement control processing illustrated in FIG. 12 is executed to transport the article.

According to these configurations, the characteristics of the article include whether or not there is a need for temperature control. Additionally, the controller 140 of the control device 100 carries out, on the basis of the transport control information generated on the basis of the characteristics expressed in the characteristics information, control that causes the unmanned vehicle 900 to transport the article. As such, the control device 100 can cause the unmanned vehicle 900 to perform transportation better suited to whether or not there is a need for temperature control.

Additionally, in cases in which the transport article information expresses that there is a need for temperature control, the route determiner 121 of the control device 100 determines, as the transport route, a route with a greater ratio of shade than when the transport article information expresses that there is no need for temperature control. Therefore, the control device 100 can prevent the state of an article that needs temperature control from changing, due to sunlight irradiation, to a state that differs from the state before transport.

The phrase "the state of an article that needs temperature control changes" includes the meaning of the temperature of an article that needs refrigeration control changing from a state of a low temperature that is 10° C. or lower and at which the article does not freeze to a state of a temperature higher than 10° C., or changing to the state of a lower temperature at which the article freezes. The phrase "the state of an article that needs temperature control changes" also includes the meaning of the temperature of an article that needs freezing control changing from a state of −18° C. or lower to a state of a temperature higher than −18° C.

Furthermore, in cases in which the transport article information expresses that there is no need for temperature control, the route determiner 121 determines, as the transport route, a route for which the total transport distance is shorter than when the transport article information expresses that there is a need for temperature control. As such, the control device 100 can improve the transport efficiency of the article.

Additionally, in cases in which the transport article information expresses that there is a need for temperature control, the operating mode determiner 122 of the control device 100 determines a faster speed limit and a greater acceleration limit to be imposed on the unmanned vehicle 900 than when the transport article information expresses that there is no need for temperature control. As such, the control device 100 can cause the unmanned vehicle 900 carrying an article that needs temperature control to move at a faster speed. Therefore, the control device 100 can prevent the state of an article that needs temperature control from changing, due to the passage of time, to a state that differs from the state before transport.

In the present modified example, it is described that the characteristics of the article include that the article does not need to be temperature controlled, that the article needs to be refrigeration controlled, and that the article needs to be freezing controlled. However, the present modified example is not limited thereto. The characteristics of the article may further include that the article needs warming control. The phrase "warming control of the article" includes a meaning of, in a case in which the article is a food, maintaining the temperature of the food at a temperature that a user eating the food would typically consider warm, such as from 60° C. to 65° C.

In cases in which the characteristics information included in the transport article information expresses that warming control is needed, in step S14 of FIG. 9, the route determiner 121 does not correct the weighting factor of the first evaluation value based on the total transport distance, but may correct the weighting factor of the second evaluation value based on the degree of shade to a positive value less than before the correction. The route determiner 121 corrects the weighting factor of the second evaluation value based on the degree of shade to a value less than before the correction because an article that needs warming control is warmed further by the radiant heat generated by sunlight irradiation. That is, transport routes that include fewer shaded roads are more suited than transport routes include many shaded roads as transport routes for articles that need warming control.

Modified Example 9 of Embodiment 1

It is possible to combine Modified Example 8 of Embodiment 1 in which the characteristics of the article to be transported include whether or not the article needs temperature control, and Modified Example 2 of Embodiment 1 in which the transport time for the unmanned vehicle 900 to transport the article is determined on the basis of the characteristics of the article.

In order to achieve such a configuration, in step S35 of FIG. 13, the schedule determiner 123 of the control device 100 according to the present modified example initializes the value of the variable representing the movement speed set in the unmanned vehicle 900 to the predetermined standard speed. Next, in cases in which the characteristics information included in the transport article information acquired in step S31 expresses that there is no need for temperature control, the schedule determiner 123 does not change the value of the variable representing the movement speed.

In contrast, in cases in which the characteristics information expresses that refrigeration control, freezing control, or warming control is needed, the schedule determiner 123 changes the value of the variable representing the movement speed to a speed faster than the standard speed. The schedule determiner 123 changes the value of the variable representing the movement speed in this manner because the temperature of the article rises or falls with the passage of time even when the article is stored in a cooler or a warmer. Next, the schedule determiner 123 divides the total transport distance of the transport route by the changed movement speed or the unchanged movement speed to determine the transport time for the unmanned vehicle 900 to move on the transport route and transport the article.

According to these configurations, in a case in which the transport article information expresses that temperature control is needed, the schedule determiner 123 of the control device 100 determines a shorter transport time than when the transport article information expresses that there is no need for temperature control. Therefore, the control device 100 can prevent the state of the article from changing due to temperature changes of the article during transport.

Modified Example 10 of Embodiment 1

It is possible to combine Modified Example 8 of Embodiment 1 in which the characteristics of the article to be transported include whether or not the article needs temperature control, and Modified Example 3 of Embodiment 1 in which the end time at which the unmanned vehicle 900 completes the transportation of the article is determined on the basis of the characteristics of the article.

In order to achieve such a configuration, in step S35 of FIG. 13, the schedule determiner 123 of the control device 100 according to the present modified example executes the same processing as in Modified Example 9 to determine the transport time on the basis of the characteristics of the article expressed in the transport article information and to determine, as the end time, a time obtained by adding the transport time to the system time.

Modified Example 11 of Embodiment 1

It is possible to combine Modified Example 8 of Embodiment 1 in which the characteristics of the article to be transported include whether or not the article needs temperature control, and Modified Example 4 of Embodiment 1 in which the start time at which the unmanned vehicle 900 starts the transportation of the article is determined on the basis of the characteristics of the article.

In order to achieve such a configuration, in step S35 of FIG. 13, the schedule determiner 123 of the control device 100 according to the present modified example executes the same processing as in Modified Example 9 of Embodiment 1 to determine the transport time on the basis of the characteristics of the article. Additionally, in step S36, the schedule determiner 123 executes the same processing as in Modified Example 4 of Embodiment 1 to determine, on the basis of the determined transport time and the specified time block expressed in the specified time block information acquired in step S31, the start time at which to start the transportation of the article.

Modified Example 12 of Embodiment 1

It is possible to combine Modified Example 8 of Embodiment 1 in which the characteristics of the article to be transported include whether or not the article needs temperature control, and Modified Example 5 of Embodiment 1 in which the delivery method of the article by the unmanned vehicle 900 is determined on the basis of the characteristics of the article.

Like the unmanned vehicle 900 according to Modified Example 5 of Embodiment 1, the unmanned vehicle 900 according to the present modified example includes, as illustrated in FIG. 17, the gripper 960 that grips an article, the wire 970 from which the gripper 960 is suspended, and the winch 980 that winds and unwinds the wire 970.

The unmanned vehicle 900 according to the present modified example uses the gripper 960, the wire 970, and the winch 980 to deliver the article by one of two delivery methods. The first delivery method is a deliver-to-person delivery method in which the article is delivered to a person at the destination, and the second delivery method is a leave delivery method in which the article is left at the destination.

The deliver-to-person delivery method is a delivery method in which, in a case in which a person is detected in an image captured by the imaging device 962 of the gripper 960 while the unmanned vehicle 900 is flying over the destination, the article is delivered by one of the drop-delivery method, the land-and-deliver method, and the suspended-delivery method. Note that, here, the optical axis of the imaging device 962 is directed downward in the vertical direction.

The leave delivery method is a method in which the article is delivered by leaving the article at the destination by any one of the drop-delivery method, the land-and-deliver method, and the suspended-delivery method, even when a person is not detected in the image captured by the imaging device 962.

In the deliver-to-person delivery method, since the article is dropped or the like at the destination when a person is detected in the captured image of the destination, the person at the destination can take over the temperature control of the article that is dropped or the like. Therefore, the deliver-to-person delivery method is more suited as a delivery method for articles that need temperature control than the leave delivery method.

In contrast, both the leave delivery method and the deliver-to-person delivery method are suited as delivery methods for articles that do not need temperature control. However, in the leave delivery method, the article is delivered even if a person is not detected in the captured image of the destination and, as such, the article delivery efficiency is greater in the leave delivery method than in the deliver-to-person delivery method.

A delivery method table such as illustrated in FIG. 30 is stored in advance in the information storage unit 190 according to the present modified example. Characteristics information expressing that there is no need for temperature control and delivery method information expressing the leave delivery method, for which delivery efficiency is the higher of the delivery methods suited to articles that do not need temperature control, are associated and stored in advance in the first record of the delivery method table. Characteristics information expressing that there is a need for refrigeration control and delivery method information expressing the deliver-to-person delivery method, which is suited to articles that need refrigeration control, are associated and stored in advance in the second record. Characteristics information expressing that there is a need for freezing control and delivery method information expressing the deliver-to-person delivery method, which is suited to articles that need freezing control, are associated and stored in advance in the third record.

In step S52 of FIG. 18, the delivery method determiner 124 according to the present modified example acquires, from the delivery method table of FIG. 30, the delivery method information associated with the characteristics information included in the transport article information, and determines, as the delivery method of the article by the unmanned vehicle 900, the delivery method expressed in the acquired delivery method information.

In step S65 of FIG. 21, the CPU 911 of the unmanned vehicle 900 according to the present modified example generates and outputs, to the drive circuit 919, a control signal that causes the article to be delivered by the delivery method expressed in the delivery method information.

In a case in which the delivery method expressed in the delivery method information is the leave delivery method, the CPU 911 of the unmanned vehicle 900 generates and outputs a control signal that causes the article to be dropped or the like at the destination by any one of the drop-delivery method, the land-and-deliver method, and the suspended-delivery method.

In contrast, in a case in which the delivery method expressed in the delivery method information is the deliver-to-person delivery method, the CPU 911 of the unmanned vehicle 900 generates and outputs a control signal that controls the propellers 931 to 934 so as to hover or circle above the destination. The unmanned vehicle 900 is caused to hover or circle above the destination so that the destination is within the angle of view of the imaging device 962 of the gripper 960.

Thereafter, the CPU 911 of the unmanned vehicle 900 outputs, via the input/output port 918 illustrated in FIG. 11 and to the imaging device 962 of the gripper 960, a signal that commands the imaging device 962 to perform imaging and, then, acquires, via the input/output port 918, information expressing the captured images output from the imaging device 962. Next, the CPU 911 performs template matching or the like on the captured images expressed in the acquired information to detect, from the captured images of the destination, a region that represents a person.

In a case in which a region that expresses a person is detected, the CPU 911 of the unmanned vehicle 900 determines that a person is detected at the destination and generates and outputs a control signal that causes the article to be dropped or the like at the destination by any one of the drop-delivery method, the land-and-deliver method, and the suspended-delivery method. In contrast, in a case in which a region that represents a person is not detected, the CPU 911 determines that a person is not detected at the destination. Next, since there is not a person at the destination, the CPU 911 determines that it is not possible to deliver the article by the deliver-to-person delivery method, and cancels the delivery of the article.

According to these configurations, in a case in which the transport article information acquired by the acquirer 110 expresses that temperature control is needed, the delivery method determiner 124 of the control device 100 determines, as the delivery method of the article by the unmanned vehicle 900, the deliver-to-person delivery method in which the article is delivered to a person. When the article is delivered by the deliver-to-person delivery method, the temperature control of the article can be taken over by the person to whom the article is delivered and, as such, the control device 100 can determine, as the delivery method for an article that needs temperature control, a method that is suited to that article.

Additionally, according to these configurations, in cases in which the transport article information expresses that there is no need for temperature control, the delivery method determiner 124 of the control device 100 determines the leave delivery method, which has higher deliver efficiency than the deliver-to-person delivery method, as the delivery method of the article by the unmanned vehicle 900. As such, the control device 100 can further improve the delivery efficiency of the article.

In the present modified example, it is described that, in a case in which the delivery method expressed in the delivery method information is the deliver-to-person delivery method, the unmanned vehicle 900 captures images of the destination using the imaging device 962 of the gripper 960 while hovering or circling over the destination, and a person at the destination is detected on the basis of the captured images.

However, the present modified example is not limited thereto and, in a case in which the delivery method expressed in the delivery method information is the deliver-to-person delivery method, the CPU 911 of the unmanned vehicle 900 may generate and output a control signal that causes the unmanned vehicle 900 to land. Then, the CPU 911 may output a message to a non-illustrated speaker or display device prompting the recipient to stand in front of the unmanned vehicle 900.

Then, after the unmanned vehicle 900 lands, the CPU 911 of the unmanned vehicle 900 may output a signal that commands the imaging device 951 of FIG. 10, for which the optical axis is directed in front of the unmanned vehicle 900, to perform imaging, and detect a person in front of the unmanned vehicle 900 on the basis of the captured images output from the imaging device 951. Thereafter, when a person is detected, the CPU 911 of the unmanned vehicle 900 may generate and output a control signal that causes the article to be delivered by the land-and-deliver method.

Modified Example 13 of Embodiment 1

It is possible to combine Modified Example 8 of Embodiment 1 in which the characteristics of the article to be transported include whether or not the article needs temperature control, and Modified Example 6 of Embodiment 1 in which the unmanned vehicle to be caused to deliver the article is determined from the plurality of unmanned vehicles 901 to 903 on the basis of the characteristics of the article.

Figure 31:
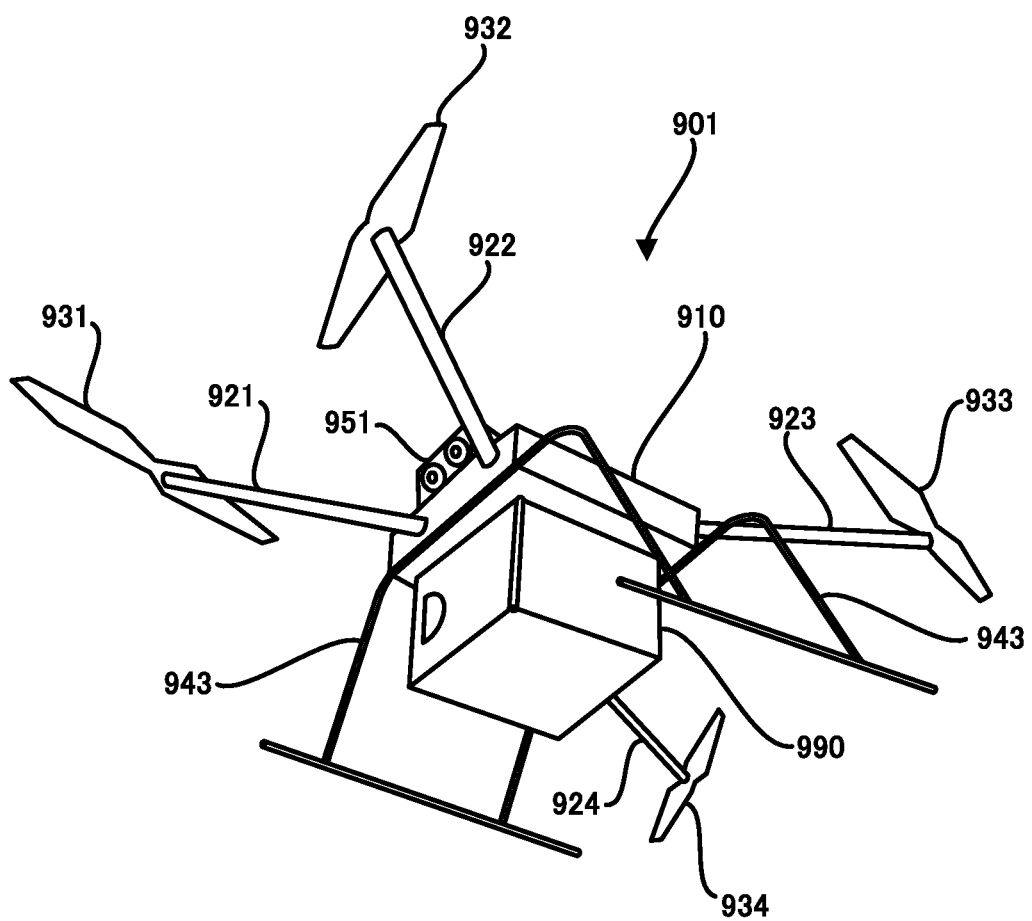
FIG. 31 is an appearance configuration drawing illustrating an example of the appearance of an unmanned vehicle according to Modified Example 13 of Embodiment 1.

In the present modified example, as in Modified Example 6 of Embodiment 1, the transport system 1 includes a control device 100, and a plurality of unmanned vehicles 901 to 903 such as illustrated in FIG. 22. Instead of the first holding frame 941a and the second holding frame 941b illustrated in FIG. 10, the unmanned vehicles 901 to 903 include a storage cabinet 990 such as illustrated in FIG. 31. The storage cabinet 990 of the unmanned vehicle 901 does not have a function for temperature controlling the article in the storage cabinet 990 and, as such the temperature in the storage cabinet 990 is maintained at ambient temperature.

Like the unmanned vehicle 901, the unmanned vehicle 902 includes a non-illustrated storage cabinet. The non-illustrated storage cabinet of the unmanned vehicle 902 includes a non-illustrated compressor that compresses and vaporizes a refrigerant, a condenser that liquefies the refrigerant, an expansion valve that lowers the boiling point of the refrigerant by lowering the pressure of the refrigerant, an evaporator that vaporizes the refrigerant, and a non-illustrated fan that circulates air, which is cooled by the refrigerant being vaporized in the evaporator, in the storage cabinet 990. Due to these configurations, the non-illustrated storage cabinet of the unmanned vehicle 902 includes a function for refrigeration controlling the article in the storage cabinet, and the temperature inside the storage cabinet is held to, for example, a low temperature of 10° C. or lower and at which the article does not freeze.

Like the unmanned vehicle 902, the unmanned vehicle 903 includes a non-illustrated storage cabinet. The configuration of the non-illustrated storage cabinet of the unmanned vehicle 903 is the same as the configuration of the non-illustrated storage cabinet of the unmanned vehicle 902, but the non-illustrated storage cabinet of the unmanned vehicle 903 includes a function for freezing controlling the article in the storage cabinet. As such, the temperature inside the storage cabinet of the unmanned vehicle 903 is maintained at −18° C. or lower, for example.

Therefore, while the unmanned vehicles 901 to 903 are all suitable as unmanned vehicles for transporting articles that do not need temperature control, the unmanned vehicle 901 has the lowest transport cost among the costs of the unmanned vehicles 901 to 903. This is because, in contrast with the unmanned vehicles 902 and 903, the unmanned vehicle 901 does not incur costs related to temperature control. Note that the masses of the unmanned vehicles 901 to 903 are assumed to be the same.

The unmanned vehicle 902 that includes the refrigeration control function is the most suited among the unmanned vehicles 901 to 903 as an unmanned vehicle for transporting an article that needs refrigeration control, and the unmanned vehicle 903 that includes the freezing control function is the most suited among the unmanned vehicles 901 to 903 as an unmanned vehicle for transporting an article that needs freezing control.

An unmanned vehicle table such as illustrated in FIG. 32 is stored in advance in the information storage unit 190 according to the present modified example. The vehicle ID of the unmanned vehicle 901, a character string "-" expressing that the storage cabinet of the unmanned vehicle 901 does not include a temperature control function, and "unnecessary", which expresses that there is no need for temperature control, are associated and stored in advance in the first record of the unmanned vehicle table.

The vehicle ID of the unmanned vehicle 902, a character string "refrigeration control function" expressing that the storage cabinet of the unmanned vehicle 902 includes the refrigeration control function, and "needs refrigeration", which expresses that there is a need for refrigeration control, are associated and stored in advance in the second record. Likewise, the vehicle ID of the unmanned vehicle 903, a character string "freezing control function" expressing that the storage cabinet of the unmanned vehicle 903 includes the freezing control function, and "needs freezing", which expresses that there is a need for freezing control, are associated and stored in advance in the third record.

In step S72 of FIG. 23, the unmanned vehicle determiner 125 of the control device 100 according to the present modified example acquires, from the unmanned vehicle table illustrated in FIG. 32, the vehicle ID associated with the characteristics information included in the transport article information acquired by the acquirer 110. Next, the unmanned vehicle determiner 125 determines the unmanned vehicle identified by the acquired vehicle ID as the unmanned vehicle to be caused to transport the article that has the characteristics expressed in the characteristics information.

The storage cabinet 990 of the unmanned vehicle 901 according to the present modified example includes a door, a non-illustrated door frame that receives the door, a non-illustrated bolt that is a deadbolt installed on a back side of the door, and a strike plate that is a seat of the deadbolt and that is installed on the door frame.

Additionally, the storage cabinet 990 includes a non-illustrated motor which, in accordance with signals output from the drive circuit 919 of the control device 910 that is connected by a non-illustrated cable, locks the door by inserting the deadbolt into the strike plate and unlocks the door by pulling the deadbolt out of the strike plate.

In step S24 of FIG. 12, the CPU 911 of the unmanned vehicle 901 according to the present modified example outputs a signal that causes the door of the storage cabinet 990 to unlock and open and, for example, drops the article at the destination by directing the opened door of the storage cabinet 990 downward and causing the unmanned vehicle 900 to shake while flying.

Like the storage cabinet 990 of the unmanned vehicle 901, the non-illustrated storage cabinet of each of the unmanned vehicles 902 and 903 includes a non-illustrated door, a door frame, a deadbolt, a strike plate, and a motor. As such, in step S24 of FIG. 12, the non-illustrated CPU of each of the unmanned vehicle 902 and 903 outputs a signal similar to the control signal output by the CPU 911 of the unmanned vehicle 901 to carry out the delivery of the article at the destination.

According to these configurations, in a case in which the transport article information expresses that there is a need for refrigeration control, the unmanned vehicle determiner 125 of the control device 100 determines, from among the unmanned vehicles 901 to 903, the unmanned vehicle 902 that includes the refrigeration control function as the unmanned vehicle to be caused to transport the article. Likewise, in a case in which the transport article information expresses that there is a need for freezing control, the unmanned vehicle determiner 125 determines the unmanned vehicle 903 that includes the freezing control function as the unmanned vehicle to be caused to transport the article. As a result, temperature control of the article during the transport of the article by the unmanned vehicle can be performed in a more reliable manner and, as such, the control device 100 can more reliably prevent the state of the article from changing during transport.

In the present modified example, a combination of Modified Example 8 of Embodiment 1 and Modified Example 6 of Embodiment 1 is described, but the present modified example is not limited thereto and Modified Example 8 of Embodiment 1 and Modified Example 1 or 7 of Embodiment 1 may be combined.

Modified Example 14 of Embodiment 1

Embodiment 1 and Modified Example 8 of Embodiment 1 can be combined. To achieve such a configuration, the characteristics information of the article may express one or more of the impact resistance of the article and whether or not temperature control is needed. Additionally, the route determiner 121 of the control device 100 may determine, on the basis of one or more of the impact resistance of the article and whether or not temperature control is needed that are expressed in the characteristics information, the transport route on which the unmanned vehicle 900 transports the article. Furthermore, the operating mode determiner 122 of the control device 100 may determine, on the basis of one or more of the impact resistance of the article and whether or not temperature control is needed that are expressed in the characteristics information, the operating mode related to behavior for when the unmanned vehicle 900 moves while carrying the article.

A combination of Embodiment 1 and Modified Example 8 of Embodiment 1 is described, but the present modified example is not limited thereto and any one of Modified Examples 1 to 7 of Embodiment 1 may be combined with Modified Example 8 of Embodiment 1.

Modified Example 15 of Embodiment 1

Figure 33:
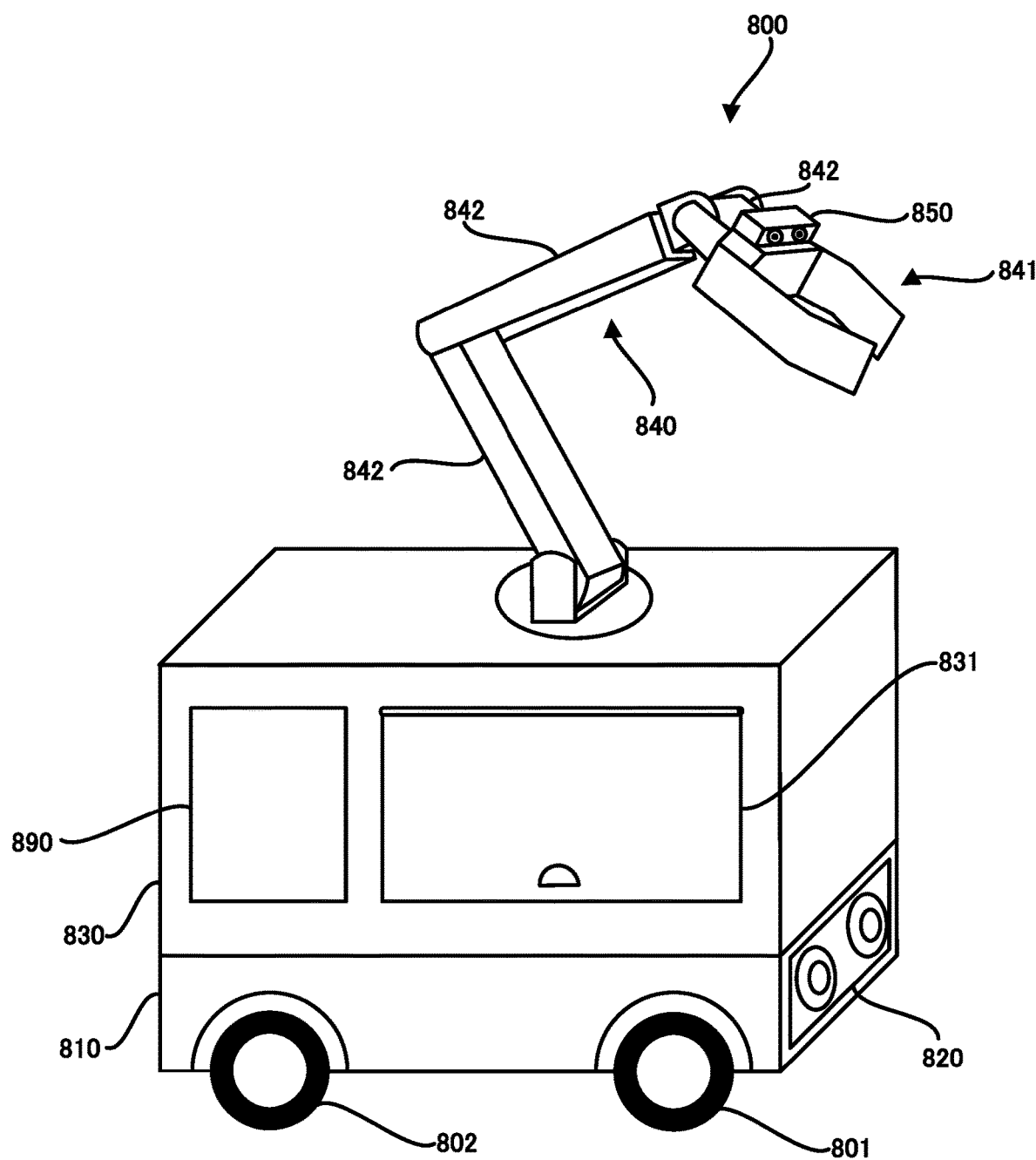
FIG. 33 is an appearance configuration drawing illustrating an example of the appearance of an unmanned vehicle according to Modified Example 15 of Embodiment 1.

In Embodiment 1, it is described that the transport system 1 includes a control device 100 such as illustrated in FIG. 1, and an unmanned vehicle 900 that is an unmanned aircraft. However, Embodiment 1 is not limited thereto. The transport system 1 according to the present modified example includes a control device 100 such as illustrated in FIG. 1, and an unmanned vehicle 800 such as illustrated in FIG. 33 that is an unmanned ground vehicle that travels unmanned on the ground.

The unmanned vehicle 800 includes a vehicle body 810 that is provided with a plurality of wheels including wheels 801 and 802, and an imaging device 820 that is installed on a front face of the vehicle body 810 in a state in which the optical axis of a non-illustrated lens is directed forward. The imaging device 820 is implemented as a digital stereo camera. The imaging device 820 captures images in front of the unmanned vehicle 800 at a predetermined cycle, and outputs two captured images that have parallax with each other to the control device 890.

The unmanned vehicle 800 further includes, on the vehicle body 810, a storage device 830 that includes a storage cabinet 831 in which an article to be delivered is stored. The unmanned vehicle 800 further includes, on a top surface of the storage device 830, a robot arm 840 that removes the article from the storage cabinet 831.

The robot arm 840 is implemented as a vertical articulated robot. The robot arm 840 includes a gripper 841 that has the same configuration and functions as the gripper 960 illustrated in FIG. 17, a plurality of joint structures that can be moved by non-illustrated motors, and a plurality of arms 842 that move around the joint structures.

Additionally, the unmanned vehicle 800 includes a control device 890 that, on the basis of the images output by the imaging device 820, drives a non-illustrated motor installed in each of the plurality of wheels so as to travel on the transport route of the article while avoiding obstacles. On the basis of captured images output by an imaging device 850 of the gripper 841 of the robot arm 840, the control device 890 drives the non-illustrated motor of the robot arm 840 so as to remove the article from the storage cabinet 831.

The control device 890 includes a CPU, a RAM, a ROM, a flash memory, a communication circuit, a GPS circuit, an input/output port, and a drive circuit (not illustrated in the drawings). The configurations and the functions of the CPU, the RAM, the ROM, the flash memory, the communication circuit, and the GPS circuit (not illustrated in the drawings) of the control device 890 are the same as the configurations and the functions of the CPU 911, the RAM 912, the ROM 913a, the flash memory 913b, the communication circuit 914, and the GPS circuit 916 of the control device 910 of the unmanned vehicle 900 illustrated in FIG. 11.

The input/output port of the control device 890 is connected to a non-illustrated cable that is connected to the imaging device 820 installed on the front face of the vehicle body 810, and outputs, to the non-illustrated flash memory, the captured images output by the imaging device 820. Additionally, the input/output port of the control device 890 is connected, via non-illustrated cables, to the non-illustrated drive circuit and the imaging device 850 of the robot arm 840. The input/output port outputs, to the drive circuit or the imaging device 850 of the robot arm 840, control signals output from the non-illustrated CPU, and outputs, to the non-illustrated flash memory the captured images output from the imaging device 850.

The drive circuit of the control device 890 is connected by cables to each of the non-illustrated plurality of motors that rotate each of the plurality of wheels including the wheels 810 and 802, and drives the plurality of motors in accordance with signals output by the non-illustrated CPU.

The CPU of the control device 890 acquires the transport route information, which is included in the transport control information that the non-illustrated communication circuit receives from the control device 100, and reads, from the non-illustrated flash memory, the images captured by the imaging device 820 installed on the front face of the vehicle body 810. Thereafter, the CPU generates, on the basis of the read images, a control signal for moving forward on the transport route expressed in the transport route information while avoiding obstacles, and outputs the generated control signal to the non-illustrated drive circuit. The drive circuit drives, in accordance with the output control signal, the non-illustrated plurality of motors that respectively rotate the plurality of wheels. As a result, the unmanned vehicle 800 moves on the transport route in accordance with the transport control information.

The CPU of the control device 890 generates, on the basis of the images output from the imaging device 850 of the robot arm 840, a control signal that causes the article to be removed from the storage cabinet 831, and outputs the generated control signal to the non-illustrated input/output port. In accordance with the control signal that is input via the input/output port, the robot arm 840 removes the article stored in the storage cabinet. Furthermore, the CPU of the control device 890 generates, on the basis of the images output from the imaging device 850, a control signal for placing the removed article in the yard, the driveway, the doorstep, or the hallway of the destination, or storing the removed article in a delivery box installed in the yard or the shared space of the destination, and outputs the generated control signal to the input/output port. The robot arm 840 places or stores the article in accordance with the control signal that is input via the input/output port. Thereafter the CPU of the control device 890 generates and outputs, to the non-illustrated drive circuit, a control signal for traveling backward on the transport route. Thus, the unmanned vehicle 800 can execute the leave delivery method in which the article is delivered by leaving the article at the destination.

In this leave delivery method, only a slight impact is applied to the article when placing the article on the floor or the ground, or in the delivery box. In the present modified example, the robot arm 840 places the article at a speed whereby the only impact that occurs is impact that does not change or is unlikely to change the state of articles that have the low impact resistance, the standard impact resistance, or the strong impact resistance. Therefore, the leave delivery method is an appropriate delivery method for articles that have the weak impact resistance, the standard impact resistance, or the strong impact resistance.

Furthermore, the CPU of the control device 890 may generate, on the basis of the images output from the imaging device 850, a control signal for tossing the removed article on, for example, the yard, the driveway, the doorstep, the hallway, or the balcony of the destination, and output the generated control signal to the input/output port. In this case, the robot arm 840 tosses the article in accordance with the control signal that is input via the input/output port. Thus, the unmanned vehicle 800 can execute a toss delivery method in which the article is delivered by tossing the article to the destination.

In this toss delivery method, an impact is applied to the article when the article collides with the floor or the ground. In the present modified example, the robot arm 840 tosses the article at an initial velocity whereby an impact occurs that changes or is likely to change the state of articles that have the low impact resistance or the standard impact resistance, and that does not change or is unlikely to change the state of articles that have the strong impact resistance. Therefore, the toss delivery method is an appropriate delivery method for articles that have the strong impact resistance. According to the toss delivery method, the unmanned vehicle 800 can deliver without moving to the destination and, as such, the delivery efficiency of the toss delivery method is better than the delivery efficiency of the leave delivery method.

Furthermore, the CPU of the control device 890 generates, on the basis of the images output from the imaging device 850, a control signal for handing the article that is removed from the storage cabinet 831 to a person at the destination, and outputs the generated control signal to the input/output port. The robot arm 840 hands the article to the person in accordance with the control signal that is input via the input/output port. Thus, the unmanned vehicle 800 can execute the deliver-to-person delivery method in which the article is handed to a person at the destination.

If an article that needs temperature control is delivered by this deliver-to-person delivery method, the temperature control can be taken over by the person to whom the article is delivered and, as such, the deliver-to-person delivery method is better suited as a delivery method for articles that need temperature control than the leave delivery method and the toss delivery method.

Modified Example 16 of Embodiment 1

It is described that the unmanned vehicle 900 according to Embodiment 1 is implemented as an unmanned aircraft, however Embodiment 1 is not limited thereto and the unmanned vehicle 900 may be implemented as an unmanned ground vehicle, an unmanned water vehicle, or an unmanned underwater vehicle. Any type of unmanned ground vehicle is possible, provided that the unmanned ground vehicle is a machine or device that moves unmanned on the ground. Examples thereof include robots that walk unmanned on the ground. Any type of unmanned water vehicle is possible, provided that the unmanned water vehicle is a machine or device that moves unmanned on water. Examples thereof include unmanned boats. Any type of unmanned underwater vehicle is possible, provided that the unmanned underwater vehicle is a machine or device that moves unmanned underwater. Examples thereof include unmanned submarines. Furthermore, any type of unmanned aircraft is possible provided that the unmanned aircraft is a machine or device that flies unmanned in the sky. Examples thereof include drones.

Modified Example 17 of Embodiment 1

In Embodiment 1, it is described that the transport system 1 includes a control device 100 such as illustrated in FIG. 1, and an unmanned vehicle 900. However, Embodiment 1 is not limited thereto. A configuration is possible in which the transport system 1 does not include the control device 100, and the control device 910 of the unmanned vehicle 900 illustrated in FIG. 10 demonstrates the functions of the control device 100 according to Embodiment 1.

That is, the CPU 911 of the control device 910 of the unmanned vehicle 900 illustrated in FIG. 11 may execute the transport control processing illustrated in FIG. 3. Thus, the CPU 911 of the unmanned vehicle 900 may function as an acquirer, a route determiner, an operating mode determiner, a generator, and a controller (all not illustrated in the drawings) that respectively have the same functions as the acquirer 110, the route determiner 121, the operating mode determiner 122, the generator 130, and the controller 140 of the control device 100 illustrated in FIG. 5. Moreover, the flash memory 913b of the control device 910 of the unmanned vehicle 900 may function as a non-illustrated information storage unit that has the same functions as the information storage unit 190 of the control device 100 illustrated in FIG. 5.

Embodiment 2

A control device 100 according to the present embodiment differs from the control device 100 according to Embodiment 1 in that the control device 100 according to the present embodiment detects position changes of the center of gravity of the article caused by inertial forces or gravitational forces acting on the article during the transport of the article by the unmanned vehicle 900 and the article tipping, overturning, or sliding in the cardboard or similar packaging. Additionally, the control device 100 according to the present embodiment differs from the control device 100 according to Embodiment 1 in that, when the control device 100 according to the present embodiment detects a position change in the center of gravity of the article, the control device 100 changes the transport route on which the unmanned vehicle 900 transports the article and the operating mode in which the article is transported. In the following, the configurations that are the same as those in Embodiment 1 are marked with the same reference numerals used in Embodiment 1, and the description focuses on the differences between the present embodiment and Embodiment 1.

The CPU 101 of the control device 100 according to the present embodiment executes the transport control processing of FIG. 3 to determine the transport route and the operating mode, and carries out control that causes the unmanned vehicle 900 to move on that transport route in the determined operating mode. In the present embodiment, before the execution of the transport control processing is ended, the CPU 101 stores, in the information storage unit 190, the destination information acquired by the execution of step S01 of FIG. 3, the operating mode information expressing the operating mode determined by the execution of step S05, and the information expressing the plurality of weighting factors corrected in step S14 of FIG. 9. The CPU 101 stores these pieces of information because these pieces of information are required to execute control change processing such as illustrated in FIG. 34 to change the transport route and the operating mode.

Figure 34:
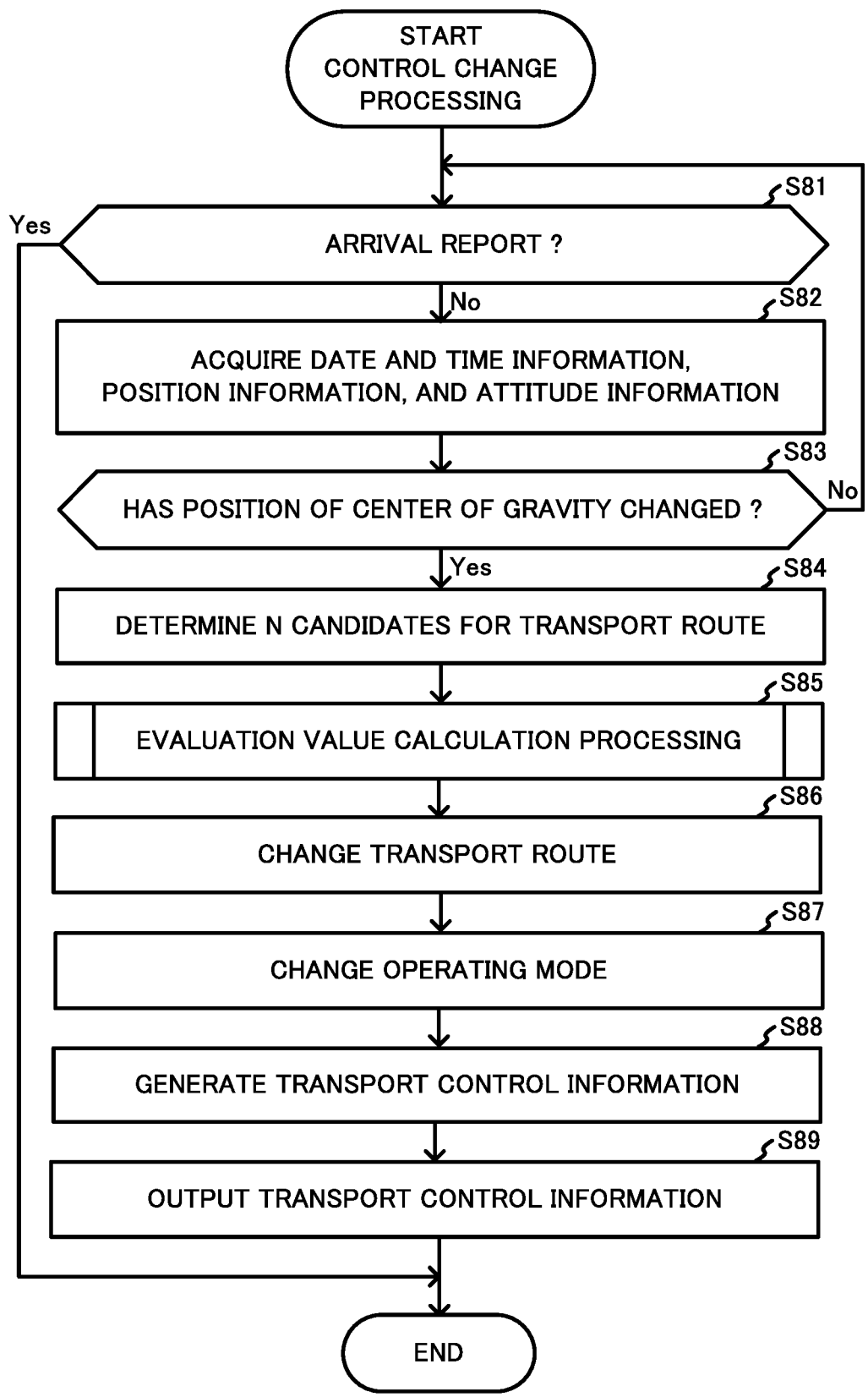
FIG. 34 is a flowchart illustrating control change processing executed by the control device of the transport system.

After executing the transport control processing of FIG. 3, when the communication circuit 104 of the control device 100 receives date and time information expressing a date and time, position information expressing the position of the unmanned vehicle 900 at that date and time, and attitude information expressing the attitude of the unmanned vehicle 900 at that date and time, the CPU 101 of the control device 100 uses the date and time information, the position information, and the attitude information that are received to execute the control change processing of FIG. 34.

Figure 35:
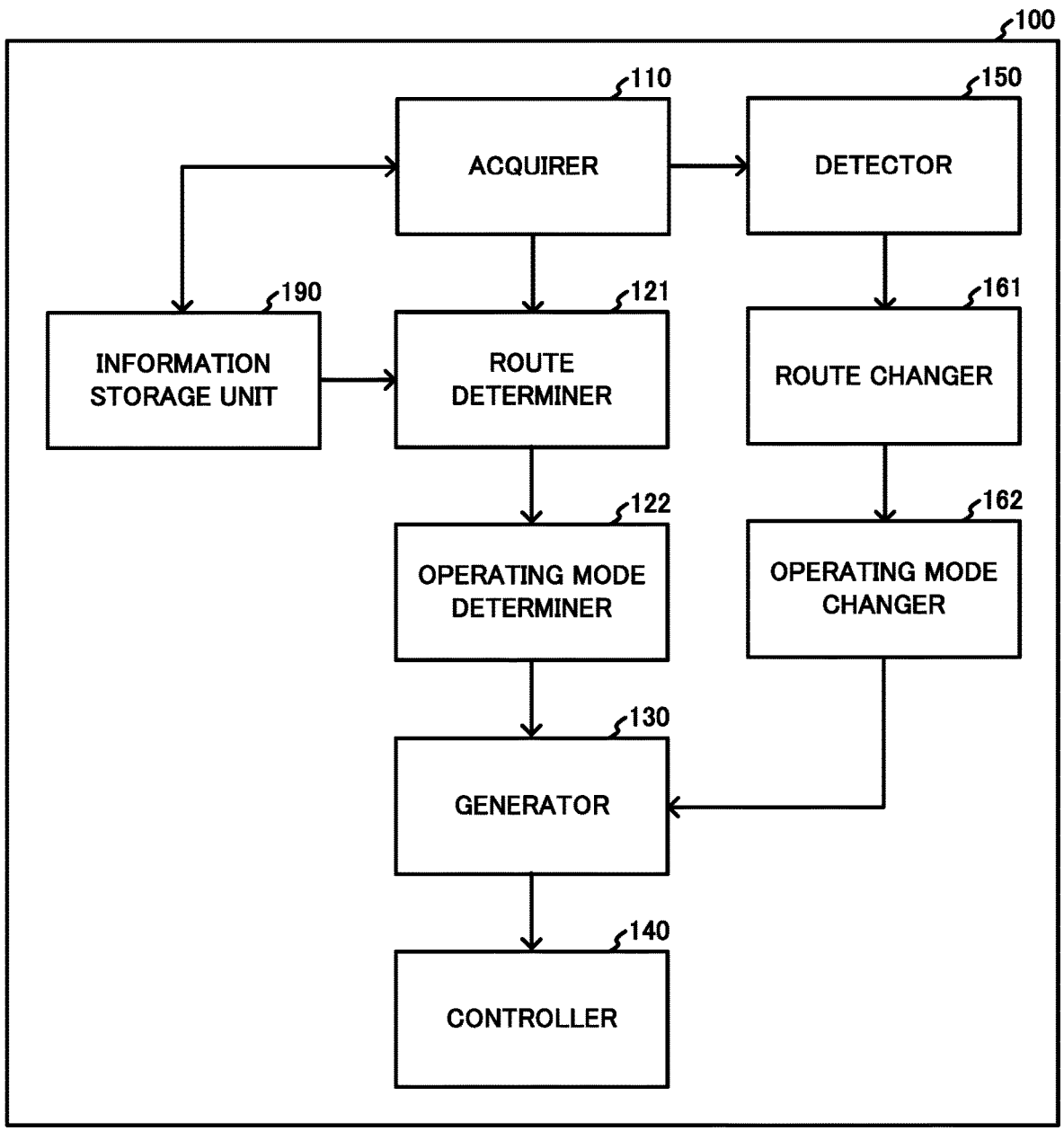
FIG. 35 is a functional block diagram illustrating an example of the functions of a control device of a transport system according to Embodiment 2.

Thus, the CPU 101 of the control device 100 functions as a detector 150 such as illustrated in FIG. 35 that detects, on the basis of a change in the attitude of the unmanned vehicle 900 expressed in the attitude information, a change in the position of the center of gravity of the article that the unmanned vehicle 900 is carrying.

Additionally, the CPU 101 of the control device 100 functions as a route changer 161 that, when the detector 150 detects a change in the position of the center of gravity, changes the transport route determined by the execution of the transport control processing of FIG. 3. The route changer 161 sets, as a changed transport route, a route from the position of the unmanned vehicle 900 expressed in the received position information to the destination, on which the number of times that the unmanned vehicle 900 changes speed is fewer than on the transport route from that position to the destination before the change.

Furthermore, the CPU 101 functions as an operating mode changer 162 that, when a change in the position of the center of gravity is detected, changes the operating mode determined by the execution of the transport control processing of FIG. 3. The operating mode changer 162 sets, as a changed operating mode, an operating mode that imposes a speed limit slower than the speed limit of the operating mode before the change and an acceleration limit smaller than the acceleration limit of the operating mode before the change.

A non-illustrated state history table is stored in advance in the information storage unit 190 of the present embodiment. A plurality of records is stored in the state history table, and information about the state of the unmanned vehicle 900 is stored in the plurality of records. The date and time information expressing the date and time, the position information expressing the position of the unmanned vehicle 900 at that date and time, and the attitude information expressing the attitude of the unmanned vehicle 900 at that date and time are associated and stored in each record of the state history table.

Additionally, an operating mode table such as illustrated in FIG. 36 is stored in the information storage unit 190 of the present embodiment. The same information as in the first to third records of the operating mode table of FIG. 8 is stored in advance in the first to third records of the operating mode table of FIG. 36. Operating mode information expressing a super-low speed mode, in which a speed limit slower than the speed limit of the low-speed mode and an acceleration limit smaller than the acceleration limit of the low-speed mode are imposed on the unmanned vehicle 900, is stored in advance in the fourth record of the operating mode table.

When the execution of the control change processing of FIG. 34 starts, the acquirer 110 of the control device 100 determines whether or not the communication circuit 104 has received an arrival report indicating that the unmanned vehicle 900 has arrived at the destination of the article (step S81).

When the acquirer 110 determines that an arrival report is received (step S81; Yes), the control change processing is ended. In contrast, when the acquirer 110 determines that an arrival report is not received (step S81; No), the acquirer 110 acquires the date and time information, the position information, and the attitude information from the communication circuit 104 (step S82). Next, the acquirer 110 associates the acquired date and time information, the position information, and the attitude information with each other and stores the associated pieces of information in the non-illustrated state history table that is stored in the information storage unit 190.

Thereafter, the detector 150 acquires, from the information storage unit 190, information expressing a predetermined amount of observation time as an amount of time for observing the attitude of the unmanned vehicle 900. Next, the detector 150 acquires the system date and time and calculates a first date and time that is the amount of observation time prior to the acquired system date and time. Thereafter, the detector 150 acquires, from the state history table, a plurality of records in which date and time information is stored that expresses dates and times included in a first period from the first date and time to the system date and time. Next, the detector 150 identifies a change cycle of the attitude of the unmanned vehicle 900 in the first period on the basis of the date and time expressed in the date and time information and the attitude of the unmanned vehicle 900 at the date and time expressed in the attitude information that are stored in each of the acquired plurality of records.

Additionally, the detector 150 acquires, from the state history table, a plurality of records in which date and time information is stored that expresses dates and times included in a second period from a second date and time, which is the amount of observation time prior to the first date and time, to the first date and time. Next, the detector 150 identifies the change cycle of the attitude of the unmanned vehicle 900 in the second period on the basis of the date and time information and the attitude information stored in each of the acquired plurality of records.

Thereafter, the detector 150 calculates the difference between the change cycle of the attitude in the first period and the change cycle of the attitude in the second period. Next, the detector 150 acquires, from the information storage unit 190, information expressing a predetermined threshold, and determines whether or not the calculated difference between the change cycles is greater than the acquired threshold to determine whether or not the change cycle of the attitude has changed. The detector 150 detects whether or not the position of the center of gravity of the article carried by the unmanned vehicle 900 has changed by determining whether or not the change cycle of the attitude has changed (step S83).

The detector 150 performs detection in this manner because, when the unmanned vehicle 900, the article, and the packaging of the article are considered to be a single object, the change cycle on which the attitude of the unmanned vehicle 900 carrying the article changes is mainly determined by the distance from the propellers 931 to 934 that generate lift to the center of gravity of the single object.

In this case, the positions of the propellers 931 to 934, the position of the center of gravity of the unmanned vehicle 900 itself, and the position of the center of gravity of the packaging itself that is held by the unmanned vehicle 900 do not change. However, for example, in a case in which the article is not sufficiently fixed by cushioning material or the like in the cardboard or similar packaging, or in a case in which the fixed state of the article is degraded, the position of the article in the packaging may change, thereby changing the position of the center of gravity of the article. As such, the detector 150 detects whether or not the position of the center of gravity of the article itself has changed by determining whether or not the change cycle of the attitude of the unmanned vehicle 900 has changed.

At this time, when the detector 150 determines that the difference between the change cycles is less than or equal to the threshold, the detector 150 determines that the change cycle of the attitude of the unmanned vehicle 900 has not changed, and detects that the position of the center of gravity of the article has not changed (step S83; No). Thereafter, the processing is repeated from step S81.

In contrast, when the detector 150 determines that the difference between the change cycles is greater than the threshold, the detector 150 determines that the change cycle of the attitude has changed, and detects that the position of the center of gravity of the article has changed (step S83; Yes). Additionally, the detector 150 detects that the packaged article has characteristics of moving or being likely to move in the packaging.

Thereafter, the route changer 161 of FIG. 35 acquires, from the state history table, the position information associated with the date and time information expressing the date and time closest to the system date and time. Next, the route changer 161 reads the destination information expressing the destination of the article in transport from the information storage unit 190. Thereafter, the route changer 161 uses the acquired position information and the read destination information to execute the same processing as step S02 of FIG. 3. As a result, the route changer 161 determines N candidates of transport routes from the position of the unmanned vehicle 900 expressed in the position information to the destination expressed in the destination information (step S84).

Next, the route changer 161 executes the evaluation value calculation processing illustrated in FIG. 9, in which the overall evaluation values of the N candidates are calculated (step S85). When the execution of the evaluation value calculation processing starts, the route changer 161 initializes the variable n to a value of "1" (step S11). Thereafter, the route changer 161 executes the same processing as step S12 discussed in Embodiment 1 to calculate, for the nth candidate, the first evaluation value based on the total transport distance, the second evaluation value based on the degree of congestion, and the third evaluation value based on the number of direction changes (step S12).

Next, the route changer 161 reads, from the information storage unit 190, the information expressing the values of the plurality of weighting factors used in the calculation of the overall evaluation value of the transport route before the change for the nth candidate, sets the values expressed in the read information as the initial values, and initializes the plurality of weighting factors to those initial values (step S13).

Thereafter, the route changer 161 does not correct the weighting factor of the first evaluation value based on the total transport distance, and corrects the weighting factor of the second evaluation value based on the degree of congestion and the weighting factor of the third evaluation value based on the number of direction changes to values greater than the values read in step S13 (step S14).

The route changer 161 performs correction in this manner because, on transport route candidates in which the unmanned vehicle 900 performs evasive maneuvers and direction changes a fewer number of times while transporting the article from the position of the unmanned vehicle 900 to the destination, the unmanned vehicle 900 changes speed due to the evasive maneuvers and direction changes a fewer number of times compared to when evasive maneuvers and direction changes are performed a greater number of times. Moreover, when the unmanned vehicle 900 changes speed a fewer number of times, inertial forces act on the article a fewer number of times and, as such, the article moves in the packaging material and is subjected to impact as a result of, for example, colliding with the packaging material a fewer number of times. That is, this correction is performed because transport route candidates on which the unmanned vehicle 900 performs evasive maneuvers and direction changes a fewer number of times are better suited, as transport routes of articles that have a characteristic of moving or being likely to move in the packaging, than candidates on which evasive maneuvers and direction changes are performed a greater number of times.

Then, the route changer 161 calculates an overall evaluation value of the nth candidate by weighting the plurality of evaluation values calculated in step S12 with the plurality of weighting factors corrected in step S14 (step S15).

Thereafter, the route changer 161 increases the value of the variable n by "1" (step S16) and, then, repeats the processing from step S12 until the value of the variable n is greater than the total number N of the transport route candidates. When the route changer 161 determines that the value of the variable n is greater than the total number N of the candidates (step S17; Yes), the execution of the evaluation value calculation processing is ended.

After the execution of the evaluation value calculation processing in step S85 of FIG. 34, the route changer 161 executes the same processing as step S04 of FIG. 3 to determine a new transport route on the basis of the N overall evaluation values calculated for each of the N candidates. Thereafter, the route changer 161 changes the transport route on which the unmanned vehicle 900 is to be caused to move from the transport route before the change determined in step S04 of FIG. 3 to the determined new transport route (step S86).

Next, the operating mode changer 162 reads, from the information storage unit 190, the operating mode information expressing the operating mode before the change determined by the execution of step S05 of FIG. 3. Thereafter, the operating mode changer 162 acquires, from the operating mode table of FIG. 36, operating mode information expressing an operating mode that imposes, on the unmanned vehicle 900, a speed limit slower than the speed limit of the operating mode before the change, and an acceleration limit smaller than the acceleration limit of the operating mode before the change that are expressed in the read operating mode information. Next, the operating mode of the unmanned vehicle 900 is changed from the operating mode before the change determined in step S05 of FIG. 3 to the new operating mode expressed in the acquired operating mode information (step S87).

Thereafter, the generator 130 generates new transport control information that changes the transport route of the unmanned vehicle 900 to the new transport route determined in step S86, and changes the operating mode to the new operating mode determined in step S87 (step S88). The new transport control information generated by the generator 130 includes transport route information expressing the new transport route, and operating mode information expressing the new operating mode. Thereafter, the generator 130 adds the vehicle ID of the unmanned vehicle 900 to the transport control information, and outputs the transport control information to the controller 140.

Next, the controller 140 sets the new transport control information generated by the generator 130 as a new control command, and outputs the control command to the communication circuit 104 illustrated in FIG. 2 (step S89). Then, after the communication circuit 104 sends the new control command to the unmanned vehicle 900, the controller 140 ends the execution of the control change processing.

Figure 37:
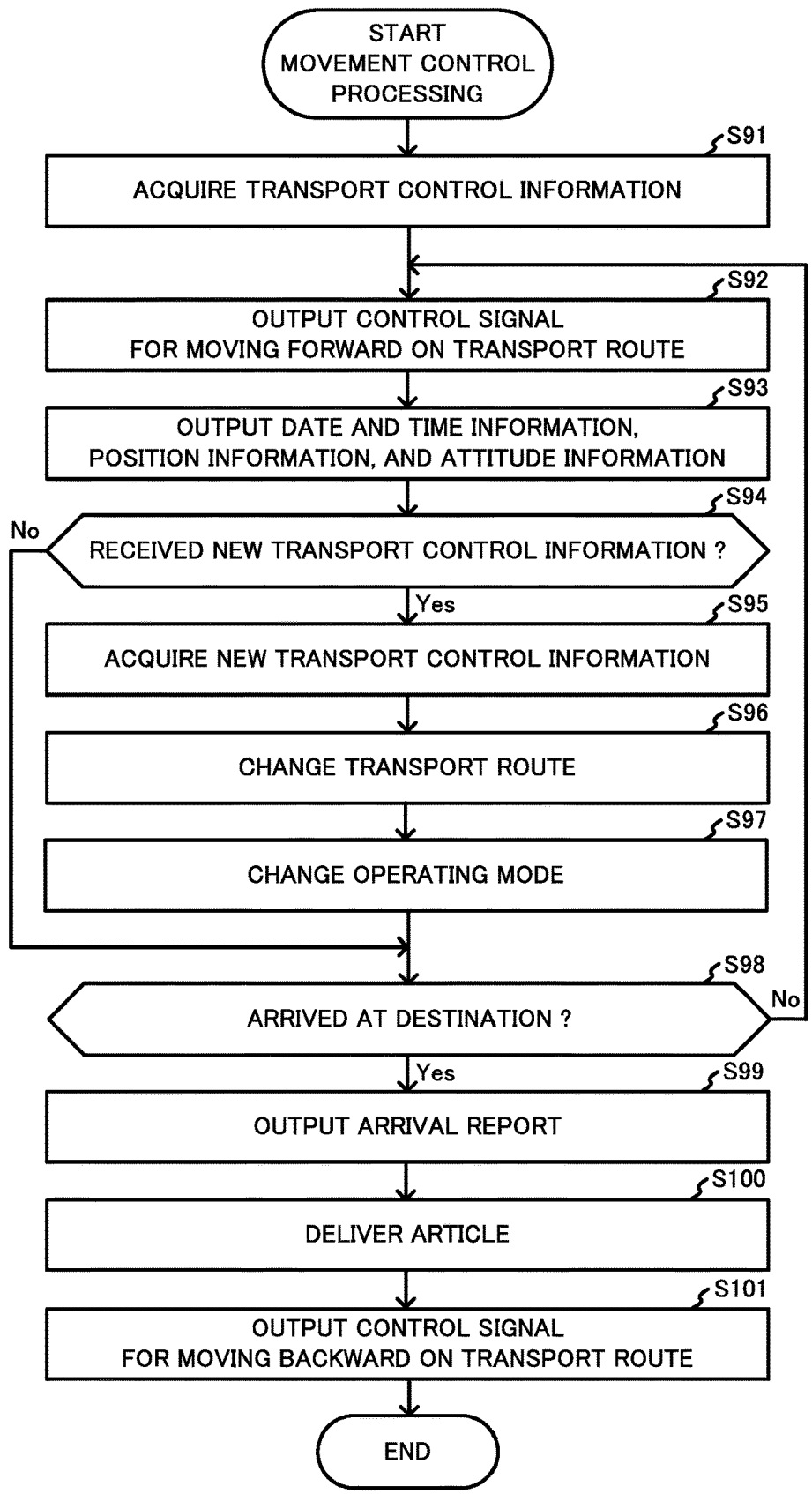
FIG. 37 is a flowchart illustrating movement control processing executed by an unmanned vehicle according to Embodiment 2.

When the communication circuit 914 of the unmanned vehicle 900 illustrated in FIG. 11 receives a control command sent from the control device 100 prior to the new control command, the CPU 911 of the control device 910 executes movement control processing such as illustrated in FIG. 37 that causes the unmanned vehicle 900 to transport the article in accordance with that control command.

When the execution of the movement control processing starts, the CPU 911 of the unmanned vehicle 900 executes the same processing as steps S21 and S22 of FIG. 12 (steps S91 and S92). As a result, the CPU 911 acquires the transport control information sent as a control command prior to the new control command, and outputs a control signal that causes the unmanned vehicle 900 to move forward on the transport route in the operating mode expressed in the acquired transport control information.

Next, the CPU 911 of the unmanned vehicle 900 acquires the system date and time and generates date and time information expressing the acquired system date and time. Additionally, the CPU 911 acquires a signal output from the GPS circuit 916, and generates position information expressing the position of the unmanned vehicle 900 expressed in the acquired signal. Furthermore, the CPU 911 acquires a signal output from the attitude sensor 917, and generates attitude information expressing the attitude of the unmanned vehicle 900 expressed in the acquired signal. Thereafter, the CPU 911 outputs, to the communication circuit 914, the date and time information, the position information, and the attitude information with the control device 100 as the destination.

After the communication circuit 914 of the unmanned vehicle 900 sends the date and time information, the position information, and the attitude information to the control device 100, the CPU 911 of the unmanned vehicle 900 determines whether or not the communication circuit 914 has received the new transport control information from the control device 100 (step S94). At this time, when the CPU 911 determines that the communication circuit 914 has received the new transport control information (step S94;

Yes), the CPU 911 acquires the new transport control information from the communication circuit 914 (step S95).

Thereafter, the CPU 911 of the unmanned vehicle 900 changes the transport route from the transport route expressed in the transport route information included in the transport control information acquired in step S91 to the new transport route expressed in the transport route information included in the new transport control information acquired in step S95 (step S96).

Next, the CPU 911 of the unmanned vehicle 900 changes the operating mode for moving on the new transport route from the operating mode expressed in the operating mode information included in the transport control information acquired in step S91 to the new operating mode expressed in the operating mode information included in the new transport control information acquired in step S95 (step S97).

After executing step S97, or in step S94, when it is determined that the communication circuit 914 has not received the new transport control information (step S94; No), the CPU 911 of the unmanned vehicle 900 executes the same processing as step S23 of FIG. 12 to determine whether or not the unmanned vehicle 900 has arrived at the destination (step S98). Here, when the CPU 911 determines that the unmanned vehicle 900 has not arrived at the destination (step S98; No), the CPU 911 repeats the processing from step S92. In contrast, when the CPU 911 determines that the unmanned vehicle 900 has arrived at the destination (step S98; Yes), the CPU 911 outputs an arrival report to the communication circuit 914 with the control device 100 as the destination (step S99).

After the communication circuit 914 of the unmanned vehicle 900 sends the arrival report to the control device 100, the CPU 911 performs the same processing as steps S24 and S25 of FIG. 12 (steps S100 and S101) and, then, ends the execution of the movement control processing. Thus, the article is delivered and the unmanned vehicle 900 is returned.

According to these configurations, the acquirer 110 of the control device 100 acquires the attitude information that expresses the attitude of the unmanned vehicle 900, and the detector 150 detects, on the basis of the change of the attitude expressed in the attitude information acquired by the acquirer 110, position changes of the center of gravity of the article carried by the unmanned vehicle 900. As such, the control device 100 can detect position changes of the center of gravity of the article caused by inertial forces or gravitational forces acting on the article and the article tipping, overturning, or sliding, for example, in the packaging. As a result, the control device 100 can identify, without opening the packaging, whether or not the article has a characteristic of moving or being likely to move in the packaging.

Additionally, according to these configurations, when the detector 150 detects a position change of the center of gravity, the route changer 161 of the control device 100 changes the transport route determined by the route determiner 121 to a transport route on which the unmanned vehicle 900 changes speed a fewer number of times compared to the determined transport route, and the controller 140 carries out control to cause the unmanned vehicle 900 to move on the transport route changed by the route changer 161. When the unmanned vehicle 900 changes speed a fewer number of times, inertial forces act on the article a fewer number of times and, as such, the article moves in the packaging material and is subjected to impact as a result of, for example, colliding with the packaging material a fewer number of times. As such, the control device 100 can cause the unmanned vehicle 900 to move and transport the article on a route that is more suited as a transport route for articles that have a characteristic of moving or being likely to move in packaging and, therefore, can prevent the state of the article from changing to a state that differs from the state before transport.

Furthermore, according to these configurations, when the detector 150 detects a position change of the center of gravity, the operating mode changer 162 of the control device 100 changes the operating mode determined by the operating mode determiner 122 to an operating mode that imposes a speed limit slower than the speed limit of the determined operating mode and an acceleration limit smaller than the acceleration limit of the determined operating mode. Additionally, the controller 140 of the control device 100 carries out control that causes the unmanned vehicle 900 to transport the article in the operating mode changed by the operating mode changer 162. When the acceleration at which the speed of the unmanned vehicle 900 changes is small and the speed of the unmanned vehicle 900 is slow, the inertial force that acts on the article is small and the amount of time that inertial force acts on the article is short. As such, the control device 100 can cause the unmanned vehicle 900 to transport the article in an operating mode that is more suited as an operating mode for articles that have a characteristic of moving or being likely to move in packaging and, therefore, can prevent the state of the article from changing to a state that differs from the state before transport.

Furthermore, according to these configurations, the detector 150 detects, on the basis of the attitude information acquired by the acquirer 110 since the start of the transport of the article by the unmanned vehicle 900, position changes of the center of gravity of the article carried by the unmanned vehicle 900. As such, the control device 100 can detect that the article has started to tip, overturn, slide, or the like due to the fixed state of the article in the packaging degrading due to inertial forces or gravitational forces acting on the article. As such, when the article starts to move in the packaging, the control device 100 can change the transport route and the operating mode to a route and a mode that are better suited to articles of which characteristics have changed to a characteristic of moving or being likely to move in the packaging.

In the present embodiment, it is described that the article is packaged in cardboard or the like, but the present embodiment is not limited thereto and the article may be packaged in paper, a plastic bag, or an envelope.

Modified Example 1 of Embodiment 2

In Embodiment 2, it is described that the unmanned vehicle 900 outputs the attitude information in step S93 of FIG. 37, and that the control device 100 acquires the attitude information in step S82 of FIG. 34 and in step S83 detects, on the basis of the attitude information, the position change of the center of gravity of the article that the unmanned vehicle 900 carries. However, Embodiment 2 is not limited thereto.

In step S93, in order to maintain the attitude of the unmanned vehicle 900, the CPU 911 of the unmanned vehicle 900 according to the present modified example outputs, instead of the attitude information, attitude control information that expresses control content represented by a control signal that drives the non-illustrated motors that rotate the propellers 931 to 934 illustrated in FIG. 10. Additionally, the acquirer 110 of the control device 100 according to the present modified example acquires the attitude control information in step S82 and, in step S83, the detector 150 detects, on the basis of the change in the cycle on which the control content expressed in the attitude control information changes, the position change of the center of gravity of the article carried by the unmanned vehicle 900.

Modified Example 2 of Embodiment 2

Embodiment 2 and Modified Example 1 of Embodiment 2 can be combined. To achieve such a configuration, the CPU 911 of the unmanned vehicle 900 according to the present modified example outputs both the attitude information and the attitude control information in step S93 of FIG. 37. Additionally, the acquirer 110 of the unmanned vehicle 100 according to the present modified example acquires both the attitude information and the attitude control information in step S82 of FIG. 34.

In step S83, the detector 150 determines whether or not either the change cycle of the attitude of the unmanned vehicle 900 expressed in the attitude information or the change cycle of the control content of the unmanned vehicle 900 expressed in the attitude control information changes from the first period to the second period. When the detector 150 detects that either the change cycle of the attitude or the change cycle of the control content changes from the first period to the second period, the detector 150 determines that the position of the center of gravity of the article carried by the unmanned vehicle 900 has changed. In contrast, when the detector 150 detects that neither the change cycle of the attitude nor the change cycle of the control content changes from the first period to the second period, the detector 150 determines that the position of the center of gravity of the article carried by the unmanned vehicle 900 has not changed. According to these configurations, the detector 150 of the control device 100 can more accurately detect, on the basis of the attitude information and the attitude control information, changes of the position of the center of gravity of the article.

Modified Example 3 of Embodiment 2

Embodiment 2 and Modified Example 2 of Embodiment 1 can be combined. The control device 100 according to the present modified example may further include a non-illustrated schedule changer that, when the detector 150 detects a change of the position of the center of gravity of the article carried by the unmanned vehicle 900, changes the transport time determined by the schedule determiner 123 illustrated in FIG. 14 to a transport time longer than the determined transport time. The controller 140 of the control device 100 may carry out control to cause the unmanned vehicle 900 to move on the transport route changed by the route changer 161 of FIG. 35 within the transport time changed by the schedule changer.

Modified Example 4 of Embodiment 2

Embodiment 2 and Modified Example 3 of Embodiment 1 can be combined. The control device 100 according to the present modified example may further include a non-illustrated schedule changer that, when the detector 150 detects a change of the position of the center of gravity of the article carried by the unmanned vehicle 900, changes the end time determined by the schedule determiner 123 illustrated in FIG. 14 to an end time later than the determined end time. The controller 140 of the control device 100 may carry out control to cause the unmanned vehicle 900 to move on the transport route changed by the route changer 161 of FIG. 35 by the end time changed by the schedule changer.

Embodiments 1 and 2, Modified Examples 1 to 17 of Embodiment 1, and Modified Examples 1 to 4 of Embodiment 2 can each be combined with each other. It is possible to provide a control device 100 that includes configurations for realizing the functions according to any of Embodiments 1 and 2, Modified Examples 1 to 16 of Embodiment 1, and Modified Examples 1 to 4 of Embodiment 2, and a control device 910 that includes configurations for realizing the functions according to Modified Example 17 of Embodiment 1. In addition, it is possible to provide a system that includes a plurality of devices that includes, as an overall system, configurations for realizing the functions according to any of Embodiments 1 and 2, Modified Examples 1 to 17 of Embodiment 1, and Modified Examples 1 to 4 of Embodiment 2.

Additionally, by applying a program, an existing control device 100 can be made to function as the control device 100 according to each of Embodiments 1 and 2, Modified Examples 1 to 16 of Embodiment 1, and Modified Examples 1 to 4 of Embodiment 2. That is, by applying a program for realizing the various functional configurations of the control device 100 described in any of Embodiments 1 and 2, Modified Examples 1 to 16 of Embodiment 1, and Modified Examples 1 to 4 of Embodiment 2 so as to be executable by a computer (CPU or the like) that controls an existing control device, that existing control device can be caused to function as the control device 100 according to any of Embodiments 1 and 2, Modified Examples 1 to 16 of Embodiment 1, and Modified Examples 1 to 4 of Embodiment 2.

Additionally, by applying a program, an existing control device 910 can be made to function as the control device 910 according to Modified Example 17 of Embodiment 1. That is, by applying a program for realizing the various functional configurations of the control device 910 described in Modified Example 17 of Embodiment 1 so as to be executable by a computer (CPU or the like) that controls an existing control device, that existing control device can be caused to function as the control device 910 according to Modified Example 17 of Embodiment 1.

Any distribution method of such a program can be used. For example, the program can be stored and distributed on a recording medium such as a memory card, a compact disc read-only memory (CD-ROM), or a digital versatile disk read-only memory (DVD-ROM), or can be distributed via a communication medium such as the internet. Additionally, the method according to the present disclosure can be implemented using the control device 100 according to any of Embodiments 1 and 2, Modified Examples 1 to 16 of Embodiment 1, and Modified Examples 1 to 4 of Embodiment 2, and the control device 910 according to Modified Example 17 of Embodiment 1.

Preferred embodiments of the present disclosure have been described, but the present disclosure should not be construed as being limited to these specific embodiments. Various modifications and changes may be made within the broader spirit and scope of the invention as set forth in the claims.

Appendices

Appendix 1

A control device, including:
 an acquirer that acquires transport article information expressing a characteristic of an article to be transported; and a generator that generates, on the basis of the characteristic expressed in the acquired transport article information, transport control information that causes an unmanned vehicle to transport the article.

Appendix 2

The control device according to appendix 1, further including:
a route determiner that determines, on the basis of the characteristic expressed in the acquired transport article information, a transport route on which the unmanned vehicle is to transport the article, wherein
the generator generates the transport control information that includes transport route information expressing the determined transport route and that causes the unmanned vehicle to move on the transport route.

Appendix 3

The control device according to appendix 2, further including:
an operating mode determiner that determines, on the basis of the characteristic expressed in the acquired transport article information, an operating mode related to behavior for when the unmanned vehicle moves on the transport route carrying the article, wherein
the generator generates the transport control information that further includes operating mode information expressing the determined operating mode and that causes the unmanned vehicle to move on the transport route in the operating mode.

Appendix 4

The control device according to appendix 2, further including:
a schedule determiner that determines, on the basis of the characteristic expressed in the acquired transport article information, a transport time for the unmanned vehicle to move on the transport route and transport the article, wherein
the generator generates the transport control information that further includes schedule information expressing the determined transport time and that causes the unmanned vehicle to move on the transport route within the transport time.

Appendix 5

The control device according to appendix 2, further including:
a schedule determiner that determines, on the basis of the characteristic expressed in the acquired transport article information, an end time at which the unmanned vehicle completes transportation of the article, wherein
the generator generates the transport control information that further includes schedule information expressing the determined end time and that causes the unmanned vehicle to move on the transport route by the end time.

Appendix 6

The control device according to appendix 2, wherein
the transport article information further expresses a specified time block specified as a time block in which transportation of the article is to be completed,
the control device further includes a schedule determiner that determines, on the basis of the characteristic and the specified time block expressed in the acquired transport article information, a start time at which the unmanned vehicle starts the transportation of the article, and
the generator generates the transport control information that further includes schedule information expressing the determined start time and the specified time block and that causes the unmanned vehicle to start moving at the start time and complete moving on the transport route at a time included in the specified time block.

Appendix 7

The control device according to any one of appendices 1 to 6, further including:
a delivery method determiner that determines, on the basis of the characteristic expressed in the acquired transport article information, a delivery method of the article by the unmanned vehicle, wherein
the generator generates the transport control information that includes delivery method information expressing the determined delivery method and that causes the unmanned vehicle to deliver the article by the determined delivery method.

Appendix 8

The control device according to any one of appendices 1 to 7, further including:
an unmanned vehicle determiner that determines, on the basis of the characteristic expressed in the acquired transport article information, the unmanned vehicle to be caused to transport the article from a plurality of unmanned vehicles, wherein
the generator generates the transport control information that includes vehicle identification information identifying the determined unmanned vehicle and that causes the determined unmanned vehicle to transport the article.

Appendix 9

The control device according to any one of appendices 1 to 8, wherein the characteristic of the article includes an impact resistance of the article.

Appendix 10

The control device according to any one of appendices 1 to 9, wherein the characteristic of the article includes whether or not a temperature of the article needs to be controlled.

Appendix 11

The control device according to any one of appendices 1 to 10, wherein the unmanned vehicle is an unmanned aircraft or an unmanned ground vehicle.

Appendix 12

The control device according to any one of appendices 1 to 11, further including:
a controller that controls, on the basis of the generated transport control information, the unmanned vehicle to be caused to transport the article to transport the article.

Appendix 13

The control device according to any one of appendices 2 to 6, wherein
after the unmanned vehicle starts transporting the article, the acquirer acquires at least one of attitude information expressing an attitude of the unmanned vehicle or attitude control information expressing a control content on the attitude of the unmanned vehicle, and
the control device further including:
a detector that detects, on the basis of at least one of a change in the attitude expressed in the acquired attitude information or a change in the control content expressed in the attitude control information, a change in a position of a center of gravity of the article carried by the unmanned vehicle;
a route changer that, when the change is detected, changes the determined transport route to a transport route on which the unmanned vehicle changes speed a fewer number of times compared to the determined transport route; and a controller that carries out control that causes the unmanned vehicle to move on the changed transport route.

Appendix 14

An unmanned vehicle that transports an article, the unmanned vehicle including:
an acquirer that acquires transport article information expressing a characteristic of the article to be transported; and
a generator that generates, on the basis of the characteristic expressed in the acquired transport article information, transport control information that causes the unmanned vehicle to transport the article.

Appendix 15

A method that is executed by a control device, the method including:
acquiring transport article information expressing a characteristic of an article to be transported, and
generating, on the basis of the characteristic expressed in the acquired transport article information, transport control information that causes an unmanned vehicle to transport the article.

REFERENCE SIGNS LIST

1 Transport system
100, 890, 910 Control device
101, 911 CPU
102, 912 RAM
103a, 913a ROM
103b Hard disk
104, 914 Communication circuit
105a Video card
105b Display device
105c Input device
110 Acquirer
121 Route determiner
122 Operating mode determiner
123 Schedule determiner
124 Delivery method determiner
125 Unmanned vehicle determiner
130 Generator
140 Controller
150 Detector
161 Route changer
162 Operating mode changer
190 Information storage unit
800, 900, 901, 902, 903 Unmanned vehicle
801, 802 Wheel
810 Vehicle body
820, 850, 951, 962 Imaging device
830 Storage device
831, 990 Storage cabinet
840 Robot arm
841, 960 Gripper
842 Arm
913b Flash memory
916 GPS circuit
917 Attitude sensor
918 Input/output port
919 Drive circuit
921 to 924 Propeller arm
931 to 934 Propeller
941a First holding frame
941b Second holding frame
942a, 942b Guide rail
943 Support leg
961 Claw
970 Wire
980 Winch
981 Drum
982 Protrusion
983 Support member
IN Internet

The invention claimed is:

1. A control device, comprising:
at least one memory storing program code; and
at least one processor operable to read the program code and operate as instructed by the program code, wherein the program code includes:
acquiring code configured to cause the at least one processor to acquire transport article information expressing a characteristic of an article to be transported;
route determining code configured to cause the at least one processor to determine, on a basis of the characteristic expressed in the acquired transport article information, a transport route on which an unmanned vehicle is to transport the article; and
generating code configured to cause the at least one processor to generate, on the basis of the characteristic expressed in the acquired transport article information, transport control information that includes transport route information expressing the determined transport route and that causes the unmanned vehicle to transport the article by causing the unmanned vehicle to move on the transport route, wherein
the acquiring code is configured to cause the at least one processor to acquire, after the unmanned vehicle starts transporting the article, at least one of attitude information expressing an attitude of the unmanned vehicle or attitude control information expressing a control content on the attitude of the unmanned vehicle, and
the program code further includes:
detecting code configured to cause the at least one processor to detect, on the basis of at least one of a change in the attitude expressed in the acquired attitude information or a change in the control content expressed in the attitude control information, a change in a position of a center of gravity of the article carried by the unmanned vehicle;
route changing code configured to cause the at least one processor to change, when the change is detected, the determined transport route to a transport route on which the unmanned vehicle changes speed a fewer number of times compared to the determined transport route; and
controlling code configured to cause the at least one processor to carry out control that causes the unmanned vehicle to move on the changed transport route.

2. The control device according to claim 1, wherein the program code further includes operating mode determining code configured to cause the at least one processor to determine, on the basis of the characteristic expressed in the acquired transport article information, an operating mode related to behavior for when the unmanned vehicle moves on the transport route carrying the article, and
the generating code is configured to cause the at least one processor to generate the transport control information that further includes operating mode information expressing the determined operating mode and that causes the unmanned vehicle to move on the transport route in the operating mode.

3. The control device according to claim 1, wherein
the program code further includes schedule determining code configured to cause the at least one processor to determine, on the basis of the characteristic expressed in the acquired transport article information, a transport time for the unmanned vehicle to move on the transport route and transport the article, and
the generating code is configured to cause the at least one processor to generate the transport control information that further includes schedule information expressing the determined transport time and that causes the unmanned vehicle to move on the transport route within the transport time.

4. The control device according to claim 1, wherein
the program code further includes schedule determining code configured to cause the at least one processor to determine, on the basis of the characteristic expressed in the acquired transport article information, an end time at which the unmanned vehicle completes transportation of the article, and
the generating code is configured to cause the at least one processor to generate the transport control information that further includes schedule information expressing the determined end time and that causes the unmanned vehicle to move on the transport route by the end time.

5. The control device according to claim 1, wherein
the transport article information further expresses a specified time block specified as a time block in which transportation of the article is to be completed,
the program code further includes schedule determining code configured to cause the at least one processor to determine, on the basis of the characteristic and the specified time block expressed in the acquired transport article information, a start time at which the unmanned vehicle starts the transportation of the article, and
the generating code is configured to cause the at least one processor to generate the transport control information that further includes schedule information expressing the determined start time and the specified time block and that causes the unmanned vehicle to start moving at the start time and complete moving on the transport route at a time included in the specified time block.

6. The control device according to claim 1 wherein
the program code further includes delivery method determining code configured to cause the at least one processor to determine, on the basis of the characteristic expressed in the acquired transport article information, a delivery method of the article by the unmanned vehicle, and
the generating code is configured to cause the at least one processor to generate the transport control information that includes delivery method information expressing the determined delivery method and that causes the unmanned vehicle to deliver the article by the determined delivery method.

7. The control device according to claim 1 wherein
the program code further includes unmanned vehicle determining code configured to cause the at least one processor to determine, on the basis of the characteristic expressed in the acquired transport article information, the unmanned vehicle to be caused to transport the article from a plurality of unmanned vehicles, and
the generating code is configured to cause the at least one processor to generate the transport control information that includes vehicle identification information identifying the determined unmanned vehicle and that causes the determined unmanned vehicle to transport the article.

8. The control device according to claim 1, wherein the characteristic of the article includes an impact resistance of the article.

9. The control device according to claim 1, wherein the characteristic of the article includes whether or not a temperature of the article needs to be controlled.

10. The control device according to claim 1, wherein the unmanned vehicle is an unmanned aircraft or an unmanned ground vehicle.

11. An unmanned vehicle, comprising:
at least one memory storing program code; and
at least one processor operable to read the program code and operate as instructed by the program code, wherein
the program code includes:
  acquiring code configured to cause the at least one processor to acquire transport article information expressing a characteristic of an article to be transported;
  route determining code configured to cause the at least one processor to determine, on the basis of the characteristic expressed in the acquired transport article information, a transport route on which the unmanned vehicle is to transport the article; and
  generating code configured to cause the at least one processor to generate, on the basis of the characteristic expressed in the acquired transport article information, transport control information that includes transport route information expressing the determined transport route and that causes the unmanned vehicle to transport the article by causing the unmanned vehicle to move on the transport route, wherein
the acquiring code is configured to cause the at least one processor to acquire, after the unmanned vehicle starts transporting the article, at least one of attitude information expressing an attitude of the unmanned vehicle or attitude control information expressing a control content on the attitude of the unmanned vehicle, and
the program code further includes:
  detecting code configured to cause the at least one processor to detect, on the basis of at least one of a change in the attitude expressed in the acquired attitude information or a change in the control content expressed in the attitude control information, a change in a position of a center of gravity of the article carried by the unmanned vehicle;
  route changing code configured to cause the at least one processor to change, when the change is detected, the determined transport route to a transport route on which the unmanned vehicle changes speed a fewer number of times compared to the determined transport route; and
  controlling code configured to cause the at least one processor to carry out control that causes the unmanned vehicle to move on the changed transport route.

12. A method that is executed by a control device, the method comprising:
acquiring transport article information expressing a characteristic of an article to be transported;
determining, on the basis of the characteristic expressed in the acquired transport article information, a transport route on which an unmanned vehicle is to transport the article; and generating, on the basis of the characteristic expressed in the acquired transport article information, transport control information that includes transport route information expressing the determined transport route and that causes the unmanned vehicle to transport the article by causing the unmanned vehicle to move on the transport route;

acquiring, after the unmanned vehicle starts transporting the article, at least one of attitude information expressing an attitude of the unmanned vehicle or attitude control information expressing a control content on the attitude of the unmanned vehicle;

detecting, on the basis of at least one of a change in the attitude expressed in the acquired attitude information or a change in the control content expressed in the attitude control information, a change in a position of a center of gravity of the article carried by the unmanned vehicle;

changing, when the change is detected, the determined transport route to a transport route on which the unmanned vehicle changes speed a fewer number of times compared to the determined transport route; and carrying out control that causes the unmanned vehicle to move on the changed transport route.

13. The control device according to claim 2, wherein
the program code further includes unmanned vehicle determining code configured to cause the at least one processor to determine, on the basis of the characteristic expressed in the acquired transport article information, the unmanned vehicle to be caused to transport the article from a plurality of unmanned vehicles, and the generating code is configured to cause the at least one processor to generate the transport control information that includes vehicle identification information identifying the determined unmanned vehicle and that causes the determined unmanned vehicle to transport the article.

14. The control device according to claim 3, wherein
the program code further includes unmanned vehicle determining code configured to cause the at least one processor to determine, on the basis of the characteristic expressed in the acquired transport article information, the unmanned vehicle to be caused to transport the article from a plurality of unmanned vehicles, and the generating code is configured to cause the at least one processor to generate the transport control information that includes vehicle identification information identifying the determined unmanned vehicle and that causes the determined unmanned vehicle to transport the article.

15. The control device according to claim 4, wherein
the program code further includes unmanned vehicle determining code configured to cause the at least one processor to determine, on the basis of the characteristic expressed in the acquired transport article information, the unmanned vehicle to be caused to transport the article from a plurality of unmanned vehicles, and the generating code is configured to cause the at least one processor to generate the transport control information that includes vehicle identification information identifying the determined unmanned vehicle and that causes the determined unmanned vehicle to transport the article.

16. The control device according to claim 5, wherein
the program code further includes unmanned vehicle determining code configured to cause the at least one processor to determine, on the basis of the characteristic expressed in the acquired transport article information, the unmanned vehicle to be caused to transport the article from a plurality of unmanned vehicles, and the generating code is configured to cause the at least one processor to generate the transport control information that includes vehicle identification information identifying the determined unmanned vehicle and that causes the determined unmanned vehicle to transport the article.

* * * * *